US011982125B2

(12) United States Patent
James et al.

(10) Patent No.: US 11,982,125 B2
(45) **Date of Patent: *May 14, 2024**

(54) SELF-TENSIONING MAGNETIC TRACKS AND TRACK ASSEMBLIES

(71) Applicant: DEFENDER SCREENS INTERNATIONAL, LLC, Sarasota, FL (US)

(72) Inventors: Arthur James, Sarasota, FL (US); Jan Gross, Sarasota, FL (US)

(73) Assignee: DEFENDER SCREENS INTERNATIONAL LLC, Sarasota, FL (US)

(*) Notice: Subject to any disclaimer, the term of this patent is extended or adjusted under 35 U.S.C. 154(b) by 0 days.

This patent is subject to a terminal disclaimer.

(21) Appl. No.: 17/862,861

(22) Filed: Jul. 12, 2022

(65) Prior Publication Data

US 2022/0349252 A1 Nov. 3, 2022

Related U.S. Application Data

(63) Continuation of application No. 16/932,069, filed on Jul. 17, 2020, now Pat. No. 11,421,474, which is a (Continued)

(51) Int. Cl.
*E06B 9/58* (2006.01)
*E06B 9/00* (2006.01)
(Continued)

(52) U.S. Cl.
CPC .................. *E06B 9/58* (2013.01); *E06B 9/00* (2013.01); *E06B 9/0692* (2013.01); *A47G 5/02* (2013.01)

(58) Field of Classification Search
CPC . E06B 9/00; E06B 9/0692; E06B 9/58; E06B 9/581; E06B 2009/585; E06B 2009/587
See application file for complete search history.

(56) References Cited

U.S. PATENT DOCUMENTS 3,078,917 A * 2/1963 Recchione .......... E06B 9/17046 D25/16
3,248,899 A 5/1966 Anderson
(Continued)

FOREIGN PATENT DOCUMENTS

CA 2746178 1/2013
DE 102016120299 4/2018
(Continued)

*Primary Examiner* — Johnnie A. Shablack
(74) *Attorney, Agent, or Firm* — BrownWinick Law Firm; Christopher A. Proskey

(57) ABSTRACT

A magnetic track assembly including an elongate channel having an open side, an end wall, and two parallel side walls; a first magnet disposed within the elongate channel near an interior side of the end wall; a compartment defined within the elongate channel spaced from the first magnet; and a screen receiver disposed within the compartment and including a second magnet arranged facing the first magnet. In the magnetic track assembly, the first and second magnets are of opposite polarity and the screen receiver is loosely disposed within the compartment such that a magnetic bond is intact between the first and second magnets when the first and second magnets are close together and the magnetic bond is broken when the first and second magnets are pulled apart.

32 Claims, 60 Drawing Sheets

Related U.S. Application Data continuation-in-part of application No. 16/024,972, filed on Jul. 2, 2018, now Pat. No. 10,927,597, which is a continuation of application No. 15/646,223, filed on Jul. 11, 2017, now Pat. No. 10,036,198, which is a continuation of application No. 15/227,345, filed on Aug. 3, 2016, now Pat. No. 9,719,292.

(60) Provisional application No. 62/877,083, filed on Jul. 22, 2019.

(51) Int. Cl.
*E06B 9/06* (2006.01)
*A47G 5/02* (2006.01)

(56) References Cited

U.S. PATENT DOCUMENTS

| | | | | |
|---|---|---|---|---|
| 4,884,617 | A * | 12/1989 | Coenraets | E06B 9/62 160/310 |
| 4,993,468 | A * | 2/1991 | Hackman | E06B 9/264 160/100 |
| 5,351,742 | A * | 10/1994 | Lichy | E06B 9/11 160/310 |
| 5,479,979 | A * | 1/1996 | Hayashiguchi | E06B 9/60 160/265 |
| 5,526,865 | A * | 6/1996 | Coenraets | E06B 9/58 160/273.1 |
| 5,638,883 | A * | 6/1997 | Schulte | E06B 9/17046 160/265 |
| 5,944,086 | A * | 8/1999 | Gruben | E06B 9/17046 160/267.1 |
| 6,021,837 | A * | 2/2000 | Miller | E06B 9/174 160/133 |
| 6,065,525 | A * | 5/2000 | Wells | E06B 9/58 160/273.1 |
| 6,112,799 | A * | 9/2000 | Mullet | E05D 15/24 160/236 |
| 6,263,949 | B1 * | 7/2001 | Guthrie, Jr. | E06B 9/02 160/371 |
| 6,598,648 | B1 * | 7/2003 | Schulte | E06B 9/80 160/310 |
| 7,028,741 | B2 * | 4/2006 | Coenraets | E06B 9/13 160/271 |
| 7,034,682 | B2 * | 4/2006 | Beggs | E05F 15/42 49/27 |
| 7,360,575 | B2 * | 4/2008 | Weiss | A47F 3/0469 160/264 |
| 7,793,702 | B2 * | 9/2010 | Biewer | B60J 7/0015 296/214 |
| 8,006,736 | B2 | 8/2011 | Hoffmann | |
| 8,051,993 | B1 | 11/2011 | Tu | |
| 8,371,355 | B2 * | 2/2013 | Santoro | E06B 9/581 160/269 |
| 8,607,841 | B2 * | 12/2013 | Hayashiguchi | E06B 9/581 160/273.1 |
| 8,616,261 | B2 * | 12/2013 | Miller | E06B 9/581 160/183 |
| 9,194,178 | B2 * | 11/2015 | Andre de la Porte | E06B 9/13 |
| 9,719,292 | B1 * | 8/2017 | James | E06B 9/00 |
| 10,036,195 | B2 * | 7/2018 | Iglesias Ballester | E05F 15/668 |
| 10,036,198 | B2 | 7/2018 | James | |
| 10,260,279 | B2 * | 4/2019 | Nakae | E06B 9/40 |
| 10,472,886 | B2 | 11/2019 | Nelson | |
| 10,619,376 | B2 * | 4/2020 | Hoffmann | E04H 15/648 |
| 10,662,705 | B2 * | 5/2020 | Hall | E04B 2/7453 |
| 10,927,597 | B2 * | 2/2021 | James | E06B 9/58 |
| 11,028,639 | B2 * | 6/2021 | Ouyang | E06B 9/13 |
| D936,388 | S * | 11/2021 | Schwandt | D6/580 |
| 11,326,395 | B2 * | 5/2022 | Heissenberg | E06B 9/58 |
| 11,421,474 | B2 * | 8/2022 | James | E06B 9/00 |
| 2006/0137836 | A1 * | 6/2006 | Harbison | E06B 9/42 160/273.1 |
| 2008/0141599 | A1 * | 6/2008 | Akdag | E06B 9/08 16/96 R |
| 2009/0078377 | A1 * | 3/2009 | Ohara | E06B 9/582 160/127 |
| 2012/0012260 | A1 * | 1/2012 | Elinson | E06B 9/42 160/375 |
| 2013/0174990 | A1 * | 7/2013 | Asbury | E06B 9/42 160/264 |
| 2015/0345215 | A1 * | 12/2015 | Roberts | E06B 9/582 160/368.1 |
| 2016/0108666 | A1 * | 4/2016 | Lewan | E06B 9/58 160/271 |
| 2016/0369556 | A1 * | 12/2016 | Fleishman | E06B 9/40 |
| 2017/0044826 | A1 * | 2/2017 | Nakae | E06B 9/581 |
| 2017/0175441 | A1 * | 6/2017 | Drifka | E06B 9/11 |
| 2018/0187482 | A1 * | 7/2018 | Berman | E06B 9/581 |
| 2021/0262284 | A1 * | 8/2021 | James | E06B 9/581 |

FOREIGN PATENT DOCUMENTS

| | | |
|---|---|---|
| EP | 3095950 | 11/2016 |
| FR | 2886332 | 12/2006 |

* cited by examiner

SELF-TENSIONING MAGNETIC TRACKS AND TRACK ASSEMBLIES

CROSS REFERENCE TO RELATED APPLICATIONS

This application is a continuation of U.S. patent application Ser. No. 16/932,069 which was filed on Jul. 17, 2020, which is a continuation-in-part of U.S. patent application Ser. No. 16/024,972 filed Jul. 2, 2018, which is a continuation of U.S. patent application Ser. No. 15/646,223 filed Jul. 11, 2017, which is a continuation of U.S. patent application Ser. No. 15/227,345 filed Aug. 3, 2016, all of which are hereby fully incorporated by reference herein in their entirety.

This application also claims priority to U.S. Provisional Application No. 62/877,083 filed Jul. 22, 2019 and titled SELF-TENSIONING MAGNETIC TRACKS AND TRACK ASSEMBLIES, which is hereby fully incorporated by reference herein in its entirety.

TECHNICAL FIELD

The disclosed embodiments relates generally to the field of tracks and track assemblies for retractable screens, and more particularly, to self-tensioning magnetic tracks and track assemblies for motorized retractable screens.

Overview

Over the past two decades, motorized retractable screens have gained popularity due to their utility and versatility for temporarily enclosing spaces. For example, many restaurants and other businesses having patios/outdoor areas utilize retractable screens to temporarily enclose these areas thereby creating environmentally controlled areas that are shielded from inclement weather conditions (e.g., windy and/or cold weather conditions).

While these retractable screens have great versatility and utility, several problems exist with the currently marketed screens and tracks/track assemblies. For example, the currently marketed tracks and track assemblies are fixed tracks that maintain the screen in a tight, aesthetically pleasing manner once the screen has been deployed. Although these fixed tracks/track assemblies maintain the screen in a tight, aesthetically pleasing manner, these fixed tracks allow for very little play (e.g., expansion and/or contraction) of the screen during, for example, high wind conditions. Consequently, during high wind conditions, these screens may (1) twist, buckle, and/or warp the fixed tracks/track assemblies, (2) damage the screen, or (3) any combination thereof. These problems lead to frequent, costly repairs and/or replacement of the fixed tracks/track assemblies and screens.

SUMMARY

Therefore, it is an object of the disclosure to provide tracks and track assemblies that overcome the problems of currently marketed fixed tracks and fixed track screen assemblies. In one of more embodiments, the tracks and track screen assemblies overcome these problems by utilizing a self-tensioning magnet arrangement that allows for expansion and contraction of a screen/shade attached thereto. When compared to currently marketed fixed tracks and fixed track screen assemblies, this self-tensioning magnet arrangement advantageously results in less frequent maintenance of the disclosed tracks/track assemblies while simultaneously increasing screen lifespan.

In one or more embodiments, a set of tracks and track assemblies utilize a novel arrangement of magnets in the track assemblies that allow a screen attached thereto to expand while under high wind pressure/conditions. Specifically, in the track and track assemblies, magnets having opposite polarity separate from one another allowing for screen expansion while subjected to high wind pressure. However, after the high wind pressure subsides, the magnetic attraction of the separated magnets pulls the separated magnets into close proximity relative to one another while concurrently tensioning the screen to provide for an aesthetically pleasing, tight screen.

As another feature, in one of more embodiments, tracks and track assemblies do not have dimensional limitations of screens that can be used in these tracks/track assemblies, and screens covering extremely wide and tall openings, including dimensions of up to 30 feet wide by 24 feet high, may be used with the disclosed tracks and track assemblies.

In one of more embodiments a magnetic track assembly includes an elongate channel having an open side, an end wall, and two parallel side walls; a first magnet disposed within the elongate channel near an interior side of the end wall; a compartment defined within the elongate channel spaced from the first magnet; and a screen receiver disposed within the compartment and including a second magnet arranged facing the first magnet, wherein the first and second magnets are of opposite polarity and the screen receiver is loosely disposed within the compartment such that a magnetic bond is intact between the first and second magnets when the first and second magnets are close together and the magnetic bond is broken when the first and second magnets are pulled apart.

In some embodiments, the screen receiver includes an elongate C-shaped channel opening in a direction opposite the first magnet such that the C-shaped channel is accessible through the open side of the elongate channel. The screen receiver, and more particularly the C-shaped channel opening, are in some implementations adapted to receive a screen interlock including, but not limited to a keder interlock, a zipper interlock, a rope, a beaded chain, or any similar interlock known in the art associated with the disclosed retractable screens.

In one or more embodiments, the compartment is defined by interior partition walls that extend inward from their respective one of the two parallel side walls, and wherein each of the partition walls extend inward a distance less than half a distance between the two parallel side walls.

In some embodiments, the second magnet is outside of the compartment when the magnetic bond between the first and second magnets is intact, and within the compartment when the bond between the first and second magnets is broken.

In one or more embodiments, a width of the screen receiver is less than a width of the compartment such that the screen receiver can be installed at an angle through the open side of the elongate channel.

In one or more embodiments, the elongate channel further includes a secondary channel disposed along one of the two parallel side walls opening in a direction perpendicular to the open side of the elongate channel.

In one or more embodiments, the magnetic track assembly further includes a removable elongate cover covering a length of the secondary channel.

In one or more embodiments, the elongate channel is open at a top and a bottom thereof, and wherein the top and the bottom are covered with removable top and bottom covers, respectively.

In one or more embodiments, the interior compartment has a depth greater than one inch and up to, for example, 2 inches, 3 inches, 4 inches, 5 inches, 6 inches, or 7 inches.

Also disclosed herein is a magnetic track assembly including an elongate channel having an open side, an end wall, and two parallel side walls; a first magnet disposed within the elongate channel near an interior side of the end wall; a compartment defined within the elongate channel spaced from the first magnet; a screen receiver disposed within the compartment, the screen receiver comprising a C-shaped channel opening in a direction of the open side of the elongate channel, and a second magnet arranged facing the first magnet; and a screen tensioner slidably received within the C-shaped channel; wherein the first and second magnets are of opposite polarity and the screen receiver is loosely disposed within the compartment such that a magnetic bond is intact between the first and second magnets when the first and second magnets are close together and the magnetic bond is broken when the first and second magnets are pulled apart.

In one or more embodiments, the screen receiver is adapted to move horizontally within the compartment toward and away from the first magnet.

In one or more embodiments, the compartment is defined by interior partition walls that extend inward from their respective one of the two parallel side walls, and wherein each of the partition walls extend inward a distance less than half a distance between the two parallel side walls.

In one or more embodiments, a width of the screen receiver is less than a width of the compartment such that the screen receiver can be installed at an angle through the open side of the elongate channel.

In one or more embodiments, the elongate channel further includes a secondary channel disposed along one of the two parallel side walls opening in a direction perpendicular to the open side of the elongate channel.

In one or more embodiments, the magnetic track assembly further includes a removable elongate cover covering a length of the secondary channel.

In one or more embodiments, the elongate channel is open at a top and a bottom thereof, and wherein the top and the bottom are covered with removable top and bottom covers, respectively.

In one or more embodiments, the interior compartment has a depth greater than one inch and up to, for example, 2 inches, 3 inches, 4 inches, 5 inches, 6 inches, or 7 inches.

Embodiments of the disclosure can include one or more or any combination of the above features and configurations.

Additional features, aspects and advantages of the disclosure will be set forth in the detailed description which follows, and in part will be readily apparent to those skilled in the art from that description or recognized by practicing the disclosure as described herein. It is to be understood that both the foregoing general description and the following detailed description present various embodiments of the disclosure, and are intended to provide an overview or framework for understanding the nature and character of the disclosure as it is claimed. The accompanying drawings are included to provide a further understanding of the disclosure, and are incorporated in and constitute a part of this specification.

BRIEF DESCRIPTION OF THE DRAWINGS

These and other features, aspects and advantages of the disclosure are better understood when the following detailed description of the disclosure is read with reference to the accompanying drawings, in which.

DETAILED DESCRIPTION

Figure 1:
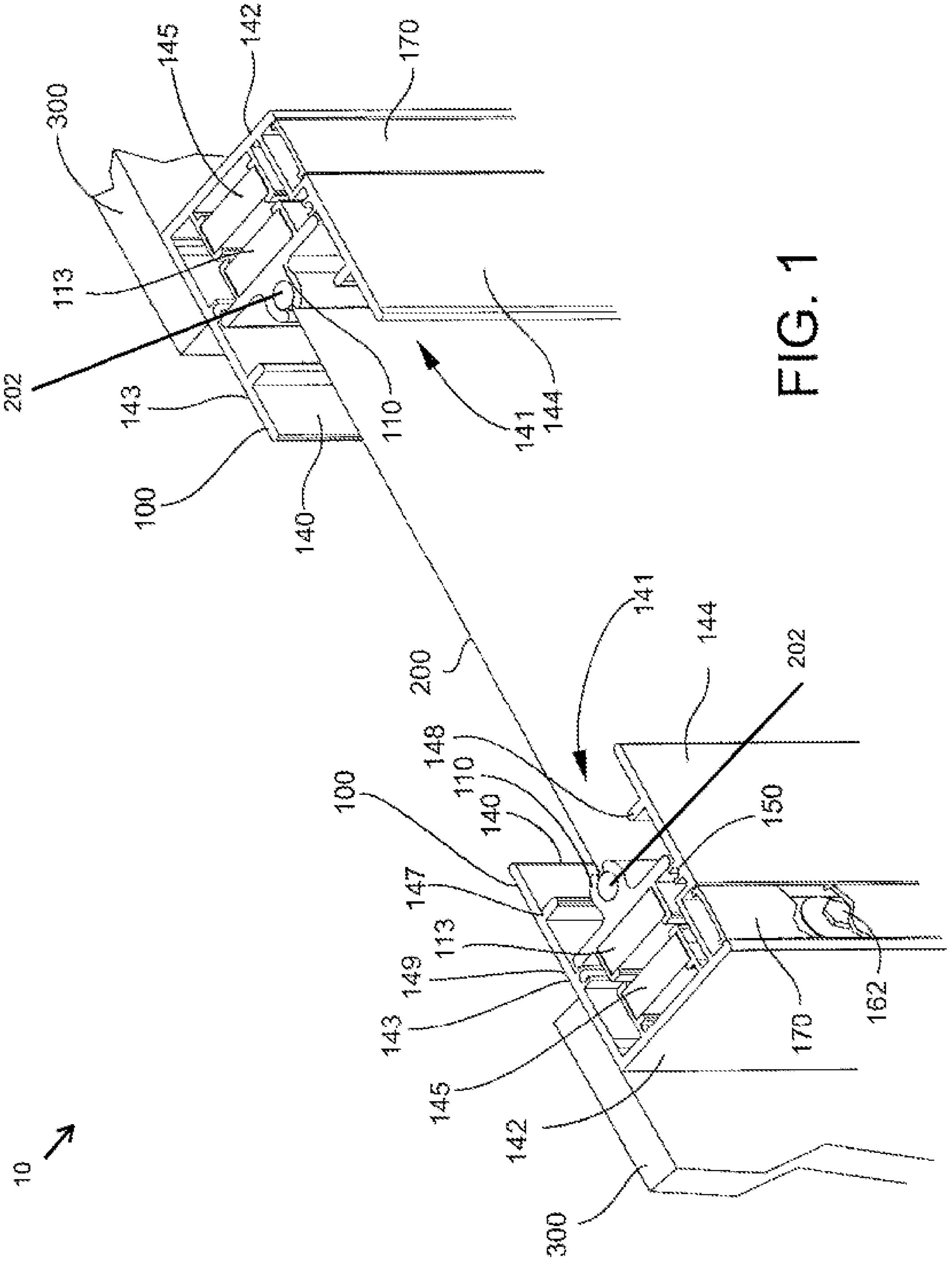
FIG. 1 is a perspective view of the assembled magnetic track assembly having a motorized, retractable screen attached thereto in which the screen has a tight, aesthetically pleasing appearance.

In the following detailed description of the embodiments, reference is made to the accompanying drawings which form a part hereof, and in which is shown by way of illustration specific embodiments in which the disclosure may be practiced. The embodiments of the present disclosure described below are not intended to be exhaustive or to limit the disclosure to the precise forms in the following detailed description. Rather, the embodiments are chosen and described so that others skilled in the art may appreciate and understand the principles and practices of the present disclosure. It will be understood by those skilled in the art that various changes in form and details may be made without departing from the principles and scope of the invention. It is intended to cover various modifications and similar arrangements and procedures, and the scope of the appended claims therefore should be accorded the broadest interpretation so as to encompass all such modifications and similar arrangements and procedures. For instance, although aspects and features may be illustrated in or described with reference to certain figures or embodiments, it will be appreciated that features from one figure or embodiment may be combined with features of another figure or embodiment even though the combination is not explicitly shown or explicitly described as a combination. In the depicted embodiments, like reference numbers refer to like elements throughout the various drawings.

Furthermore, although some disclosed embodiments may be described relative to specific materials, embodiments are not limited to the specific materials or apparatuses but only to their specific characteristics and capabilities and other materials and apparatuses can be substituted as is well understood by those skilled in the art in view of the present disclosure. Moreover, although the disclosed embodiments are primarily described in the context of retractable screen applications, the embodiments are not so limited. In is appreciated that the embodiments may be adapted for use in other applications which may be improved by the disclosed structures, arrangements and/or methods.

It is to be understood that the terms such as "left, right, top, bottom, front, back, side, height, length, width, upper, lower, interior, exterior, inner, outer, and the like as may be used herein, merely describe points of reference and do not limit the present invention to any particular orientation or configuration.

As used herein, the term "or" includes one or more of the associated listed items, such that "A or B" means "A but not B," and "B but not A." As used herein, the term "and" includes all combinations of one or more of the associated listed items, such that "A and B" means "A as well as B." The use of "and/or" includes all combinations of one or more of the associated listed items, such that "A and/or B" includes "A but not B," "B but not A," and "A as well as B," unless it is clearly indicated that only a single item, subgroup of items, or all items are present. The use of "etc." is defined as "et cetera" and indicates the inclusion of all other elements belonging to the same group of the preceding items, in any "and/or" combination(s).

As used herein, the singular forms "a," "an," and "the" are intended to include both the singular and plural forms, unless the language explicitly indicates otherwise. Indefinite articles like "a" and "an" introduce or refer to any modified term, both previously-introduced and not, while definite articles like "the" refer to a same previously-introduced term; as such, it is understood that "a" or "an" modify items that are permitted to be previously-introduced or new, while definite articles modify an item that is the same as immediately previously presented. It will be further understood that the terms "comprises," "comprising," "includes," and/or "including," when used herein, specify the presence of stated features, characteristics, steps, operations, elements, and/or components, but do not themselves preclude the presence or addition of one or more other features, characteristics, steps, operations, elements, components, and/or groups thereof.

It will be understood that when an element is referred to as being "connected," "coupled," "mated," "attached," "fixed," etc. to another element, it can be directly connected to the other element, or intervening elements may be present. In contrast, when an element is referred to as being "directly connected," "directly coupled," etc. to another element, there are no intervening elements present. Other words used to describe the relationship between elements should be interpreted in a like fashion (e.g., "between" versus "directly between," "adjacent" versus "directly adjacent," etc.). Similarly, a term such as "communicatively connected" includes all variations of information exchange and routing between two electronic devices, including intermediary devices, networks, etc., connected wirelessly or not.

It will be understood that, although the ordinal terms "first," "second," etc. may be used herein to describe various elements, these elements should not be limited to any order by these terms. These terms are used only to distinguish one element from another; where there are "second" or higher ordinals, there merely must be that many number of elements, without necessarily any difference or other relationship. For example, a first element could be termed a second element, and, similarly, a second element could be termed a first element, without departing from the scope of example embodiments or methods.

Similarly, the structures and operations discussed below may occur out of the order described and/or noted in the figures. For example, two operations and/or figures shown in succession may in fact be executed concurrently or may sometimes be executed in the reverse order, depending upon the functionality/acts involved. Similarly, individual operations within example methods described below may be executed repetitively, individually or sequentially, to provide looping or other series of operations aside from single operations described below. It should be presumed that any embodiment or method having features and functionality described below, in any workable combination, falls within the scope of example embodiments.

Disclosed are magnetic tracks and track assemblies that utilize a novel magnet arrangement in the track assemblies that allow magnets to separate thereby allowing an attached screen to expand while under high wind pressure, and after the high wind pressure subsides, magnetic attraction of these separated magnets pulls the separated magnets into close proximity relative to one another thereby tensioning the attached screen to provide an aesthetically pleasing, tight screen. Thus, the novel magnet arrangement of the disclosed magnetic tracks/track assemblies provide a "self-tensioning" system that operates effectively while accounting for fluctuations in weather conditions that advantageously ensures increased screen and track assembly lifespan while currently reducing frequent maintenance (and/or replacement) associated with currently marketed screens, track/track assemblies, or a combination thereof.

Exemplary magnetic tracks/track assemblies 100 are depicted, for example, in FIGS. 1-8. For example, FIG. 1 depicts a perspective view of two assembled magnetic track assemblies 100 having a parallel arrangement respective to one another with a motorized, retractable screen 200 positioned between and attached to each assembly. The motorized, retractable screen 200 is readily deployed and retracted between the two magnetic track assemblies while, in certain preferred aspects, all portions of the assembly remain vertically stationary during screen deployment and retraction. The magnetic track assembly 100 further has sufficient length to extend vertically along a column or a doorway to ensure that the screen 200 may vertically span the entire length of the column or doorway 300 thereby creating a temporarily enclosed space when the screen is deployed.

Figure 2:
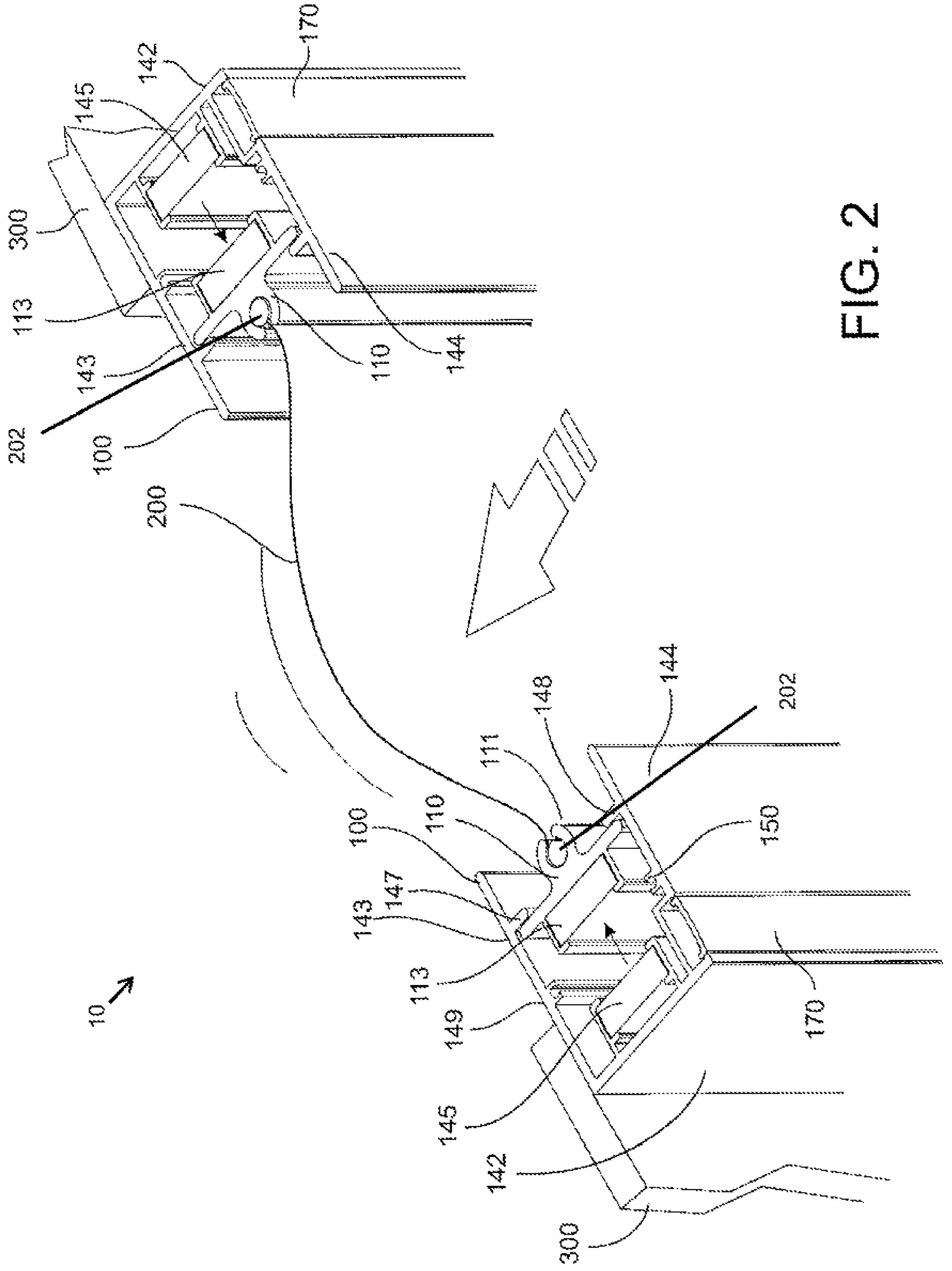
FIG. 2 further depicts the magnetic track assembly and a motorized, retractable screen of FIG. 1 during inclement weather in which the magnets of each assembly separate allowing the screen to expand.

FIG. 2 shows a perspective view of FIG. 1 further demonstrating the novel magnet arrangement that provides the above discussed "self-tensioning" system when the magnets 113, 145 are separated from one another during, for example, inclement weather conditions. As shown in FIGS. 1 and 2, the magnetic track assembly 100 includes a screen receiver 110 and an elongate channel 140 having an open side 141, an end wall 142, and two parallel side walls 143, 144. The elongate channel 140 further includes a magnet 145 having a predetermined polarity attached to the interior of its end wall 142 and a compartment 146 formed by a plurality of partitions 147, 148, 149, 150 that extend inwardly towards the interior of the elongate channel. The compartment 146 is adapted to securely receive the removable screen receiver 110 while allowing for movement therein.

Figure 6:
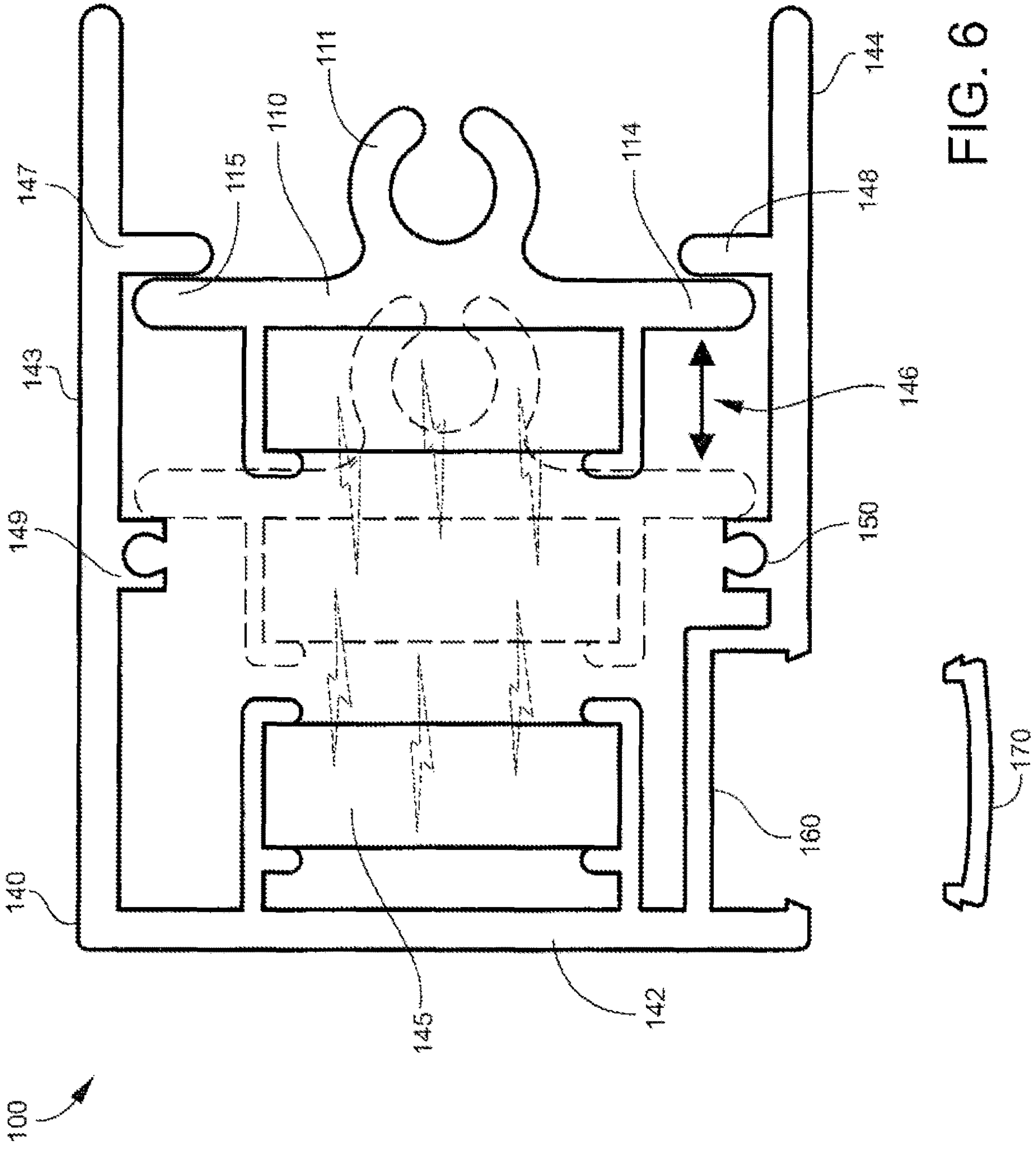
FIG. 6 is a top view of the magnetic track assembly showing the screen receiver including a magnet arranged thereon positioned in the compartment of the elongate channel.
Figure 7:
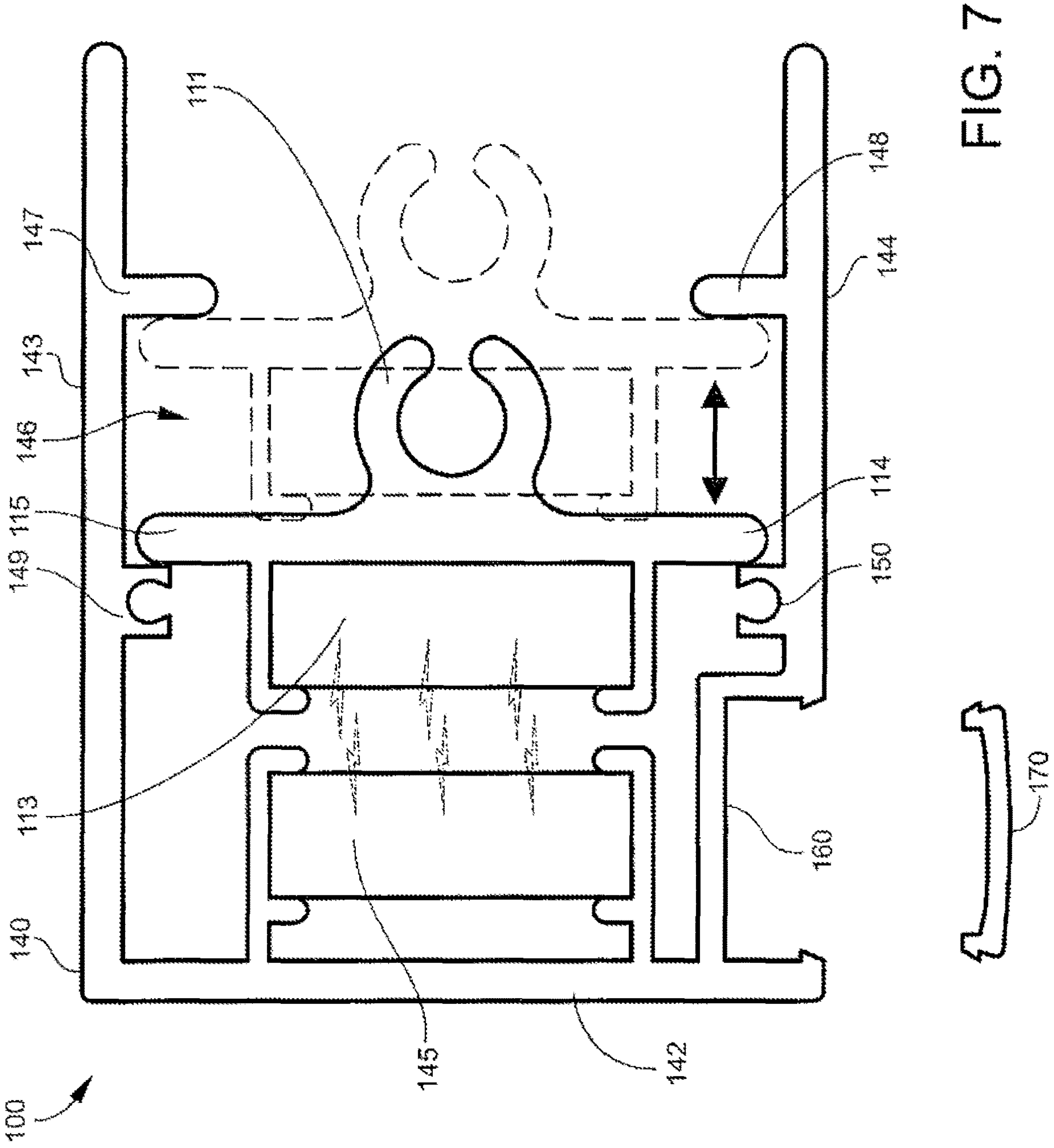
FIG. 7 is a top view of the magnetic track assembly showing the screen received positioned in the compartment of the elongate channel and the magnet arranged on the screen receiver extending beyond the compartment in a direction towards a magnet arranged on an end wall of the elongate channel.

As further shown in FIGS. 1 and 2, the screen receiver 110 is adapted to receive a screen 200 on one side of the receiver while having a magnet 113 arranged on an opposite side. For example, in certain aspects, the screen receiver 110 includes a C-shaped channel 111 formed thereon that receives an interlock 202 of the screen 200 (e.g., a screen keder interlock, a zipper interlock, a rope, a beaded chain, or any similar interlock 202 known in the art) while providing sufficient clearance such that the screen may easily move through the C-shaped channel—the screen being easily deployed and retracted as desired through the C-shaped channel. On a side 112 opposite the C-shaped channel, the screen receiver includes a magnet 113 arranged thereon having an opposite polarity of magnet 145 attached to the interior of end wall 142. The screen receiver 110 is preferably adapted to be removably positioned in the compartment 146 of the elongate channel 140 such that magnet 113 of the screen receiver and magnet 145 arranged on the interior of end wall 142 are in close proximity and attract one another, thereby creating a magnetic bond when the magnets are in close proximity, as shown in FIGS. 1 and 7, but the magnetic bond is temporarily broken when the magnets are separated/pulled apart, as shown, for example, in FIGS. 2 and 6.

For example and as shown in FIG. 1, when the track assemblies 100 are fully assembled and have a screen 200 attached there between, for example, two track assemblies, screen 200 is pulled tight (i.e., has a tight, aesthetically pleasing look) when magnets 113, 145 of the assembly are in close proximity and have an intact magnetic bond. However, as shown in FIG. 2, during inclement weather (e.g., high wind conditions), the screen receiver 110 is configured to move within compartment 146 allowing the magnetic bond between magnets 113, 145 to be broken in one or both screen assemblies, thereby allowing for screen expansion. Once the inclement weather subsides (e.g., high wind conditions), magnets 113, 145 of each assembly are arranged in close enough proximity such that the opposite magnetic polarities attract one another, thus once again pulling the screen tight 200 between the two assemblies, thus providing the screen with a tight, aesthetically pleasing look.

Figure 3:
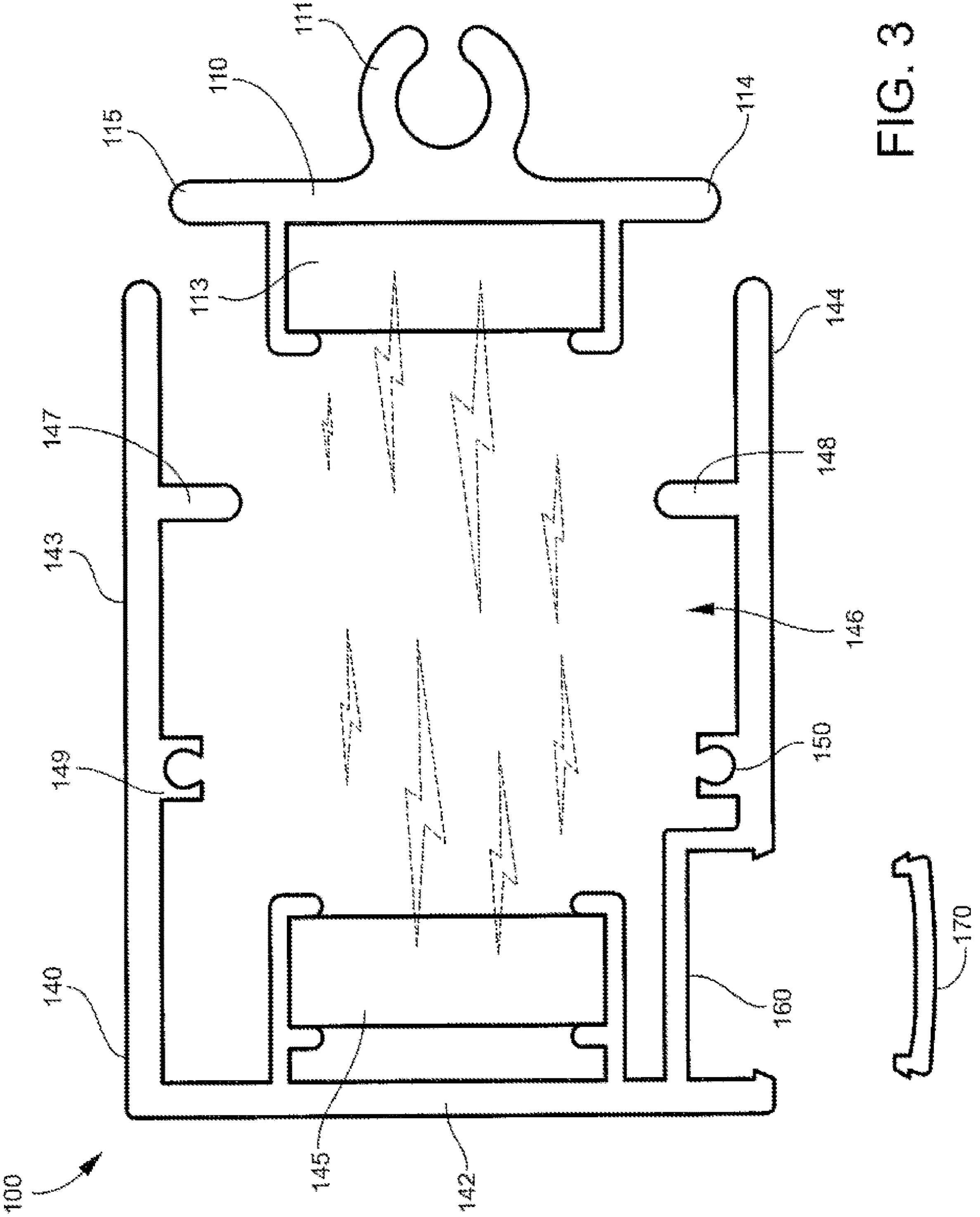
FIG. 3 is a top view of the magnetic track assembly showing the screen receiver outside of the opening of the elongate channel.

FIGS. 3-8 depict sequential views of assembling the magnetic track assembly 100 by positioning the screen receiver 110 in the elongate channel 140, and once assembled, how the screen receiver may laterally move in compartment 146, vertically move, or a combination thereof in the elongate channel 140 during inclement weather. FIG. 3 specifically depicts a top view of the magnetic track assembly 100 in which the screen receiver 110 and elongate channel 140 are two separate components. As shown, in a disassembled state, the screen receiver 110 is initially outside of the elongate channel 140, but during assembly of the magnetic track assembly 100, the screen receiver 110 is securely (but removably) positioned in the elongate channel.

Figure 4:
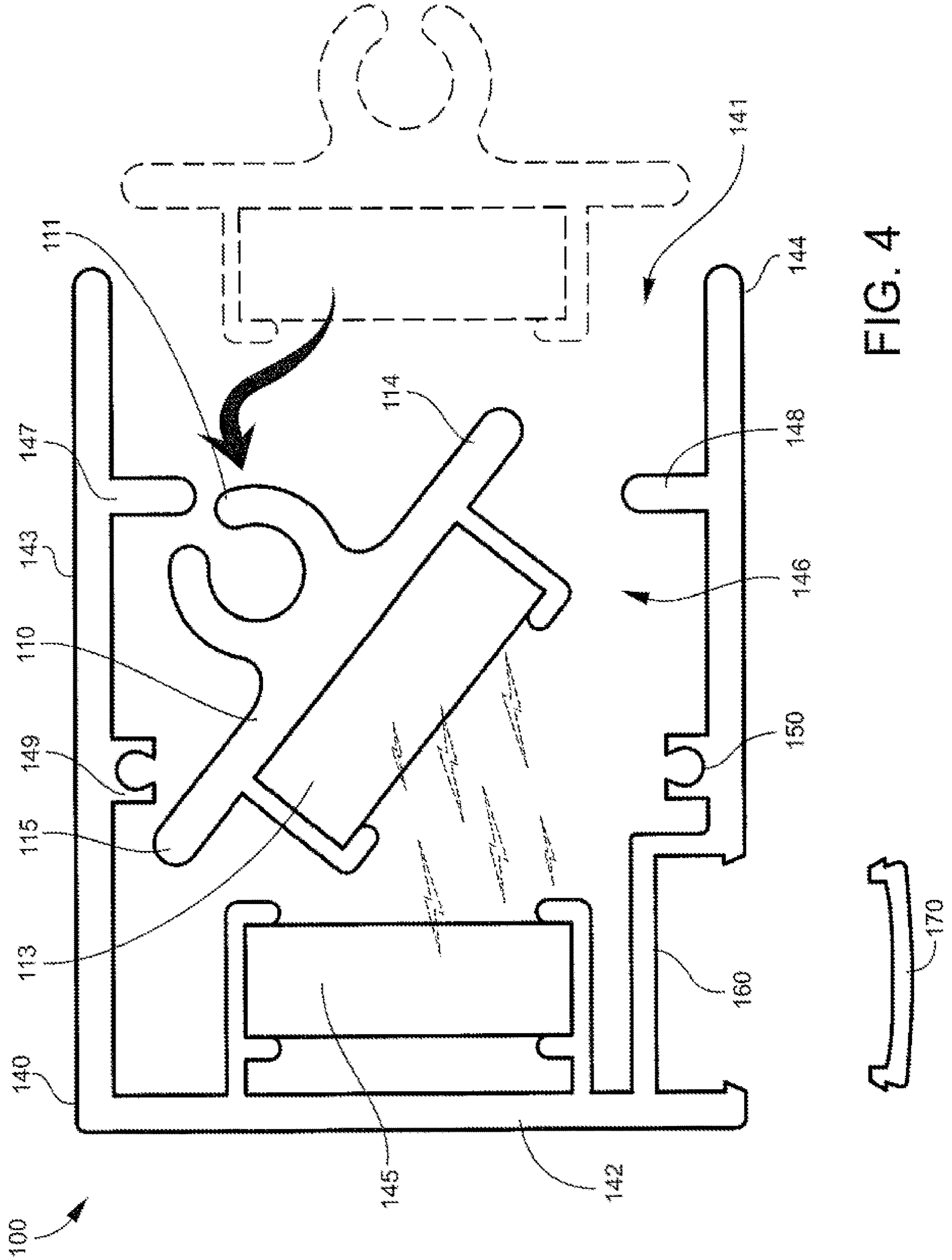
FIG. 4 is a top view of the magnetic track assembly showing the screen receiver being positioned inside the elongate channel.

As shown in FIG. 4, the screen receiver 110 is positioned in the compartment 146 of the elongate channel 140 by initially turning the screen receiver at an angle (e.g., diagonally) relative to the two parallel side walls 143, 144 of the elongate channel. Next, the screen receiver 110 is advanced inside the elongate channel 140 in a direction towards the magnet 145 arranged on the interior of end wall 142, As further shown in FIG. 4, one end 115 of the screen receiver is advanced beyond the end of the compartment 146 nearest to end wall 142 while the opposite end 114 of screen receiver remains outside of the opposite end of the compartment 146 nearest to the opening 141 of the elongate channel.

Figure 5:
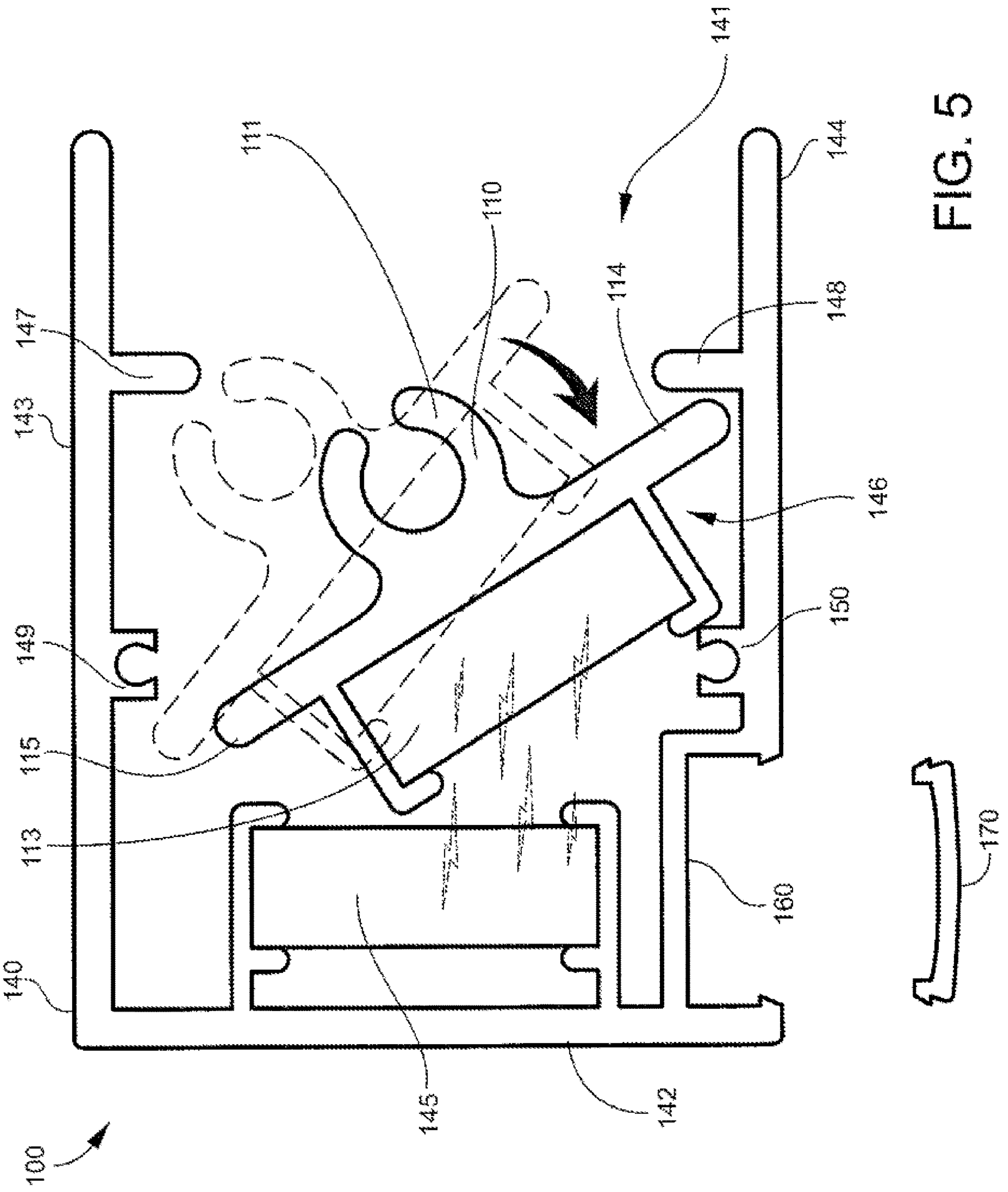
FIG. 5 is another top view of the magnetic track assembly showing the screen receiver being positioned and moved within the elongate channel.

Next and as further shown in FIG. 5, the screen receiver 110 is advanced in the compartment and moved such that end 114 of the screen receiver is positioned within the compartment 146 and is adjacent relative to partition 148 and parallel side wall 144 thereby securing end 114 of the screen receiver in the compartment. As shown in FIGS. 5 and 6, sufficient clearance exists between end 115 of the screen receiver and partition 149 of parallel side wall 143 to adjust the screen receiver 110 and secure the screen receiver 110 in the compartment 146. As shown in FIGS. 6 and 7, when the screen receiver 110 is secured in compartment 146, ends 114, 115 of screen receiver 110 are preferably parallel relative to the partitions 147, 148, 149, 150 that form compartment 146. In certain aspects, the partitions extend inward less than half a distance between the two parallel side walls 143, 144.

As further shown in FIGS. 6 and 7, clearance exists between ends 114, 115 of screen receiver and each corresponding parallel side wall 143, 144 to allow lateral movement (horizontal movement) of the screen receiver 110 between the parallel side walls 143, 144. As further shown in FIGS. 6 and 7, the screen receiver 110 may also move between partitions 147, 148 (front partitions of compartment) and partitions 149, 150 (back partitions) within compartment 146 in a direction extending from end wall 142 to opening 141 (and vice versa). For example, FIG. 7 specifically depicts the magnet 113 of the screen receiver 110 being in close proximity to magnet 145 arranged on end wall 142 such that a magnetic bond is intact between the magnets. When having this arrangement and having a screen 200 received through the screen receiver 110, the screen would be pulled tight having a tight, aesthetically pleasing look. As further shown in FIG. 7, when the magnets 113, 145 are in close proximity such that the magnetic bond is intact, the magnet 113 arranged on the screen receiver is outside of the compartment 146 extending in a direction towards the interior of end wall 142.

However, as shown in FIGS. 2 and 6, the magnetic bond between magnets 113, 145 may be broken, for example, during inclement weather. For example, when a screen 200 is received through screen receiver 110, the screen is allowed to “expand” during, for example, inclement weather including high wind conditions. As shown in FIGS. 2 and 6 in view of FIG. 7, during high wind conditions, the screen 200 may apply force to the screen receiver 110 such that the magnetic bond between the magnets 113, 145 is broken and the screen receiver moves within the compartment in a direction away from end wall 142 towards the opening 141 of the elongate channel. As further shown in FIG. 6, when the magnetic bond is broken, magnet 113 arranged on screen receiver 110 is temporarily in compartment 146, and in certain aspects, ends 114, 115 of the screen receiver 110 may contact the partitions 147, 148 of the compartment nearest the opening 141 of elongate channel thereby securely remaining in the compartment. Thus, in view of the above disclosures, FIGS. 6 and 7 demonstrate how screen receiver 110 moves within compartment 146 thereby allowing for screen expansion during inclement weather conditions and screen contraction/tightening once the inclement weather subsides.

Figure 8:
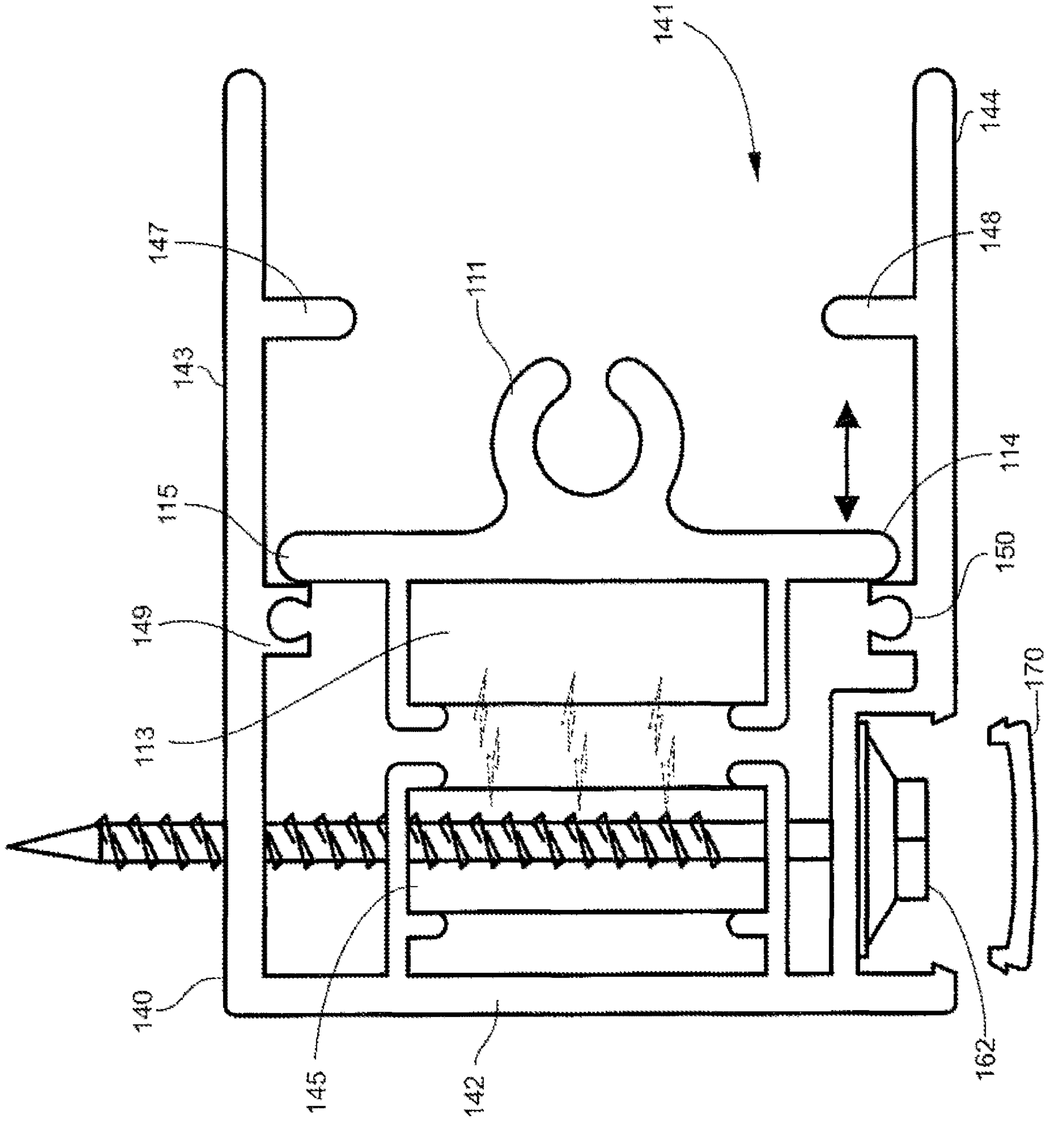
FIG. 8 is the top view of FIG. 7 further showing a fastener extending through the parallel side walls of the elongate channel for attaching the magnetic track assembly to a desired surface.

As further shown in FIGS. 1 and 8, the magnetic track assembly 100, and more specifically the elongate channel 140, may be permanently fixed to a vertical structure 300 such as a column or a doorway. For example, elongate channel 140 may include a plurality of through holes 161 on each parallel side wall in which a through hole on one side wall 144 is aligned with a complimentary through hole on the second side wall 143. The through holes allow the elongate channel 140 to be permanently fixed to a vertical structure by advancing a fastener 162 (e.g., a screw) through the aligned through holes into the vertical structure 300, thereby fixing the elongate channel 140 to the vertical structure 300. As further depicted in FIGS. 3-8, in certain aspects, the elongate channel 140 includes a secondary channel 160 disposed along one 144 of the two parallel side walls opening in a direction perpendicular to the open side 141 of the elongate channel 140. The secondary channel 160 forms a recess having through holes arranged thereon that are aligned with through holes on the other parallel side. After advancing the fastener 162 through the through holes, the fastener head is fully disposed within the recess formed by the secondary channel 160 and preferably does not extend beyond the outermost surface of the parallel side wall 144 on which the secondary channel is formed. As further shown in FIG. 8, the magnetic track assembly 100 further includes a removable elongate cover 170 that fits with the secondary channel 160 to conceal the fastener head in the secondary channel. In certain aspects, the elongate cover 170 extends the entire length of the secondary channel and may be configured for a snap fit, interference fit, or sliding engagement with the secondary channel 160.

Figure 9:
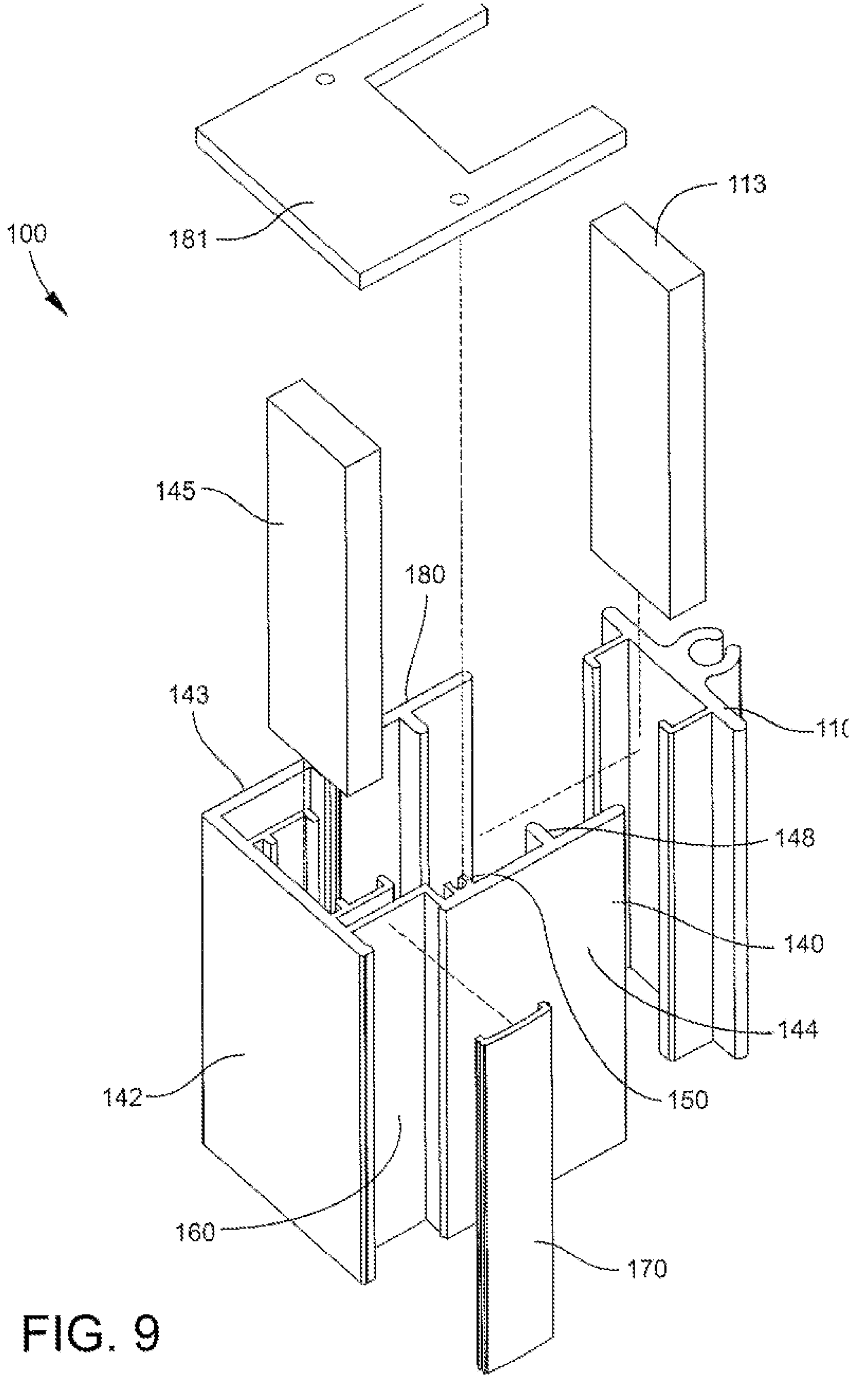
FIG. 9 depicts an exploded view of the magnetic track assembly.
Figure 10:
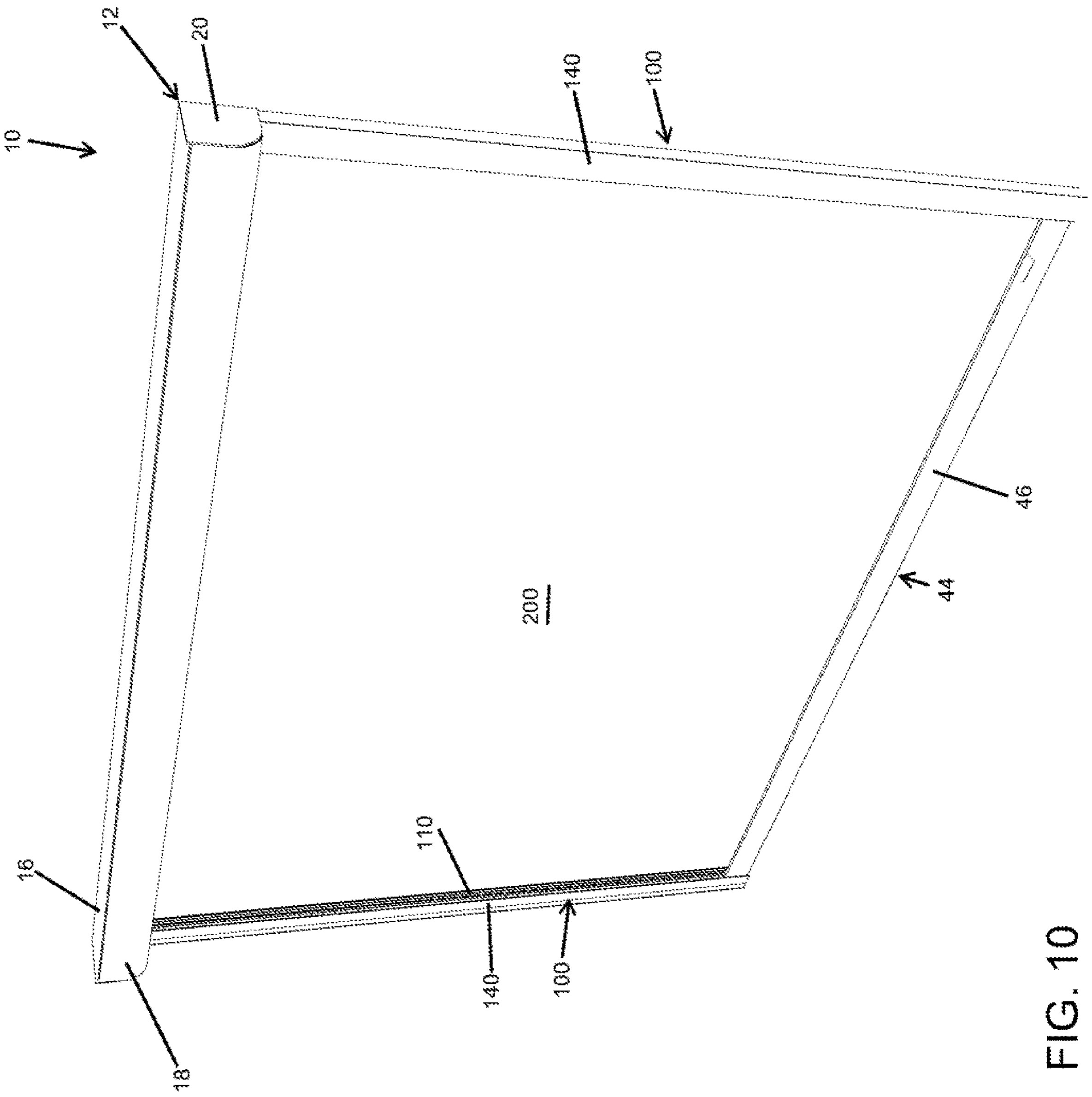
FIG. 10 is a front perspective view of an assembled motorized screen system having a magnetic track assembly; the view showing a housing positioned at the upper end of the motorized screen system; the view showing a screen deployed to the fully closed position; the view showing a pair of magnetic track assemblies having elongate channels and screen receivers therein positioned adjacent the outward sides of the screen; the view showing a bottom bar assembly connected to the lower end of the screen.
Figure 11:
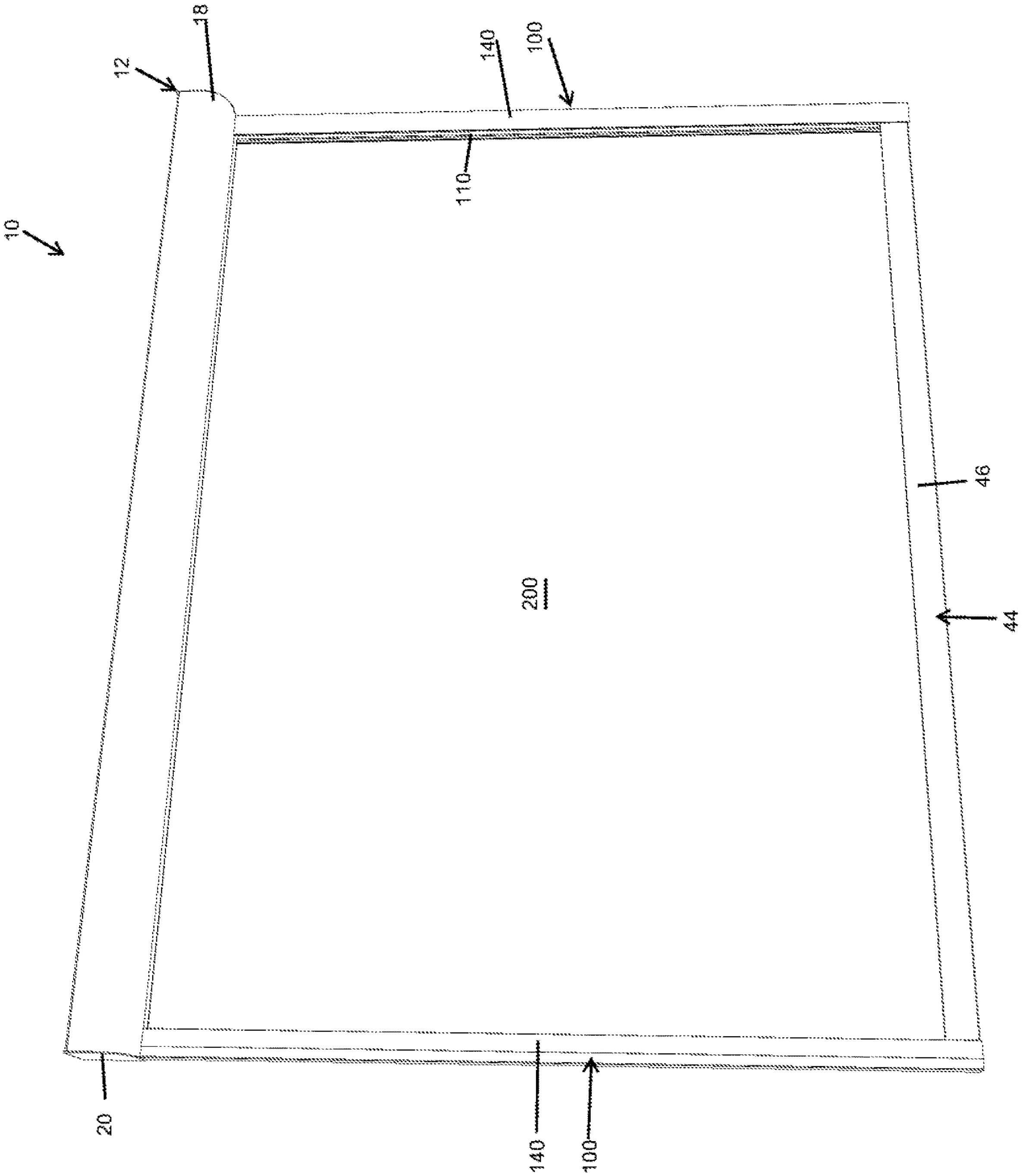
FIG. 11 is another front perspective view of an assembled motorized screen system having a magnetic track assembly as is shown in FIG. 10.
Figure 12:
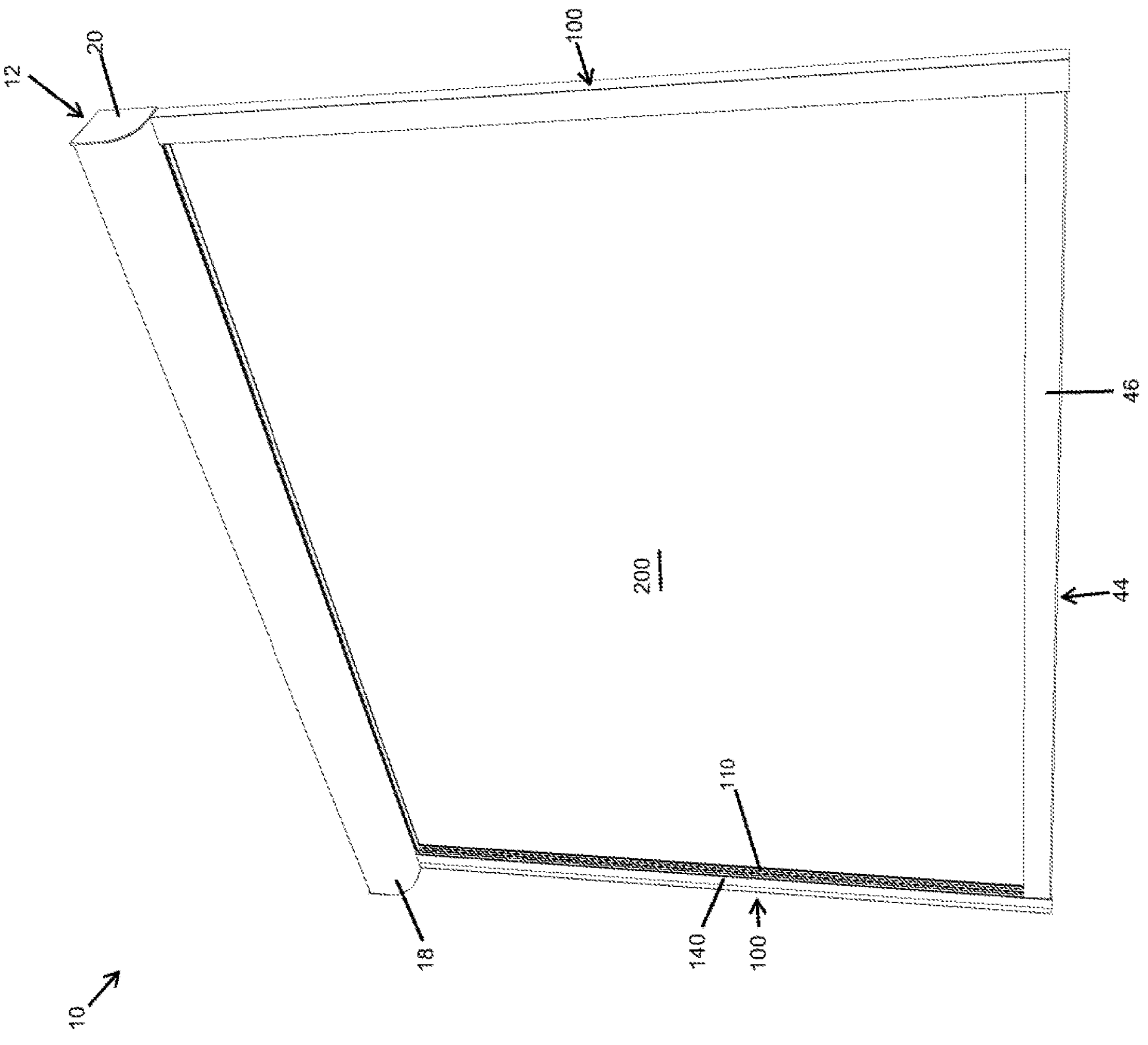
FIG. 12 is another front perspective view of an assembled motorized screen system having a magnetic track assembly as is shown in FIGS. 10-11.
Figure 13:
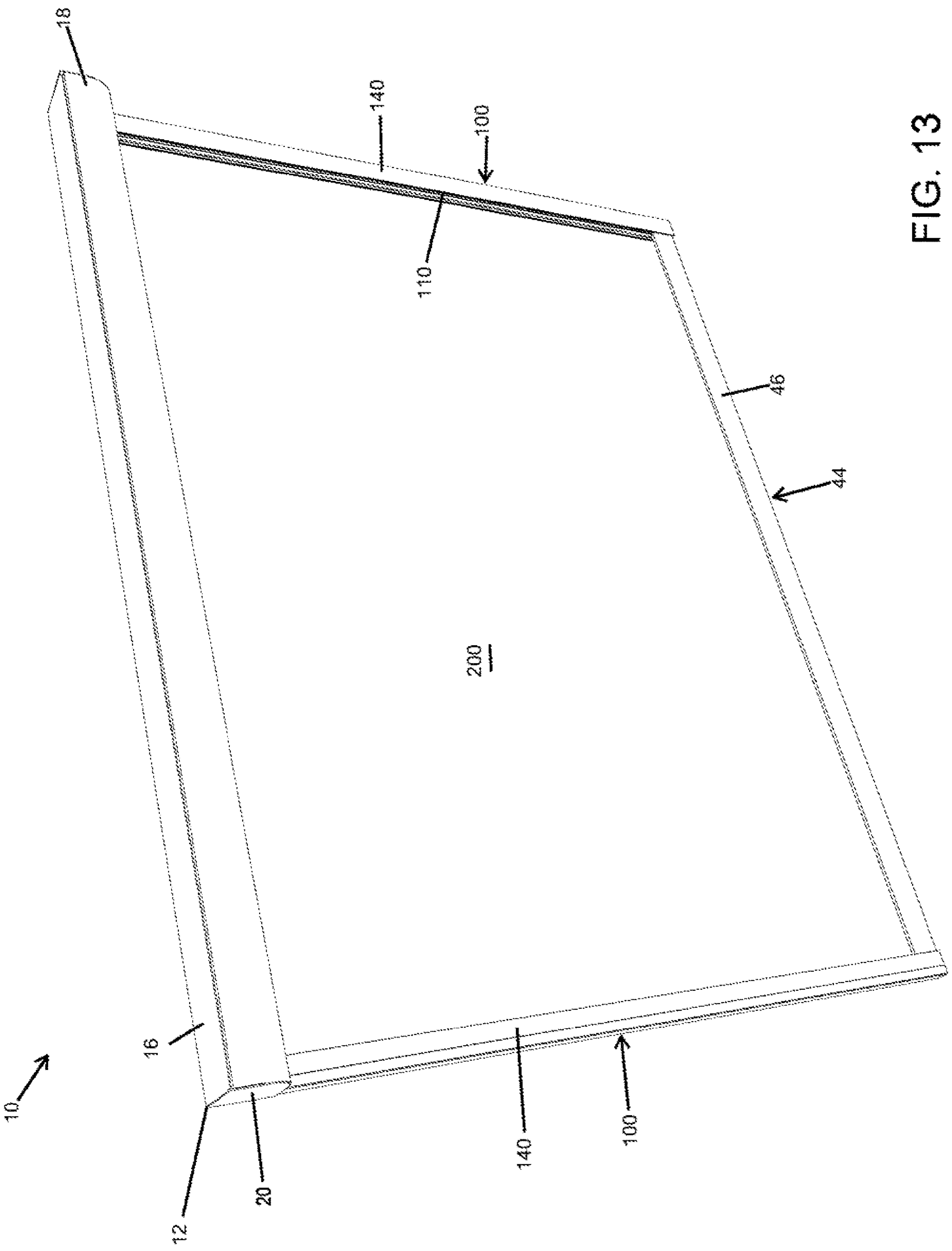
FIG. 13 is another front perspective view of an assembled motorized screen system having a magnetic track assembly as is shown in FIGS. 10-12.

FIG. 9 depicts an exploded view of the magnetic track assembly 100. To provide the magnetic track assembly 100 with a more aesthetically pleasing look, top end 180 and/or bottom end (not shown) may be covered with top cover 181 and bottom cover (not shown), respectively. For example, as shown in any of FIG. 9, through holes may be formed on, for example, partitions 149, 150 of the compartment 146. These through holes extend parallel relative to one another along the longitudinal axis of the elongate channel 140. In certain aspects, top cover 181 is fastened to the top 180 of the elongate channel after positioning the screen receiver therein, and top cover 181 may further secure screen receiver in the elongate channel while concurrently restricting vertical movement of the screen receiver 110 in the elongate channel. As further shown in FIG. 9, in certain aspects, top cover 181 includes recessed/cut out portions that align with an end of the screen receiver such that the screen received in the screen receiver does not contact the top cover. This arrangement allows the screen to be easily deployed and retracted without contacting the top cover.

The screen receiver 110, the elongate channel 140, elongate cover 170, and/or top cover 181 (and bottom cover) may be formed of metal, a thermoplastic resin, or a combination thereof. For example, in certain aspects, the screen receiver 110, the elongate channel 140, elongate cover 170, and/or top cover 181 (and bottom cover) may be formed of a molded thermoplastic/thermoplastic resin sufficient to withstand harsh weather conditions and the movements disclosed herein.

It should be further noted that the screen receiver 110 disclosed herein may be adapted to receive a screen keder through, for example, a C-shaped channel 111. However, the screen receiver 110 may have any desired predetermined shape (e.g., triangular, square, rectangular shape) that can receive screen 200 there through. As alluded to above, the screen receiver 110 may be adapted to receive a zipper interlock, a rope, a beaded chain, or any similar interlock 202 known in the art associated with the disclosed retractable screens.

Alternative Embodiment(s)

With reference to FIGS. 10-60 various alternative arrangements of motorized screen systems 10 having magnetic track assemblies 100 are presented. Some components of motorized screen system 10 having magnetic track assemblies 100 presented in FIGS. 10-60 are similar to those of motorized screen system 10 having magnetic track assemblies 100 presented in FIGS. 1-9 and therefore all of the teaching presented herein with respect to FIGS. 1-9 applies equally to and is incorporated into the teaching presented in FIGS. 10-60 unless specifically stated otherwise.

Housing:

In the arrangement shown, as one example, motorized screen system 10 having magnetic track assemblies 100 includes a housing 12. Housing 12 is formed of any suitable size, shape and design and is configured to house and hold various components of the system 10 so as to facilitate function of the system 10 as well as to provide an aesthetically pleasing appearance, as is further described herein. In the arrangement shown, as one example, housing 12 includes a rear member 14, a top member 16, a front member 18 and end caps 20 having bracket members 22 among other components, features and elements.

Rear Member:

In the arrangement shown, as one example, housing 12 includes a rear member 14. Rear member 14 is formed of any suitable size, shape and design and is configured to form a portion of housing 12 and enclose the rear side of housing 12. In the arrangement shown, as one example, rear member 14 is a generally planar shaped member that extends a length between opposing ends. In the arrangement shown, as one example, when housing 12 is installed in a rear-mount application, fasteners 204, such as screws or bolts or the like extend through rear member 14 and into the structure to which housing 12 is installed. In the arrangement shown, as one example, the upper end of rear member 14 connects to the rearward side of top member 16 and the outward ends of rear member 14 connect to end caps 20.

Top Member:

In the arrangement shown, as one example, housing 12 includes a top member 16. Top member 16 is formed of any suitable size, shape and design and is configured to form a portion of housing 12 and enclose the upper side of housing 12. In the arrangement shown, as one example, top member 16 is a generally planar shaped member that extends a length between opposing ends. In the arrangement shown, as one example, when housing 12 is installed in a top-mount application, fasteners 204, such as screws or bolts or the like extend through top member 16 and into the structure to which housing 12 is installed. In the arrangement shown, as one example, the rearward end of top member 16 connects to the upper end of rear member 14, the forward end of top member 16 connects to the upper end of front member 18 and the outward ends of top member 16 connect to end caps 20.

Front Member:

In the arrangement shown, as one example, housing 12 includes a front member 18. Front member 18 may also be referred to or known as in the industry as a fascia. Front member 18 is formed of any suitable size, shape and design and is configured to form a portion of housing 12 and enclose the front side of housing 12. In the arrangement shown, as one example, front member 18 is an elongated member that includes a generally planar portion that forms the upper front side of the front member 18 and a generally planar portion that forms the lower side of the front member 18. In the arrangement shown, the generally planar front portion and the generally planar lower portion extend in approximate perpendicular alignment to one another. In the arrangement shown, a curved corner section connects the lower end of the generally planar front portion and the forward end of the generally planar lower portion. However, any other shape is hereby contemplated for use as front member 18 such as a 90-degree corner section, which provides a different aesthetic appearance. In the arrangement shown, as one example, the upper end of front member 18 connects to the forward end of top member 16 and the outward ends of top member 16 connect to end caps 20.

In the arrangement shown, as one example, rear member 14, top member 16, front member 18 and end caps 20 may connect to one another using connection members 24, such as joints that facilitate the selective connection to and removal from one another. These connection members 24 may be formed of a joint, snap-fit arrangement, hinge, fastener, interlocking features, or any other arrangement of connecting two components together.

End Caps:

In the arrangement shown, as one example, housing 12 includes an end cap 20 positioned at each outward end of housing 12. End caps 20 are formed of any suitable size, shape and design and are configured to form a portion of housing 12 and enclose the outward ends of housing 12. In the arrangement shown, as one example, end caps 20 are generally planar shaped members that connect to the outward ends of rear member 14, top member 16 and front member 18 and enclose the outward ends of housing 12. In the arrangement shown, as one example, when housing 12 is installed in a side-mount application, fasteners 204, such as screws or bolts or the like extend through end caps 20 and into the structure to which housing 12 is installed. In the arrangement shown, as one example, the interior sides of end caps 20 include bracket members 22. Bracket members 22 are formed of any suitable size, shape and design and are configured to facilitate connection of roller tube assembly 26 to housing 12.

In the arrangement shown, as one example, once assembled housing 12 forms a hollow interior 28 that houses and holds roller tube assembly 26 therein. In the arrangement shown, as one example, an opening 30 is positioned between the rearward lower end of front member 18, the forward lower end of rear member 14 and the interior sides of end caps 20. This opening 30, which may also be referred to as a slot, allows for passage of screen 200 to pass there through while the screen 200 is opened and closed.

Any other size, shape, design and configuration is hereby contemplated for use as housing 12. In an alternative arrangement, no housing 12 is used and instead in this arrangement, roller tube assembly 26 is connected to and/or held in place by connection to end caps 20 and/or bracket members 22 alone without the use of rear member 14, top member 16 and/or front member 18.

Roller Tube Assembly:

In the arrangement shown, as one example, motorized screen system 10 having magnetic track assemblies 100 includes a roller tube assembly 26. Roller tube assembly 26 is formed of any suitable size, shape and design and is configured to connect to housing 12 as well as facilitate the connection to screen 200 to housing 12 while facilitating the opening and closing of screen 200.

In the arrangement shown, as one example, roller tube assembly 26 includes a roller tube 32. Roller tube 32 is formed of any suitable size, shape and design. In the arrangement shown, as one example, roller tube 32 is a generally elongated cylindrical member that extends a length between opposing ends 34. In the arrangement shown, as one example, connection members 36 extend outward from ends 34 and facilitate connection to collars 38 that fit over and connect to connection members 36.

In the arrangement shown, as one example, roller tube 32 and/or collars 38 have a generally cylindrical exterior surface of approximate equal diameter and shape and configuration. In the arrangement shown, as one example roller tube 32 and collars 38 include one or more receivers 40 on or in their exterior surface. Receivers 40 are formed of any suitable size, shape and design and are configured to facilitate connection of the upper end of screen 200 to roller tube assembly 26.

More specifically, in one arrangement receiver 40 is formed of the exact same or a similar shape to the C-shaped channel 111 of screen receiver 110 as is described herein with respect to screen receiver 110. In this arrangement, the upper end of screen 200 includes an interlock that is similar to, if not exactly the same as, the interlock 202 described herein that is present at the sides of screen 200 as is shown in FIGS. 1 and 2. This interlock at the upper end of screen 200 is slid into the receiver 40 of roller tube assembly 26, or more specifically, roller tube 32 and/or collars 38. When the interlock of the upper end of screen 200 is in place within the receiver 40 of roller tube assembly 26, the upper end of screen 200 is locked in place on roller tube assembly 26. As such, in this arrangement, when roller tube assembly 26 rotates in a first rotational direction the screen 200 wraps around the exterior surface of the roller tube assembly 26 thereby opening the screen 200, and when the roller tube assembly 26 rotates in a second rotational direction, opposite the first rotational direction, the screen 200 unwraps from around the roller tube assembly 26 thereby closing the screen 200.

To be clear, just like interlock 202 at the sides of screen 200, the interlock at the upper end of screen 200 may be formed of any form of an interlock including, but not limited to a keder interlock, a zipper interlock, a rope, a beaded chain, or any similar interlock known in the art associated with the disclosed retractable screens. Similarly, receiver 40 may be formed of any corresponding size, shape and design and is configured to receive and hold the interlock at the upper end of screen 200. In the arrangement shown, as one example, the interlock at the upper end of screen 200 is a rounded or generally cylindrical member when viewed from the side and the receiver 40 is a similarly shaped rounded or generally cylindrical opening in roller tube assembly 26 (roller tube 32 and collars 38) that connects to a slot that allows the passage of the screen 200 through the slot while retaining the interlock within the generally cylindrical opening in the roller tube assembly 26.

In the arrangement shown, as one example, two different shaped receivers 40 are shown in the exterior surface of roller tube 32 and collars 38. However, any number of receivers 40 are hereby contemplated for use in the exterior surface of roller tube 32 and collars 38 such as one, two, three, four, five, six or more. Alternatively, it is hereby contemplated that no receivers 40 are used and instead screen 200 is connected to roller tube assembly 26 by any other manner, method or means.

Also, in the arrangement shown, roller tube assembly 26 includes a hollow interior as well as a plurality of structural features that provide roller tube assembly 26 with structural rigidity while minimizing material usage and weight.

Motor Assembly:

In the arrangement shown, as one example, motorized screen system 10 having magnetic track assemblies 100 includes a motor assembly 42. Motor assembly 42 is formed of any suitable size, shape and design and is configured to facilitate motorized operation of motorized screen system 10.

Motor assembly 42 may be formed of any form of a motor and may be connected to roller tube assembly 26 in any manner that facilitates rotation of roller tube assembly 26. In the arrangement shown, as one example, motor assembly 42 is an electric motor that is positioned within the hollow interior of roller tube assembly 26 adjacent an end of roller tube assembly 26. Positioning motor assembly 42 within the hollow interior of roller tube assembly 26 provides a sleek arrangement wherein motor assembly 42 is contained within other components of the motorized screen system 10 thereby minimizing the size and space requirements for the system 10.

In one arrangement, as is shown, motor assembly 42 is a self-contained assembly including a motor, gear assembly, drive wheel and electronic controller assembly, among other components. In this self-contained assembly arrangement, with the installation of a single component, the motor assembly 42, within roller tube assembly 26 the system 10 is motorized which provides convenience, minimal installation, ease of use and an aesthetic appearance. In one arrangement, motor assembly 42 is controlled by wired control by passing control signals to the motor assembly 42 through a wired connection. In another arrangement, motor assembly 42 is controlled by wireless control by passing control signals to the motor assembly 42 through a wireless connection to an antenna connected to motor assembly. In another arrangement, motor assembly 42 is controlled by both wired control by passing control signals to the motor assembly 42 through a wired connection, as well as by wireless control by passing control signals to the motor assembly 42 through a wireless connection to an antenna connected to motor assembly.

In one arrangement, motor assembly 42 is connected to an external power source by a wired connection such as by connection to line power of a house or building thereby providing motor assembly 42 an unlimited power source. Alternatively, motor assembly 42 is connected to a battery power source, a solar module or solar cell, or any combination thereof such as connection to line power with battery back-up and a solar cell for recharging the batteries is hereby contemplated for use.

In the arrangement shown, as one example, once the roller tube assembly 26 is assembled, with motor assembly 42 therein, the roller tube assembly 26 is installed within the hollow interior 28 of housing 12. In doing so, the outward ends of roller tube assembly 26 are connected to the bracket members 22 of end caps 20 and the roller tube assembly 26 is able to rotate within the hollow interior 28 of housing 12 thereby raising and/or lowering the screen 200 through opening 30 thereby raising and/or lowering bottom bar 44 along with screen 200.

Figure 38:
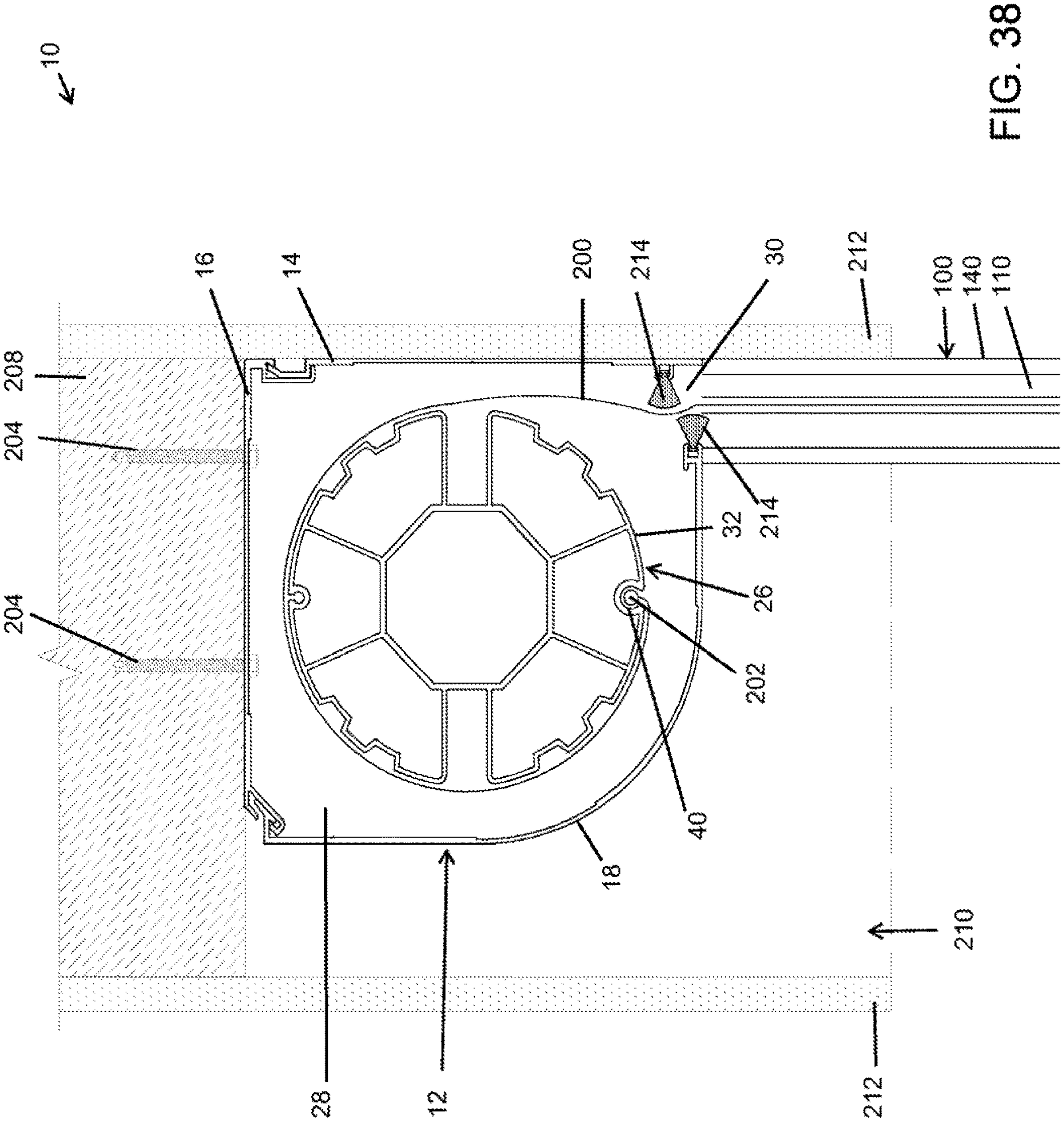
FIG. 38 is a side elevation view of the roller tube assembly positioned within the hollow interior of the housing of a motorized screen system having a magnetic track assembly as is shown in FIGS. 10-37; the view taken from the side as is shown in FIG. 36, the view showing a 5 & ½ housing with roller tube; the view showing the housing installed in the hollow interior of a pocket formed by walls that extend down from a frame member; the view showing the top member of housing 12 installed onto frame member 208 using a plurality of fasteners; the view showing the screen installed onto the roller tube by way of the insertion of an interlock positioned at the upper end of the screen material into a receiver in the exterior surface of the roller tube assembly thereby holding the upper end of the screen material to the roller tube; the view showing the screen material passing through the opening in the lower end of the housing adjacent the lower end of rear member and the lower rearward end of front member; the view showing a sealing member, which is shown as a piece of woolpile, on each side of the opening that seals the opening in the housing by engaging the screen material; the view showing the forward positioned sealing member connected to the lower rearward end of front member; the view showing the rearward positioned sealing member connected to the lower forward end of rear member; the view showing the screen material connected to the screen receiver positioned within the elongate channel of the magnetic track assembly as the screen material extends downward from the housing.
Figure 39:
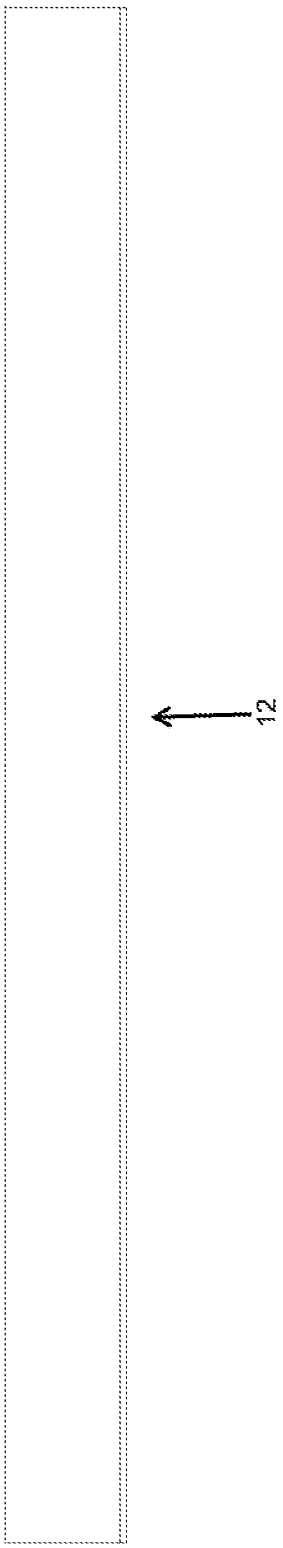
FIG. 39 is a top elevation view of the housing of a motorized screen system having a magnetic track assembly as is shown in FIGS. 10-38, the view showing a 7 inch housing with roller tube.
Figure 40:
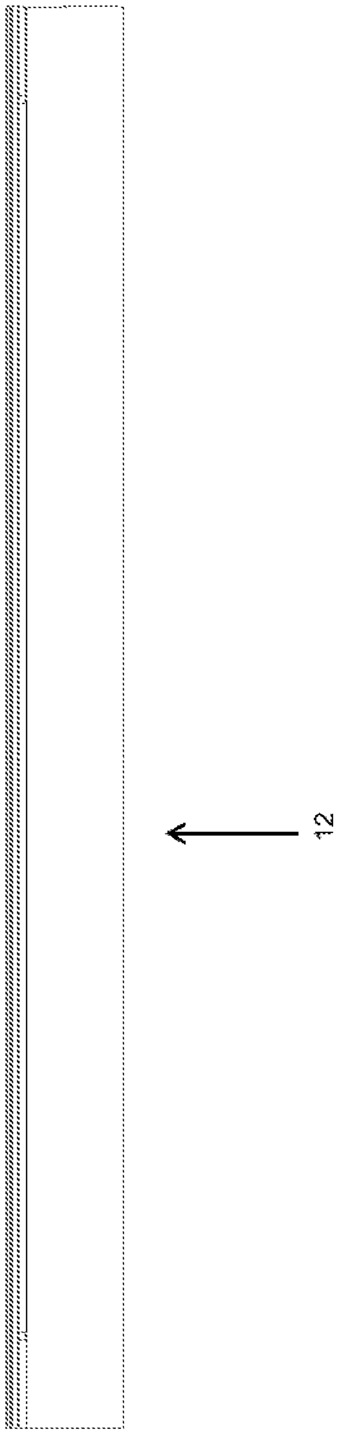
FIG. 40 is a bottom elevation view of the housing of a motorized screen system having a magnetic track assembly as is shown in FIGS. 10-39, the view showing a 7 inch housing with roller tube.
Figure 41:
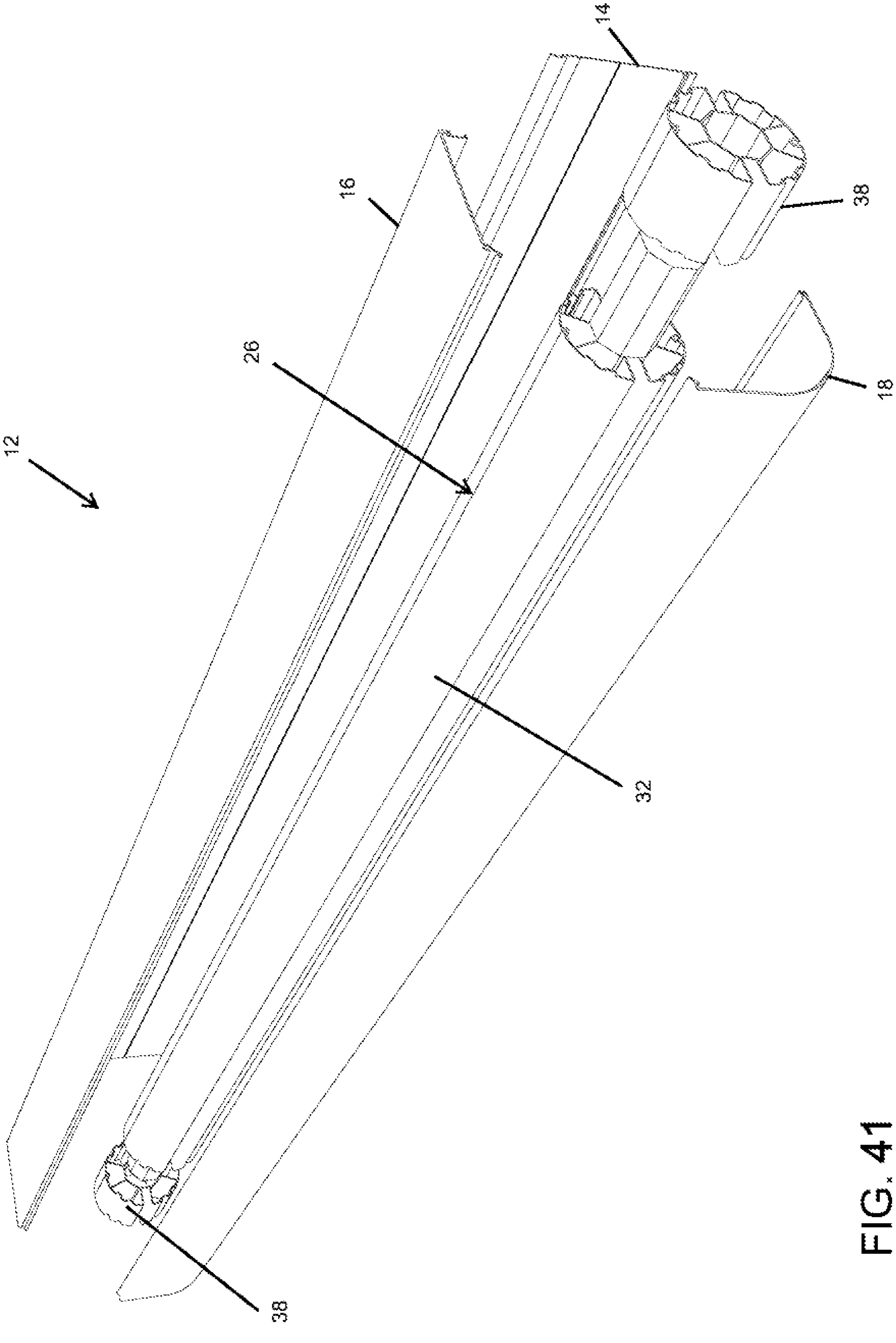
FIG. 41 is an exploded perspective view of a motorized screen system having a magnetic track assembly as is shown in FIGS. 10-40, the view showing a 7 inch housing with roller tube; the view showing the housing exploded with a rear member, top member and front member; the view showing a roller tube assembly positioned within the housing.
Figure 42:
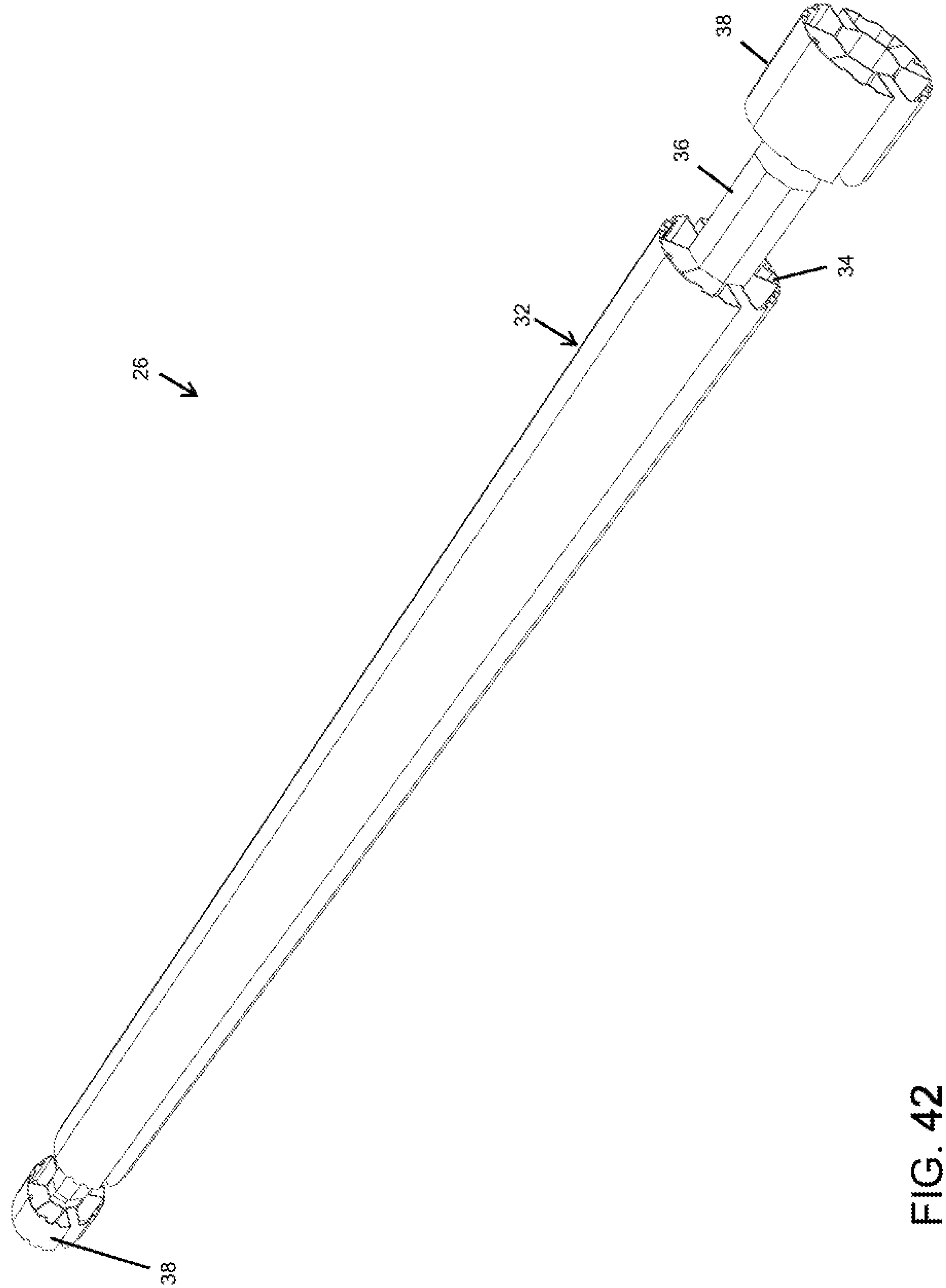
FIG. 42 is a perspective view of a motorized screen system having a magnetic track assembly as is shown in FIGS. 10-41, the view showing a roller tube assembly for a 7 inch housing; the view showing the collars (also known as doughnuts) exploded from the connection members of the roller tube assembly.
Figure 43:
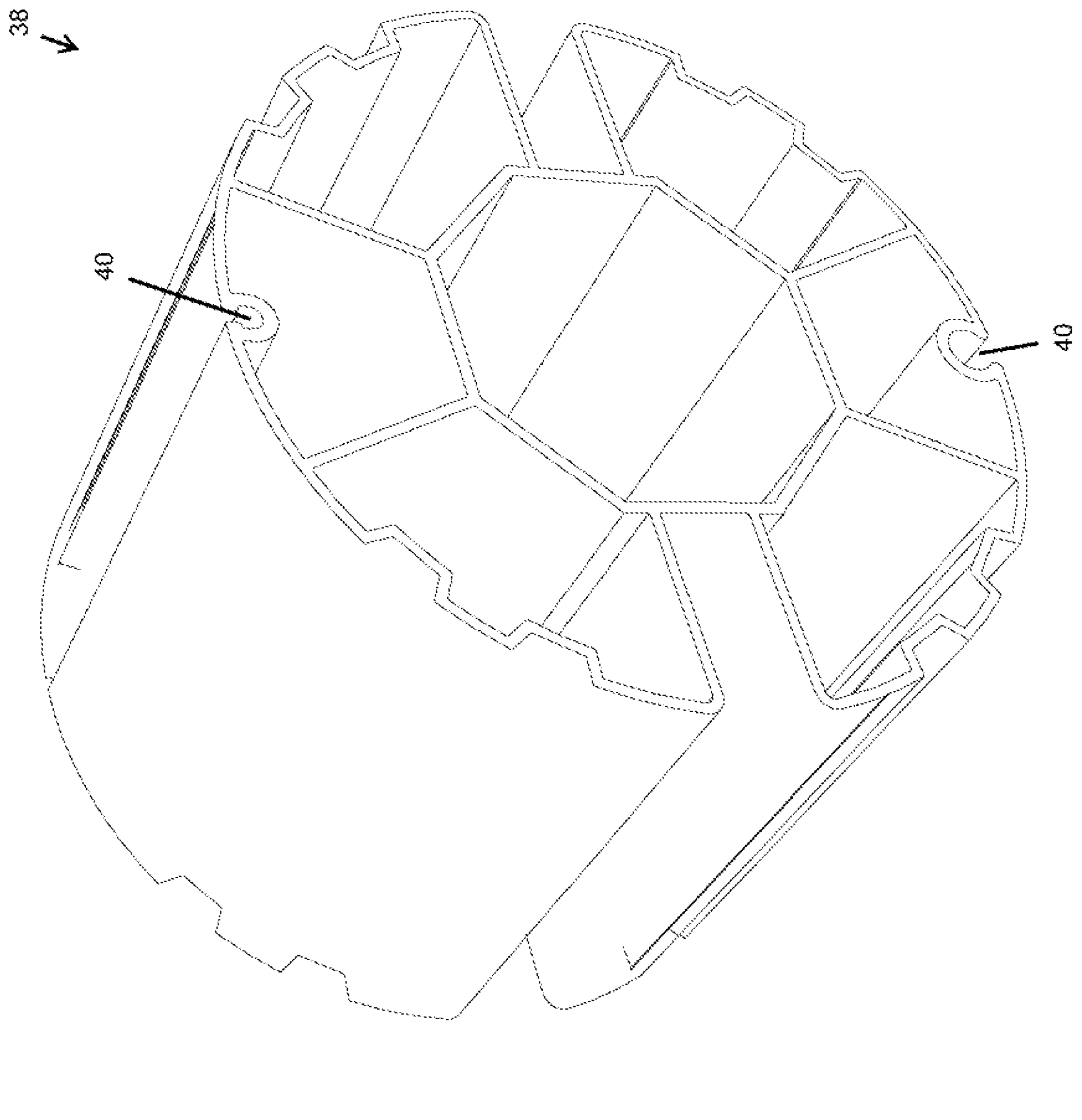
FIG. 43 is a perspective view of the collars (also known as doughnuts) of the roller tube assembly of a motorized screen system having a magnetic track assembly as is shown in FIGS. 10-42; the view showing a collar for use with a 7 inch housing.
Figure 44:
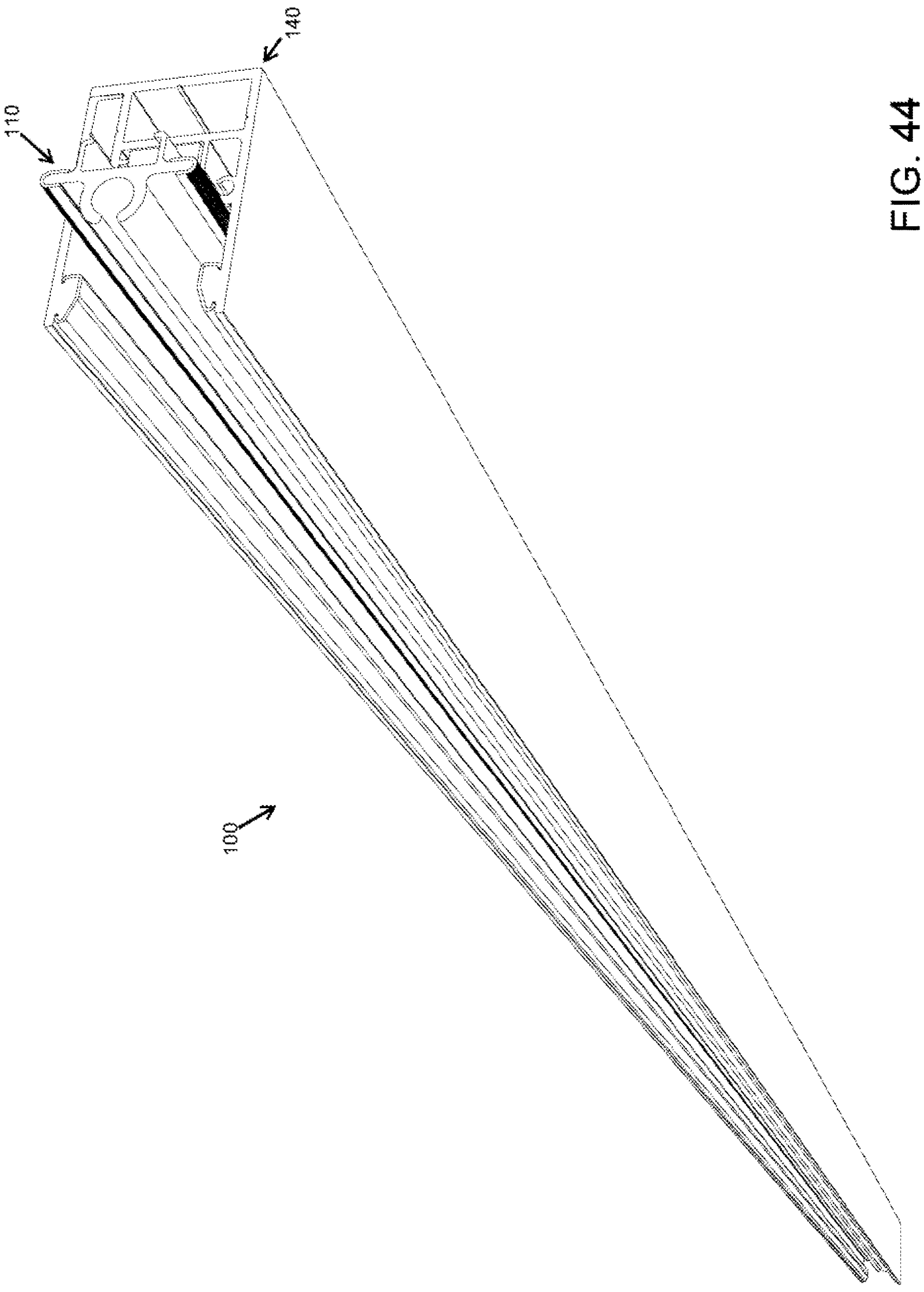
FIG. 44 is a perspective view of an assembled magnetic track assembly a motorized screen system having a magnetic track assembly as is shown in FIGS. 10-43; the view showing the screen receiver positioned within the compartment of an elongate channel.
Figure 45:
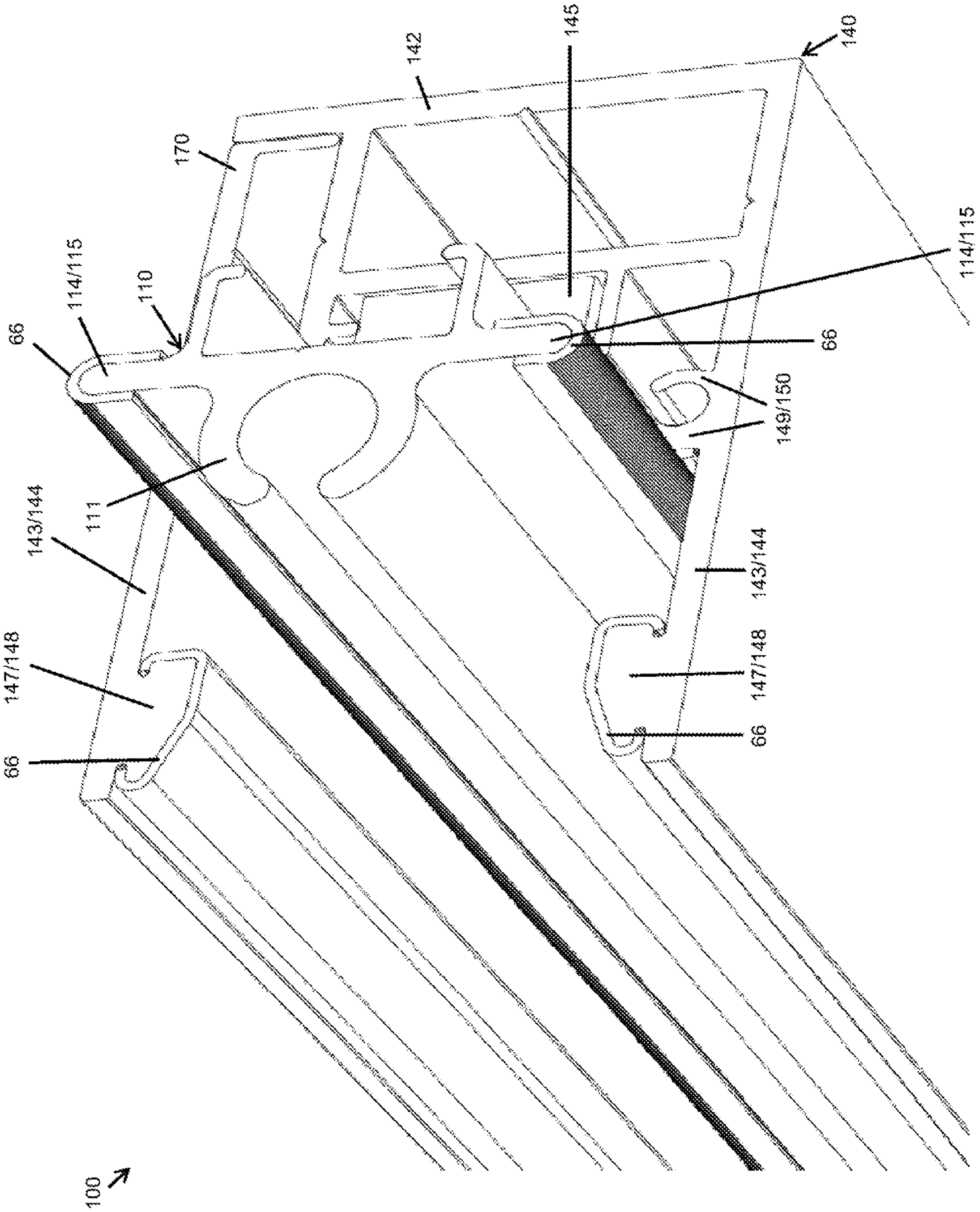
FIG. 45 is a close-up perspective view of an end of an assembled magnetic track assembly as is shown in FIG. 44; the view showing the screen receiver positioned within the compartment of an elongate channel; the view showing a liner positioned over inward most partitions, or front partitions; the view showing a liner positioned over the outward most partitions, or back partitions; the view showing a liner positioned over the outward ends of screen receiver.
Figure 46:
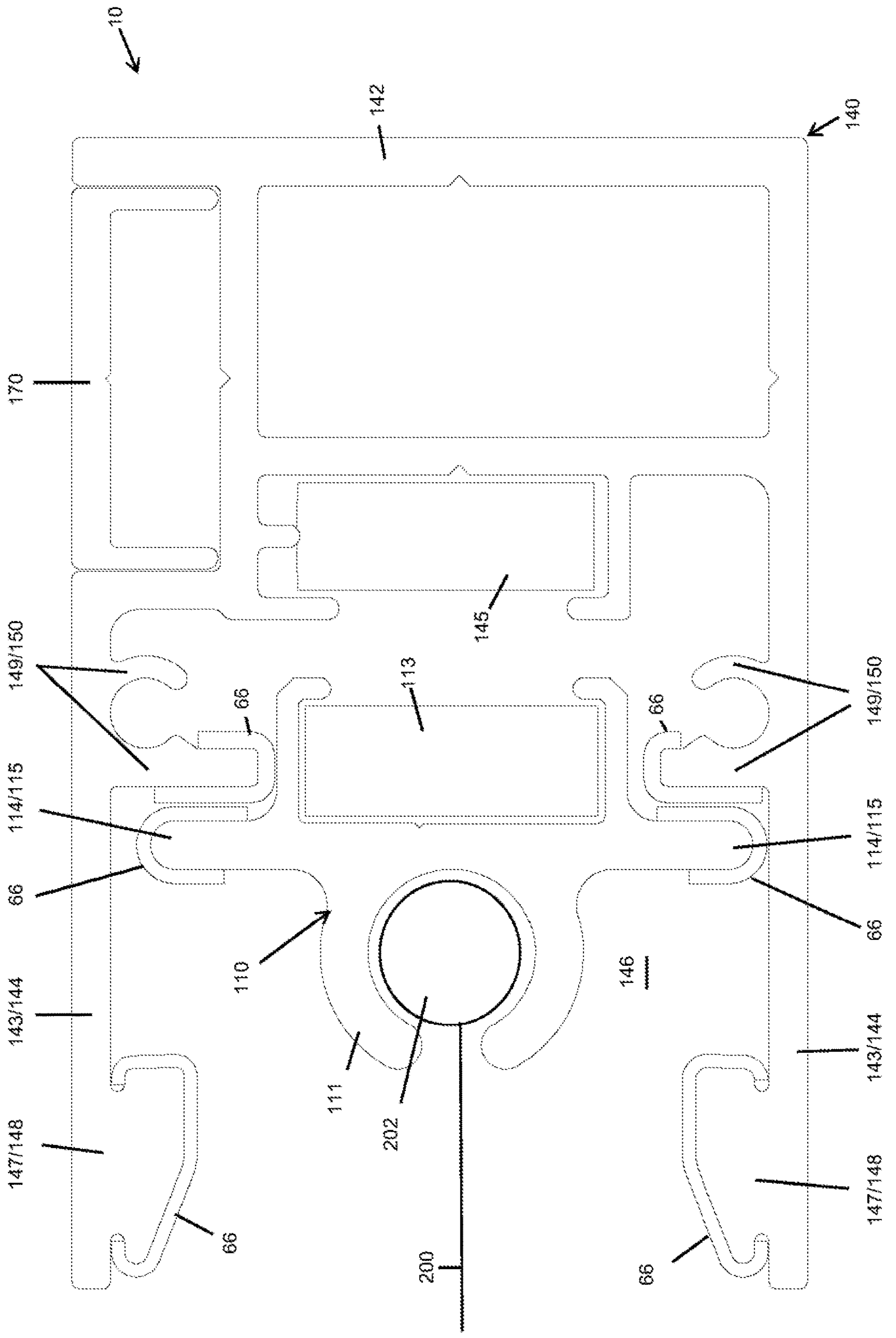
FIG. 46 is a close-up top elevation view of an end of an assembled magnetic track assembly as is shown in FIGS. 44 and 45; the view showing the screen receiver positioned within the compartment of an elongate channel; the view showing a liner positioned over inward most partitions, or front partitions; the view showing a liner positioned over the outward most partitions, or back partitions; the view showing a liner positioned over the outward ends of screen receiver; the view showing the screen receiver in a fully outward position with opposing magnets as close to one another as is allowable by the arrangement.
Figure 47:
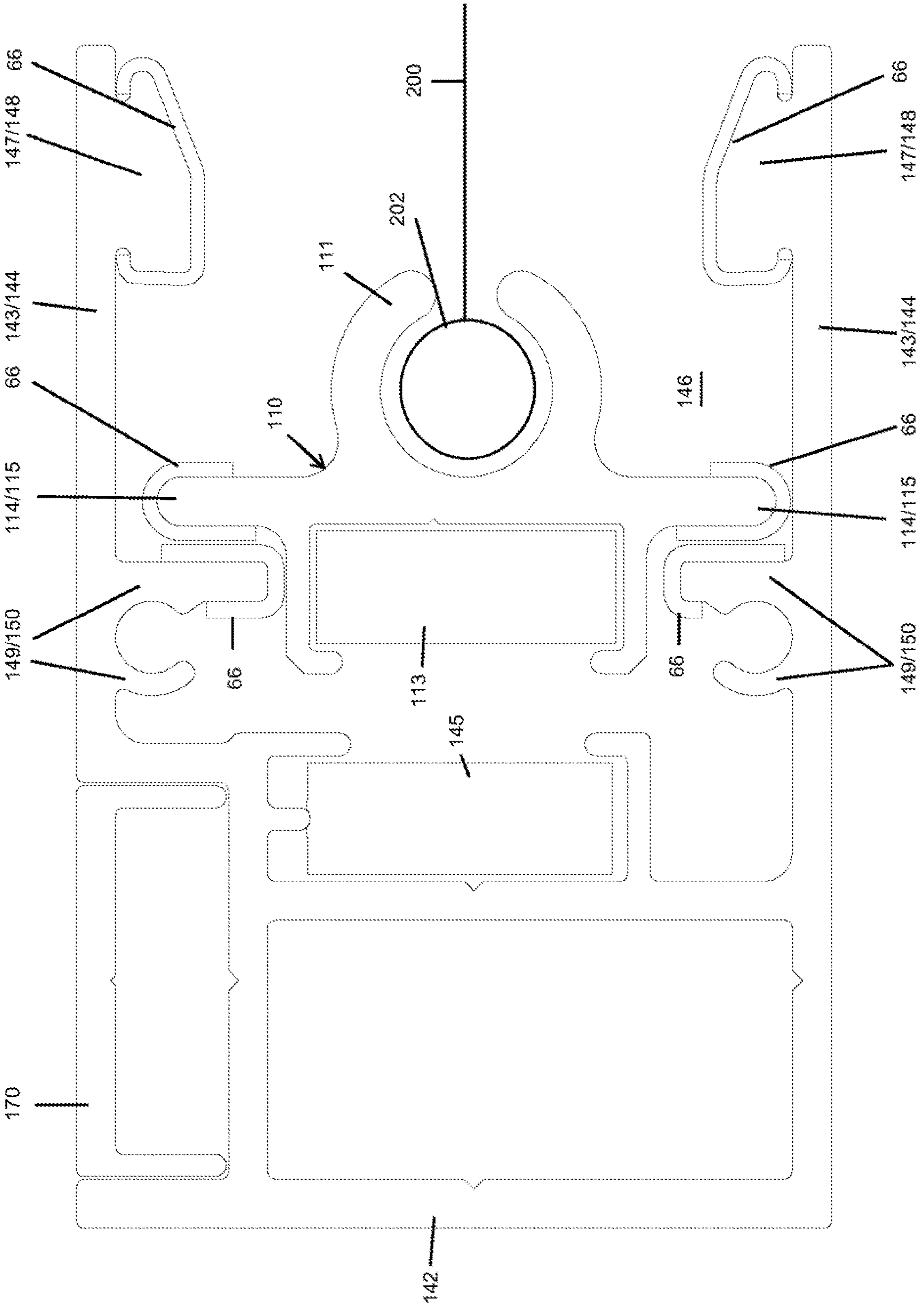
FIG. 47 is a close-up bottom elevation view of an end of an assembled magnetic track assembly as is shown in FIGS. 44 and 45; the view showing the screen receiver positioned within the compartment of an elongate channel; the view showing a liner positioned over inward most partitions, or front partitions; the view showing a liner positioned over the outward most partitions, or back partitions; the view showing a liner positioned over the outward ends of screen receiver; the view showing the screen receiver in a fully outward position with opposing magnets as close to one another as is allowable by the arrangement.
Figure 48:
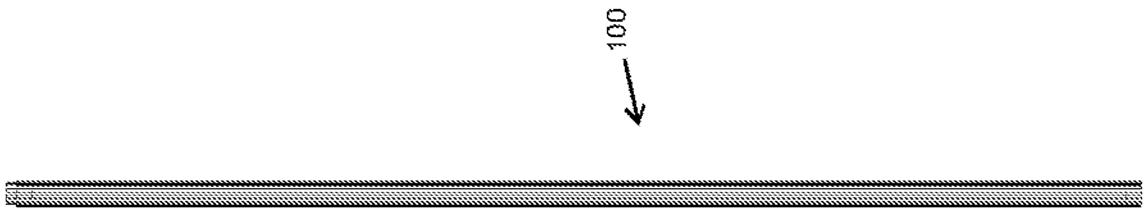
FIG. 48 is an elevation view an assembled magnetic track assembly as is shown in FIGS. 44-47; the view looking from inward to outward, the view showing the screen receiver positioned within the elongate channel.
Figure 49:
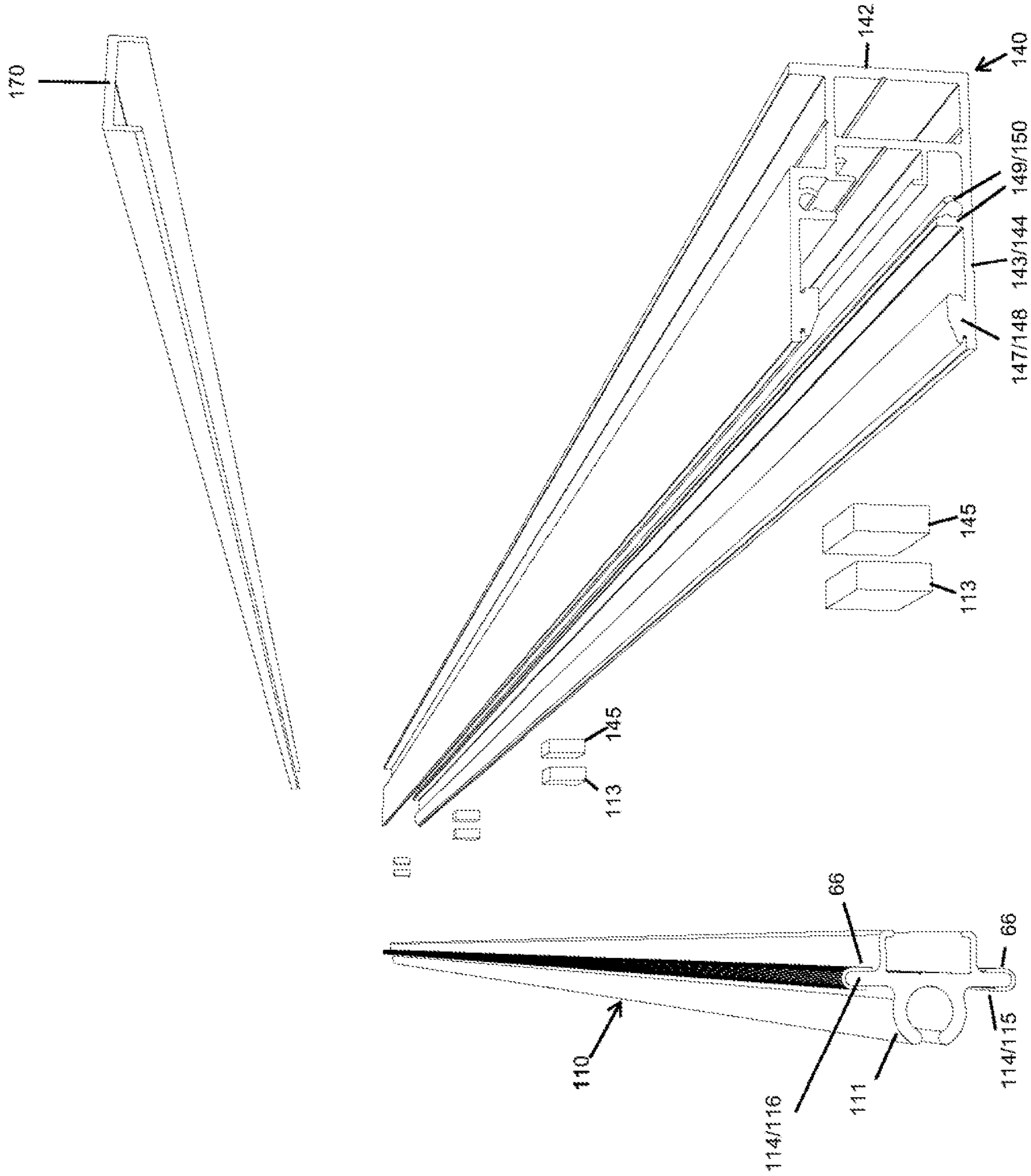
FIG. 49 is an exploded perspective view of a magnetic track assembly as is shown in FIGS. 44-48; the view showing the screen receiver positioned outside of the compartment of an elongate channel; the view showing a liner positioned over the outward ends of screen receiver.

With reference to FIG. 38, in the arrangement shown as one example, roller tube assembly 26 is shown positioned within the hollow interior 28 of the housing 12 of a motorized screen system 10 having a magnetic track assembly 100. In the arrangement shown, as one example, the housing 12 installed in the hollow interior of a pocket 210 formed by walls 212 that extend down on a forward side and a rearward side from a frame member 208 positioned at the upper side of housing 12. The view showing the top member 16 of housing 12 installed onto frame member 208 using a plurality of fasteners 204 that extend through top member 16 and into frame member 208. The view showing the screen 200 installed onto the roller tube 32 by way of the insertion of an interlock 202 positioned at the upper end of the screen material 200 and into a receiver 40 in the exterior surface of the roller tube 32 thereby holding the upper end of the screen material 200 to the roller tube 32. The view showing the screen material 200 passing through the opening 30 in the lower end of the housing 12 adjacent the lower end of rear member 14 of housing 12 and the lower rearward end of front member 18 of housing 12. The view showing a sealing member 214, which is shown as a piece of woolpile, on each side of the opening 30 that seals the opening 30 in the housing 12 by engaging the screen material 200. The view showing the forward positioned sealing member 214 connected to the lower rearward end of front member 18 of housing 12 and the rearward positioned sealing member 214 connected to the lower forward end of rear member 14. That is, as is shown, as one example, when woolpile is used as sealing member 214, outwardly extending fibers of the woolpile connected to the front member 18 of housing 12 brush and thereby seal the forward facing surface of screen material 200, while outwardly extending fibers of the woolpile connected to the rear member 14 of housing 12 brush and thereby seal the rearward facing surface of screen material 200. The view showing the screen material 200 connected to the screen receiver 110 positioned within the elongate channel 140 of the magnetic track assembly 10 as the screen material 200 extends downward from the housing 12.

Bottom Bar Assembly:

In the arrangement shown, as one example, motorized screen system 10 having magnetic track assemblies 100 includes a bottom bar assembly 44. Bottom bar assembly 44 is formed of any suitable size, shape and design and is configured to connect to the lower end of screen 200 while providing sufficient weight to the lower end of screen 200 to facilitate smooth opening and closing while also keeping the lower end of screen 200 flat and straight.

In the arrangement shown, as one example, bottom bar assembly 44 includes a bottom bar 46 that is formed of an elongated member that extends a length between opposing ends 48 and includes a hollow interior 50 that is configured to receive a weight bar 52 (not shown) therein that adds weight to the bottom bar assembly 44. The lower end of bottom bar 46 includes a channel 54 that is configured to receive and hold a sealing member 56 therein that is configured to seal the lower end of bottom bar 46 to the ground when the bottom bar 46 is in a fully lowered or closed position. Sealing member 56 may be formed of any device that facilitates a seal such as a piece of woolpile, a strip of foam, a rubber strip, or any form of a sealing member or other compressible member that helps to facilitate a seal when the bottom bar 46 is in a fully lowered position.

In the arrangement shown, as one example bottom bar assembly 44 includes a receiver 58. Receiver 58 is formed of any suitable size, shape and design and is configured to facilitate connection of the lower end of screen 200 to bottom bar assembly 44.

More specifically, in one arrangement receiver 58 is formed of the exact same or a similar shape to the C-shaped channel 111 of screen receiver 110, and/or the receiver 40 as is described herein with respect to screen receiver 110 and/or roller tube assembly 26, respectively. In this arrangement, the lower end of screen 200 includes an interlock that is similar to, if not exactly the same as, the interlock 202 described herein that is present at the sides of screen 200 as is shown in FIGS. 1 and 2, as well as the upper end of screen 200. This interlock at the lower end of screen 200 is slid into the receiver 58 of bottom bar assembly 44, or more specifically, bottom bar 46. When the interlock of the lower end of screen 200 is in place within the receiver 58 of bottom bar assembly 44, the lower end of screen 200 is locked in place on bottom bar assembly 44. As such, in this arrangement, when roller tube assembly 26 rotates in a first rotational direction the screen 200 wraps around the exterior surface of the roller tube assembly 26 thereby opening the screen 200 and raising the bottom bar assembly 44, and when the roller tube assembly 26 rotates in a second rotational direction, opposite the first rotational direction, the screen 200 unwraps from around the roller tube assembly 26 thereby closing the screen 200 and lowering the bottom bar assembly 44.

To be clear, just like interlock 202 at the sides of screen 200, the interlock at the lower end of screen 200 may be formed of any form of an interlock including, but not limited to a keder interlock, a zipper interlock, a rope, a beaded chain, or any similar interlock known in the art associated with the disclosed retractable screens. Similarly, receiver 58 may be formed of any corresponding size, shape and design and is configured to receive and hold the interlock at the lower end of screen 200. In the arrangement shown, as one example, the interlock at the lower end of screen 200 is a rounded or generally cylindrical member when viewed from the side and the receiver 58 is a similarly shaped rounded or generally cylindrical opening in bottom bar assembly 44 (or bottom bar 46) that connects to a slot that allows the passage of the screen 200 through the slot while retaining the interlock within the generally cylindrical opening in the bottom bar assembly 44.

In the arrangement shown, as one example, only a single receiver 58 shown in the bottom bar assembly 44. However, any number of receivers 58 are hereby contemplated for use in the bottom bar assembly 44 such as one, two, three, four, five, six or more. Alternatively, it is hereby contemplated that no receivers 58 are used and instead screen 200 is connected to bottom bar assembly 44 by any other manner, method or means.

In the arrangement shown, as one example, weight bar probes 60 are attached to the outward edges of the lower end of screen 200. These weight bar probes 60 are then inserted within the hollow interior 50 of bottom bar 46. In the arrangement shown, as one example, weight bar probes 60 include a slot 62 that receives the lower end of the interlock of screen 200 at the outward sides of screen 200. In the arrangement shown, as one example, weight bar probes 60 are tightened to screen 200 using fasteners 64 such as screws of bolts or the like thereby securing the weight bar probes 60 in place on the lower end of screen 200. In one arrangement, the attachment of weight bar probes 60 to the lower end of screen 200 helps to facilitate a tight and/or taut lower end of screen 200.

Figure 54:
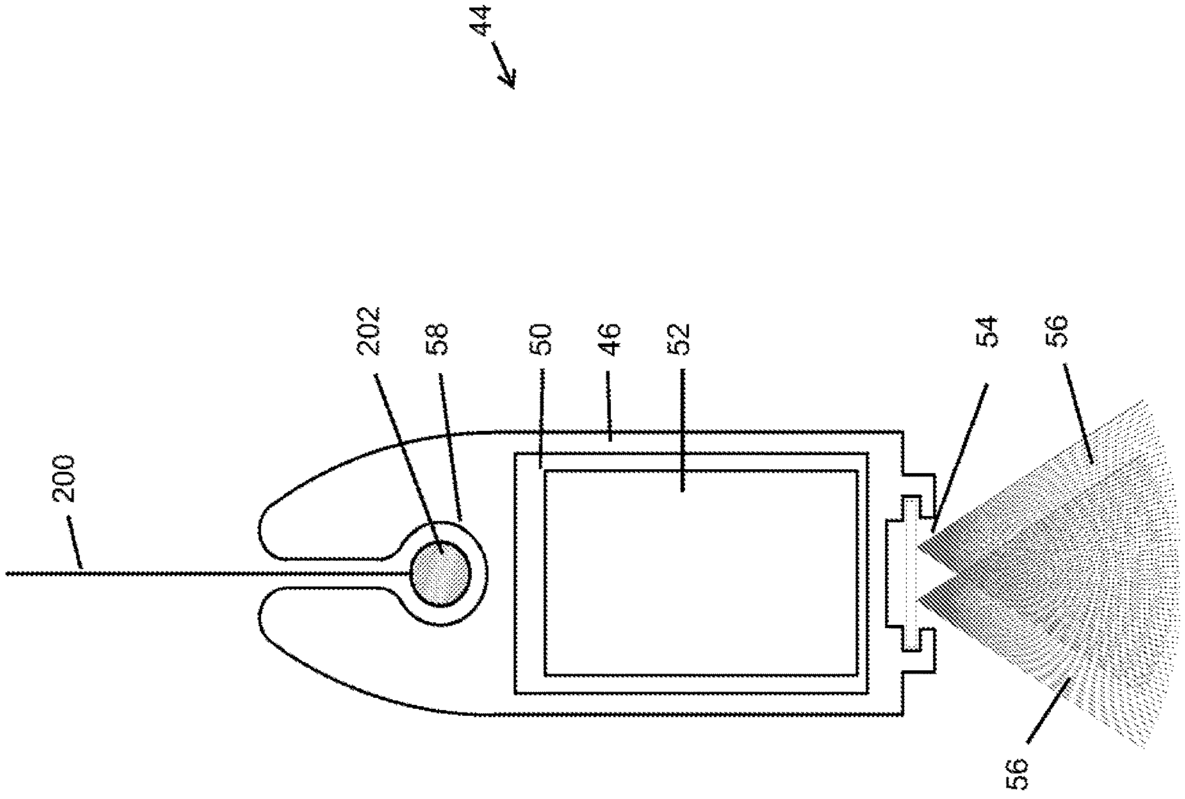
FIG. 54 is an elevation view of an end of the bottom bar shown in FIGS. 51-53; the view showing the weight bar positioned within the hollow interior of the bottom bar; the view showing an interlock of the screen material connected to the receiver in the upper end of the bottom bar; the view showing a sealing member, which is shown as woolpile, positioned within the channel in the lower end of the bottom bar that seals the lower end of the bottom bar when it is in a closed position.

With reference to FIG. 54, in the arrangement show, as one example, a weight bar 52 is positioned within the hollow interior 50 of the bottom bar 46 of bottom bar assembly 44. In the arrangement shown, as one example, an interlock 202 of the screen material 200 is connected to the receiver 58 in the upper end of the bottom bar 46. In the arrangement shown, as one example, a sealing member 56, which is shown as woolpile, is positioned within channel 54 in the lower end of the bottom bar 46 that seals the lower end of the bottom bar 46 when it is in a closed position.

Track Assemblies Having Elongate Channels, Screen Receivers and Liners:

In the arrangement shown, as one example, motorized screen system 10 having magnetic track assemblies 100 shown in FIGS. 10-49 are similar to that presented herein with respect to FIGS. 1-9. As such, as is mentioned herein, the all of the teaching presented with respect to FIGS. 1-9 applies to and is incorporated into what is shown in FIGS. 10-49, unless specifically stated otherwise.

Spacing of Magnets:

One difference between the arrangement shown in FIGS. 1-9 and that shown in FIGS. 10-49 is that the magnets 113, 145 are spaced at a closer distance to one another when the screen receiver 110 is at a fully inward position. In one arrangement, magnets 113, 145 are formed of a chrome plated neodymium magnet that are extremely powerful and have a useful life of over 400 years. While these chrome plated neodymium magnets work very well for use as magnets 113, 145, these chrome plated neodymium magnets are extremely expensive. As such, by placing magnets 113, 145 at a minimum distance between one another a greater amount of magnetic attraction is generated between opposing magnets 113, 145 as compared to spacing the magnets 113, 145 at a greater distance to one another. As more force may be generated between the two magnets 113, 145 by placing them closer together in a fully attracted position, less magnets 113, 145 may be used, or a greater distance may be placed between vertically spaced sets of magnets 113 145 along the vertical length of track assemblies 100. As less magnets 113, 145 may be used by placing the magnets 113, 145 closer together while still generating the same or similar attractive force this reduces the cost of the system 10 while not reducing functionality. Note, however, in some arrangements it is desirable to leave some space, even if it is a minimal space, between opposing magnets 113, 145 as this space, even a minimal space, provides a smoother release or break when force is applied to the screen 200.

One Magnet Place Opposite a Piece of Magnetic Material:

As another way to reduce the cost of magnets 113, 145, in an alternative arrangement, only a single magnet 113, 145 is used. That is, instead of having two magnets 113, 145 aligned with one another that attract toward one another with one magnet 113 attached to the screen receiver 110 and one magnet 145 attached with the elongate channel 140, only a single magnet 113, 145 is used. In this arrangement, a single magnet 113, 145 is attached to one of the screen receiver 110 or elongate channel 140 opposite a piece of magnetic material, such as a piece of ferrous material (such as steel, iron, or the like) attached to the other of the screen receiver 110 or elongate channel 140. In this arrangement, when the aligned magnet 113, 145 comes within close proximity of the piece of magnetic material (such as a piece of ferrous material such as steel, iron, or the like), the magnet 113, 145 and piece of magnetic material attract toward one another through magnetic attraction thereby providing the desired self-tightening of the screen 200 with the use of less magnets 113, 145.

In one arrangement, the piece of magnetic material is formed of the same size and shape as the opposing magnet 113, 145, the main difference being that the piece of magnetic material is not a magnet or is not permanently magnetized. As the piece of magnetic material is not a magnet, the cost of the piece of magnetic material is substantially less than magnet 113, 145

Notably, in one arrangement, the screen receiver 110 and elongate channel 140 are formed of a material that is non-magnetic in nature such as aluminum or a composite material such as plastic, fiberglass or the like that does not form a magnetic bond with a magnet. As such, the addition of the piece of magnetic material, aligned opposite with the position of the magnet 113, 145 on the other component, forms a track assembly 100 where the screen receiver 110 and elongate channel 140 are magnetically attracted to one another which facilitates the self-tightening of screen 200.

Using a combination of magnets 113, 145 and opposing magnetic materials, in one arrangement, the magnets 113, 145 are all connected to one of the screen receiver 110 or elongate channel 140 while the pieces of magnetic material are all connected to the other of the screen receiver 110 or elongate channel 140. In another arrangement, the magnets 113, 145 and pieces of magnetic material switch between being connected to the screen receiver 110 and the elongate channel 140. That is, in one arrangement, for each set of magnets 113, 145 and magnetic materials, the magnet 113, 145 and piece of magnetic material switch sides. Any other arrangement or combination is hereby contemplated for use, as is any combination of opposing magnets 113, 145 in some spots of the magnetic track assembly 100 (such as top, bottom or middle) and the use of magnets 113, 145 on one side and a piece of magnetic material on the other side. That is, as one example, the top and bottom of track assembly 100 have opposing magnets 113, 145 whereas between the top and bottom of track assembly 100 a magnet 113, 145 is on one side opposite a piece of magnetic material. Again, any combination or arrangement of magnets 113, 145 and magnetic materials is hereby contemplated for use Liner:

One of the substantial benefits of the motorized screen system 10 is that it allows the inward movement of the outward sides of screen 200 when a force is applied to the screen 200, such as when a strong wind blows upon screen 200, while also retaining a taut screen 200. This is accomplished by the unending and unrelenting magnetic attraction between screen receivers 110 and elongate channels 140. This unending and unrelenting magnetic attraction between screen receivers 110 and elongate channels 140 pulls screen receivers 110 outward and into elongate channels 140 thereby tightening screen 200.

In a natural state, the magnetic attraction between the magnets 113, 145 of screen receivers 110 and elongate channels 140 pulls the screen receivers outward and into the elongate channels 140 thereby pulling the sides of the screen 200 outward as well. In this outward most position, the outward ends 114, 115 of screen receiver 110 are directly engaged with the outward most partitions, or back partitions 149, 150. This engagement stops the outward movement of screen receivers 110. However, when a force is applied to screen 200, the force of the magnetic attraction between screen receiver 110 and elongate channel 140 is overcome and thereby pulling the screen receiver 110 inward or away from the end wall 142 of elongate channel 140 toward the inward most partitions, or front partitions 147, 148. This inward movement of screen receiver 110 continues until the outward ends 114, 115 of screen receiver 110 are directly engaged with the inward most partitions, or front partitions 147, 148. This engagement stops the inward movement of screen receivers 110.

The outward ends 114, 115 of screen receiver 110 remain engaged with the inward most partitions, or front partitions 147, 148 until the force on screen 200 reduces and the force of the magnetic attraction between screen receiver 110 and elongate channel 140 again pulls the screen receiver 110 into the elongate channel 140. This outward movement of screen receiver 110 continues until the outward ends 114, 115 of screen receiver 110 again are engaged with the outward most partitions, or back partitions 149 150, at which point the magnetic attraction between screen receiver 110 and elongate channel 140 continues to hold until another greater force is applied to screen 200.

This process repeats itself over and over again with screen receivers 110 moving laterally within compartment 146 between a fully outward position, wherein the outward ends 114, 115 of screen receiver 110 are directly engaged with the outward most partitions, or back partitions 149, 150, and a fully inward position, wherein the outward ends 114, 115 of screen receiver 110 engages the inward most partitions, or front partitions 147, 148. While it is desirable to allow for the inward movement of screen receivers 110 when a force is applied to the screen 200, each time the screen receiver 110 engages the inward most partitions or front partitions 147, 148 and each time the screen receiver 110 engages the outward most partitions or back partitions 149, 150 an undesirable noise is generated, such as a clicking or clacking or the like noise. On a blustery day, where screen 200 is repeatedly engaged by force or wind, this repeated noise can become very bothersome or annoying. This noise is exasperated or made worse in the arrangement when the screen receiver 110 and/or elongate channel 140 are formed of a metallic material, such as aluminum or the like. This metal-on-metal engagement between screen receiver 110 and the partitions 147, 148, 149 and 150 of elongate channel 140 can be sharp, high-pitched, and loud, especially when abrupt and/or fast movements of screen 200 occur.

In one arrangement as is shown, to alleviate or reduce this noise, all or a portion of inward most partitions, or front partitions 147, 148 and/or all or a portion of outward most partitions or back partitions 149, 150 are covered by a liner 66.

Liner 66 is formed of any suitable size, shape and design and is configured to reduce the noise generated when a force (such as wind) is applied to or removed from screen 200 thereby causing movement of screen receiver 110 within compartment 146 of elongated channel 140. More specifically, in one arrangement, liner 66 is configured to reduce the noise generated when the outward ends 114, 115 of screen receiver 110 engages the inward most partitions, or front partitions 147, 148. In another arrangement, liner 66 is configured to reduce the noise generated when the outward ends 114, 115 of screen receiver 110 engages the outward most partitions, or back partitions 149, 150. In yet another arrangement, liner 66 is configured to reduce the noise generated when the outward ends 114, 115 of screen receiver 110 engages the inward most partitions, or front partitions 147, 148 as well as when the outward ends 114, 115 of screen receiver 110 engages the outward most partitions, or back partitions 149, 150.

In one arrangement, liner 66 is formed of a noise-reducing non-metallic material such as rubber, plastic, synthetic rubber, fiberglass, an ultra-high molecular weight material (UHMW), a composite material, a foam material, a compressible material, or any combination thereof. In one arrangement, liner 66 is partially compressible, or is not as rigid as the metallic material that forms screen receiver 110 and/or elongate channel 140 (which includes partitions 147, 148, 149 and 150). In one arrangement, the presence of the non-metallic and/or partially compressible material of liner 66 positioned between the engaging screen receiver 110 and elongate channel 140 reduces the noise generated by eliminating the metal-on-metal contact and/or by decelerating the engagement between the engaging screen receiver 110 and elongate channel 140.

Liner on Inward Most Partitions or Front Partitions:

In the arrangement shown, as one example, a liner 66 is positioned to fit around all or a portion of inward most partitions, or front partitions 147, 148. In this arrangement, liner 66 extends in a generally continuous manner along the vertical length of inward most partitions or front partitions 147, 148 which themselves extend all or a portion of the length of elongate channel 140. In the arrangement shown, as one example, the outward facing surface of inward most partitions or front partitions 147, 148 (the portion that faces screen receiver 110 when screen receiver is positioned within compartment 146) is generally flat and flush and in planar spaced relation to the inward facing surface of the outward ends 114, 115 of screen receiver 110. This causes a flat and flush engagement between the inward facing surface of the outward ends 114, 115 of screen receiver 110 and the outward facing surface of inward most partitions or front partitions 147, 148 which serves as an abrupt stop-surface to the inward motion of screen receiver 110.

This abrupt stop is good for setting a defined stop-point for the inward motion of screen receiver 110, as well as being good for allowing for a clean release once the force on screen 200 subsides (thereby allowing screen receiver 110 to return to a fully outward and taut position). However, this abrupt stop causes the generation of loud noise (or louder than may be desirable) when it occurs.

When this engagement occurs, with liner 66 between inward facing surface of the outward ends 114, 115 of screen receiver 110 and the outward facing surface of inward most partitions or front partitions 147, 148, the noise is greatly reduced due to the elimination of metal-on-metal contact, slowed deceleration, a muffling effect, among other physical principals. The slightly slowed deceleration can also have an effect of reducing the wear and tear on the components of the system 10, such as screen 200, screen receiver 110, elongate channel 140 and the like.

It is worth noting that while the outward facing surfaces of inward most partitions or front partitions 147, 148 are generally flat, the inward facing surfaces are angled. That is, in the arrangement shown, the outward facing surfaces of inward most partitions or front partitions 147, 148 are generally perpendicular to the vertical length of track assemblies 100, compartment 146 and screen receiver 110. These flat and perpendicular surfaces facilitate a clear, defined and clean stop surface for screen receiver 110 when it moves inward. In contrast, the inward facing surfaces of inward most partitions or front partitions 147, 148 are generally angled inward toward the center of the hollow interior of compartment 146 positioned within elongate channel 140. These angled surfaces, or chamfered surfaces help facilitate the insertion of screen receiver 110 within the compartment 146 within elongate channel 140.

As is described further herein, screen receiver 110 may be inserted within compartment 146 after the elongate channel 140 is installed by rotating screen receiver 110 at an angle to elongate channel 140 and moving screen receiver 110 within compartment 146. The angled interior facing surfaces of inward most partitions or front partitions 147, 148 help to facilitate this insertion. Once screen receiver 110 is positioned within compartment 146 of elongate channel 140 the screen receiver 110 is again rotated back to be in parallel alignment with the elongate channel 140. In this position, the outward facing surfaces of inward most partitions or front partitions 147, 148 prevent the escape of screen receiver 110 from the compartment 146 of elongate channel 140.

In the arrangement shown, as one example, liner 66 fits around and is frictionally held in place around the inward most partitions or front partitions 147, 148 through the dimensions, shape and tolerances of liner 66 and inward most partitions or front partitions 147, 148. In the arrangement shown, as one example, liner 66 is formed of a generally slender layer of material, that is of generally consistent shape or thickness that extends from an inward end to an outward end. In the arrangement shown, as one example, a groove is positioned at the intersection of the interior-facing surface of parallel side walls 143, 144 and inward most partitions or front partitions 147, 148. In the arrangement shown, as one example, the inward end and outward end of liner 66 is received with or engages these grooves thereby frictionally holding liner 66 onto inward most partitions or front partitions 147, 148. Any other manner, method or means of connecting two components together is hereby contemplated for use between inward most partitions or front partitions 147, 148 and liner 66 such as the use of adhesives, fasteners, snap-fit features, over-molding or any other manner, method or means.

Liner on Outward Most Partitions or Rear Partitions:

In the arrangement shown, as one example, a liner 66 is positioned to fit around all or a portion of outward most partitions, or back partitions 149, 150. In this arrangement, liner 66 extends in a generally continuous manner along the vertical length of outward most partitions, or back partitions 149, 150 which themselves extend all or a portion of the length of elongate channel 140. In the arrangement shown, as one example, the inward facing surface of outward most partitions, or back partitions 149, 150 (the portion that faces screen receiver 110 when screen receiver is positioned within compartment 146) is generally flat and flush and in planar spaced relation to the outward facing surface of the outward ends 114, 115 of screen receiver 110. This causes a flat and flush engagement between the outward facing surface of the outward ends 114, 115 of screen receiver 110 and the inward facing surface of outward most partitions, or back partitions 149, 150 which serves as an abrupt stop-surface to the outward motion of screen receiver 110.

This abrupt stop is good for setting a defined stop-point for the outward motion of screen receiver 110, as well as being good for allowing for a clean release once the force on screen 200 is applied (thereby allowing screen receiver 110 to move inward). However, this abrupt stop causes the generation of loud noise (or louder than may be desirable) when it occurs.

When this engagement occurs, with liner 66 between outward facing surface of the outward ends 114, 115 of screen receiver 110 and the inward facing surface of outward most partitions, or back partitions 149, 150, the noise is greatly reduced due to the elimination of metal-on-metal contact, slowed deceleration, a muffling effect, among other physical principals. The slightly slowed deceleration can also have an effect of reducing the wear and tear on the components of the system 10, such as screen 200, screen receiver 110, elongate channel 140 and the like.

In the arrangement shown, as one example, liner 66 fits around and is frictionally held in place around the outward most partitions, or back partitions 149, 150 through the dimensions, shape and tolerances of liner 66 and outward most partitions, or back partitions 149, 150. In the arrangement shown, as one example, liner 66 is formed of a generally slender layer of material, that is of generally consistent shape or thickness that extends from an inward end to an outward end. In the arrangement shown, as one example, the liner reaches around a portion of outward most partitions, or back partitions 149, 150 thereby frictionally holding itself upon outward most partitions, or back partitions 149, 150. Any other manner, method or means of connecting two components together is hereby contemplated for use between outward most partitions, or back partitions 149, 150 and liner 66 such as the use of adhesives, fasteners, snap-fit features, over-molding or any other manner, method or means.

Liner on Outward Ends of Screen Receiver:

In the arrangement shown, as one example, a liner 66 is positioned to fit around all or a portion of outward ends 114, 115 of screen receiver 110. This includes all or a portion of the inward facing surface of outward ends 114, 115 of screen receiver 110 and/or all or a portion of the outward facing surface of outward ends 114, 115 of screen receiver 110. In this arrangement, liner 66 extends in a generally continuous manner along the vertical length of the outward ends 114, 115 of screen receiver 110 which themselves extend all or a portion of the length of screen receiver 110.

In the arrangement shown, as one example, the inward facing side and outward facing side of the outward ends 114, 115 of screen receiver 110 includes a generally flat surface and rounded ends. The generally flat inward facing surface of the outward ends 114, 115 of screen receiver 110 is configured to engage the generally flat outward facing surface of inward most partitions or front partitions 147, 148 when screen receiver 110 is in a fully inward position (such as when a force is applied to screen 200). The generally flat outward facing surface of the outward ends 114, 115 of screen receiver 110 is configured to engage the generally flat inward facing surface of outward most partitions or back partitions 149, 150 when screen receiver 110 is in a fully outward position (such as when no force is applied to screen 200).

This causes a flat and flush engagement between the outward facing surface of the outward ends 114, 115 of screen receiver 110 and the inward facing surface of outward most partitions, or back partitions 149, 150 which serves as an abrupt stop-surface to the outward motion of screen receiver 110. This causes a flat and flush engagement between the inward facing surface of the outward ends 114, 115 of screen receiver 110 and the outward facing surface of inward most partitions or front partitions 147, 148 which serves as an abrupt stop-surface to the inward motion of screen receiver 110.

This abrupt stop is good for setting a defined stop-point for the outward motion as well as the inward motion of screen receiver 110, as well as being good for allowing for a clean release once the forces change. However, this abrupt stop causes the generation of loud noise (or louder than may be desirable) when it occurs.

When this engagement occurs, with liner 66 between outward facing surface and/or inward facing surface of the outward ends 114, 115 of screen receiver 110, the noise is greatly reduced due to the elimination of metal-on-metal contact, slowed deceleration, a muffling effect, among other physical principals. The slightly slowed deceleration can also have an effect of reducing the wear and tear on the components of the system 10, such as screen 200, screen receiver 110, elongate channel 140 and the like.

In the arrangement shown, as one example, liner 66 fits around and is frictionally held in place around the outward ends 114, 115 of screen receiver 110 through the dimensions, shape and tolerances of liner 66 and outward ends 114, 115 of screen receiver 110. In the arrangement shown, as one example, liner 66 is formed of a generally slender layer of material, that is of generally consistent shape or thickness that extends from an inward end to an outward end. In the arrangement shown, as one example, the liner reaches around a portion of outward ends 114, 115 of screen receiver 110 thereby frictionally holding itself upon outward ends 114, 115 of screen receiver 110. Any other manner, method or means of connecting two components together is hereby contemplated for use between outward ends 114, 115 of screen receiver 110 and liner 66 such as the use of adhesives, fasteners, snap-fit features, over-molding or any other manner, method or means.

Various Arrangements and Combinations of Liners:

Various liners 66 have been described herein. These liners 66 have been described as being positioned to fit around all or a portion of inward most partitions, or front partitions 147, 148, around all or a portion of outward most partitions, or back partitions 149, 150, and/or around all or a portion of outward ends 114, 115 of screen receiver 110. Any combination of these liners 66 are hereby contemplated for use. As one example, it is hereby contemplated for use that liners 66 may only be used in association with inward most partitions, or front partitions 147, 148. As another example, it is hereby contemplated for use that liners 66 may only be used in association with outward most partitions, or back partitions 149, 150. As another example, it is hereby contemplated for use that liners 66 may only be used in association with outward ends 114, 115 of screen receiver 110.

In one arrangement, only one of screen receiver 110 and inward most partitions, or front partitions 147, 148 or outward most partitions, or back partitions 149, 150 include a liner 66 thereon when engagement occurs. This is desirable as this reduces the noise generated as one layer of liner 66 is positioned between the metal components of screen receiver 110 and elongate channel 140.

Figure 14:
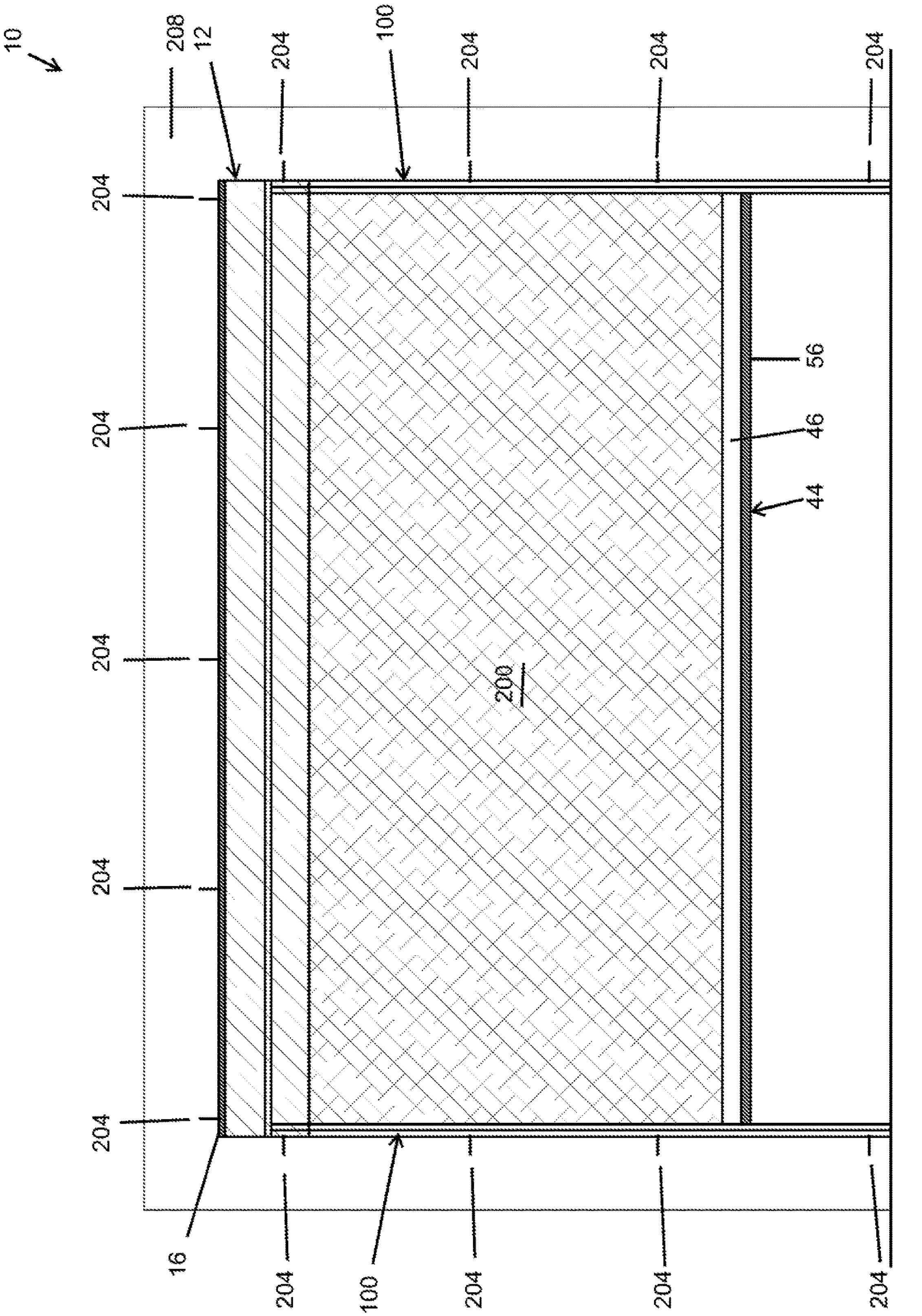
FIG. 14 is a front elevation view of an assembled motorized screen system having a magnetic track assembly as is shown in FIGS. 10-13; the view showing a housing positioned at the upper end of the motorized screen system; the view showing a screen deployed approximately three-quarters of the way to the fully closed position; the view showing a pair of magnetic track assemblies having elongate channels and screen receivers therein positioned adjacent the outward sides of the screen; the view showing a bottom bar assembly connected to the lower end of the screen; the view showing the housing and the magnetic track assemblies installed into a frame member positioned around the motorized screen system having a magnetic track assembly.

In another arrangement, both of screen receiver 110 and inward most partitions, or front partitions 147, 148 or outward most partitions, or back partitions 149, 150 include a liner 66 thereon when engagement occurs. This is desirable as this reduces the noise generated as two layers of liner 66 are positioned between the metal components of screen receiver 110 and elongate channel 140. This arrangement may reduce the noise generated more than only having a single layer of liner 66 as two layers of liners 66 engage one another. With reference to FIG. 14 in the arrangement shown, as one example, a front elevation view of an assembled motorized screen system 10 having a magnetic track assembly 100 having housing 12 positioned at the upper end of the motorized screen system 10 is presented. The view shows a screen 200 deployed approximately three-quarters of the way to the fully closed position. The view shows a pair of magnetic track assemblies 100 having elongate channels 140 and screen receivers 110 therein positioned adjacent the outward sides of the screen 200. The view shows a bottom bar assembly 44 connected to the lower end of the screen 200. The view shows the housing 12 and the magnetic track assemblies 100 installed into a frame member 208 positioned around the motorized screen system 10 by a plurality of fasteners 204. That is, a plurality of fasteners 204 are passed through elongate channels 140 and into the frame members 208 positioned at the sides of motorized screen system 10. That is, a plurality of fasteners 204 are passed through top member 16 of housing 12 and into the frame member 208 positioned at the top side of motorized screen system 10. The view showing the screen material as a single piece of screen material that is consistent from housing 12 to bottom bar 46, and from side to side.

Figure 15:
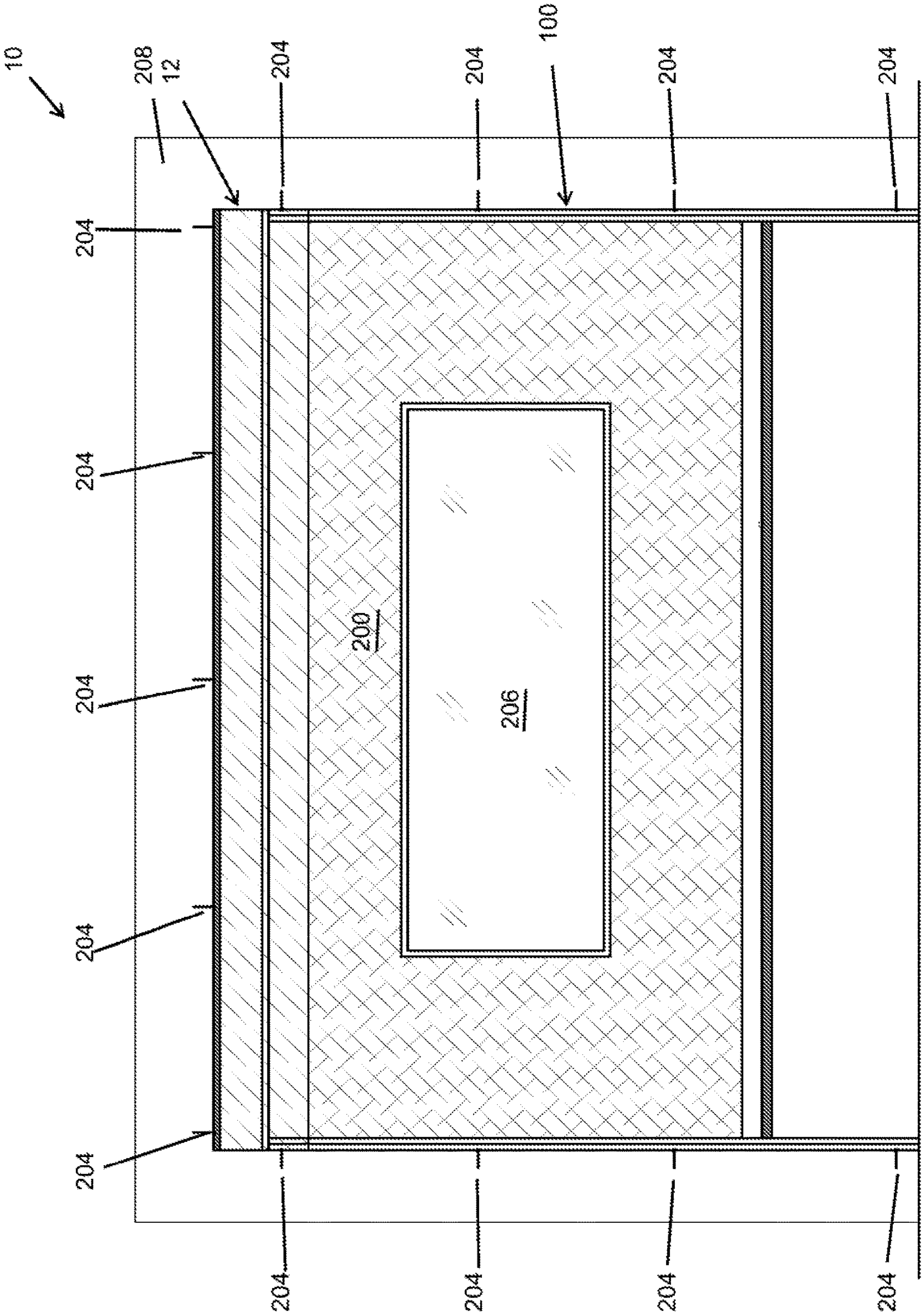
FIG. 15 is a front elevation view of an assembled motorized screen system having a magnetic track assembly as is shown in FIGS. 10-14; the view showing a housing positioned at the upper end of the motorized screen system; the view showing a screen deployed approximately three-quarters of the way to the fully closed position; the view showing a pair of magnetic track assemblies having elongate channels and screen receivers therein positioned adjacent the outward sides of the screen; the view showing a bottom bar assembly connected to the lower end of the screen; the view showing the housing and the magnetic track assemblies installed into a frame member positioned around the motorized screen system having a magnetic track assembly; the view showing a window positioned within the screen.
Figure 16:
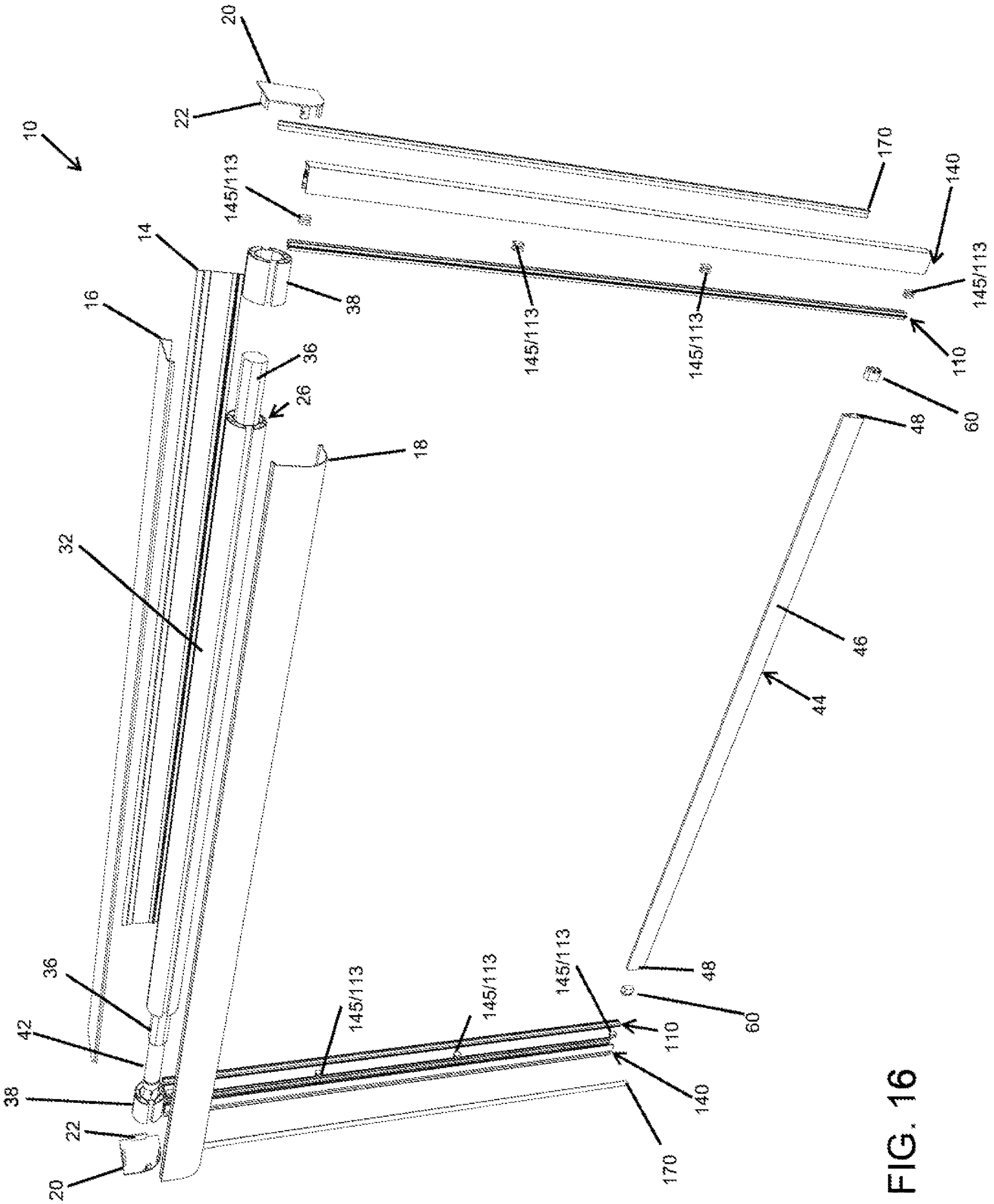
FIG. 16 is front perspective exploded view of a motorized screen system having a magnetic track assembly as is shown in FIGS. 10-15; the view showing a housing positioned at the upper end of the motorized screen system the housing having a rear member, a top member, a front member and end caps having bracket members; the view showing a pair of magnetic track assemblies having elongate channels and screen receivers positioned adjacent the outward sides of the screen; the view showing a bottom bar assembly configured to connect to the lower end of the screen; the view showing a roller assembly having a roller tube and a motor assembly configured to be positioned within the hollow interior of the housing.
Figure 17:
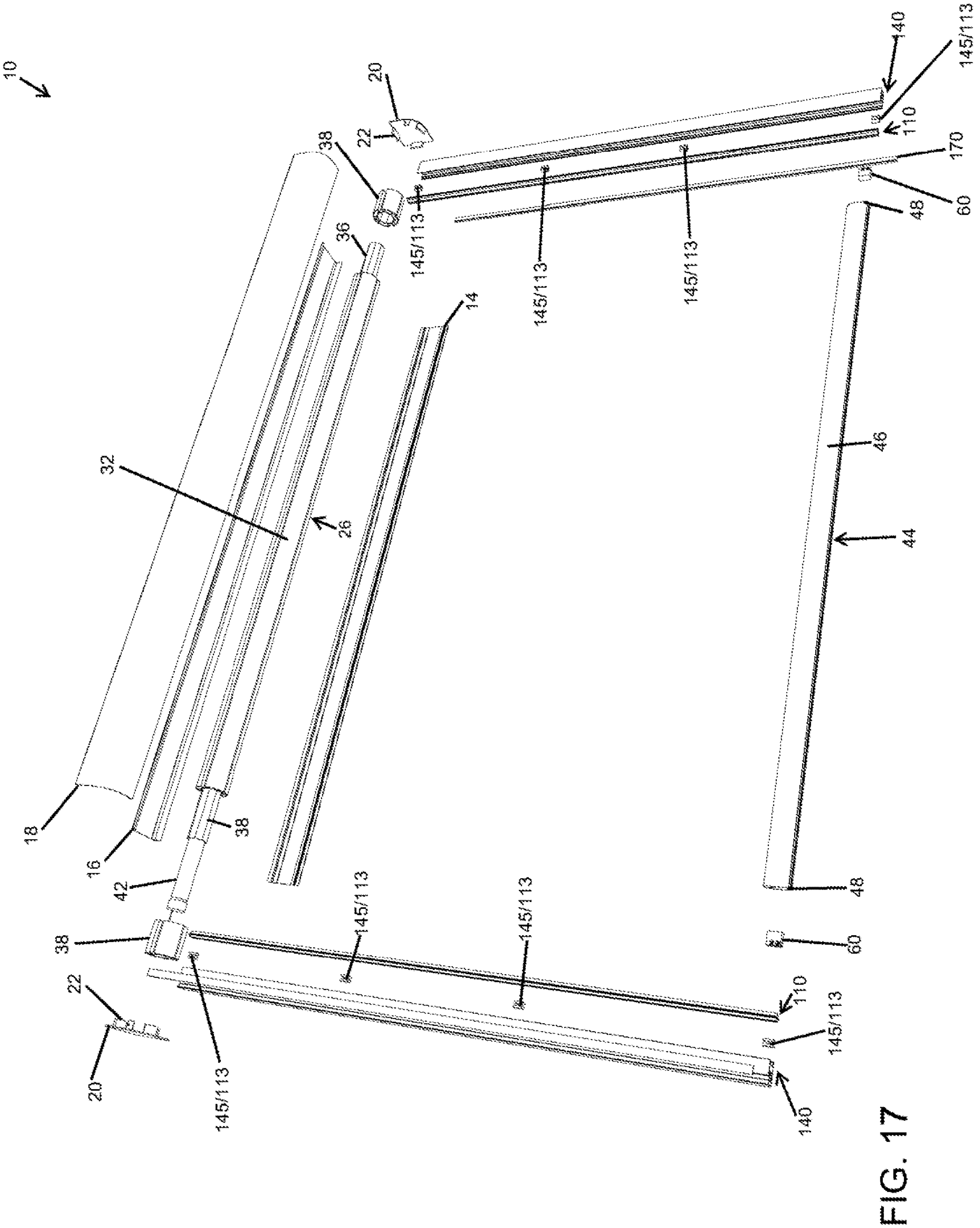
FIG. 17 is another front perspective exploded view of a motorized screen system having a magnetic track assembly as is shown in FIGS. 10-16.
Figure 18:
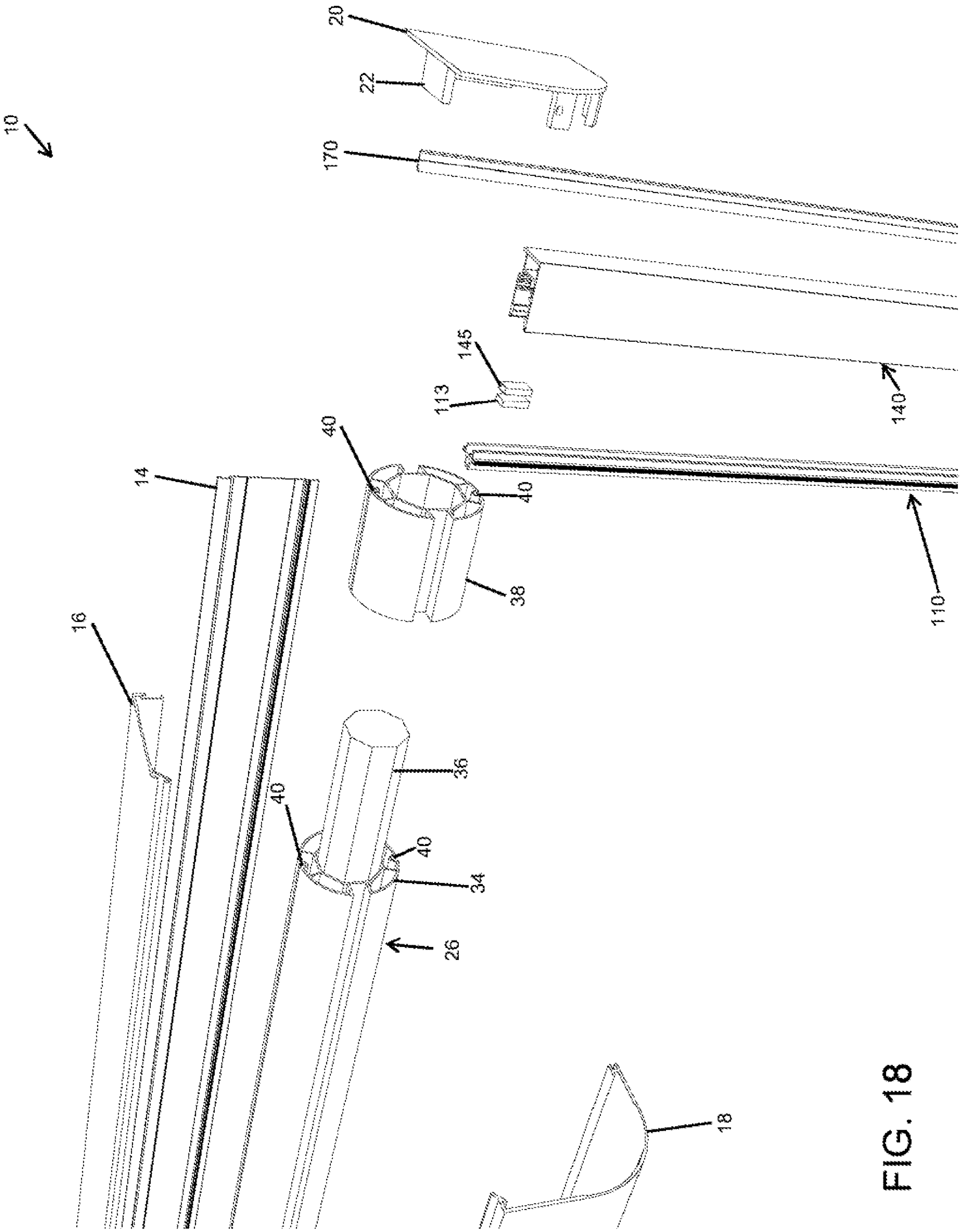
FIG. 18 is a close-up perspective exploded view of a motorized screen system having a magnetic track assembly as is shown in FIGS. 10-17; the view showing a close-up of the upper right hand corner of the FIG. 16.
Figure 19:
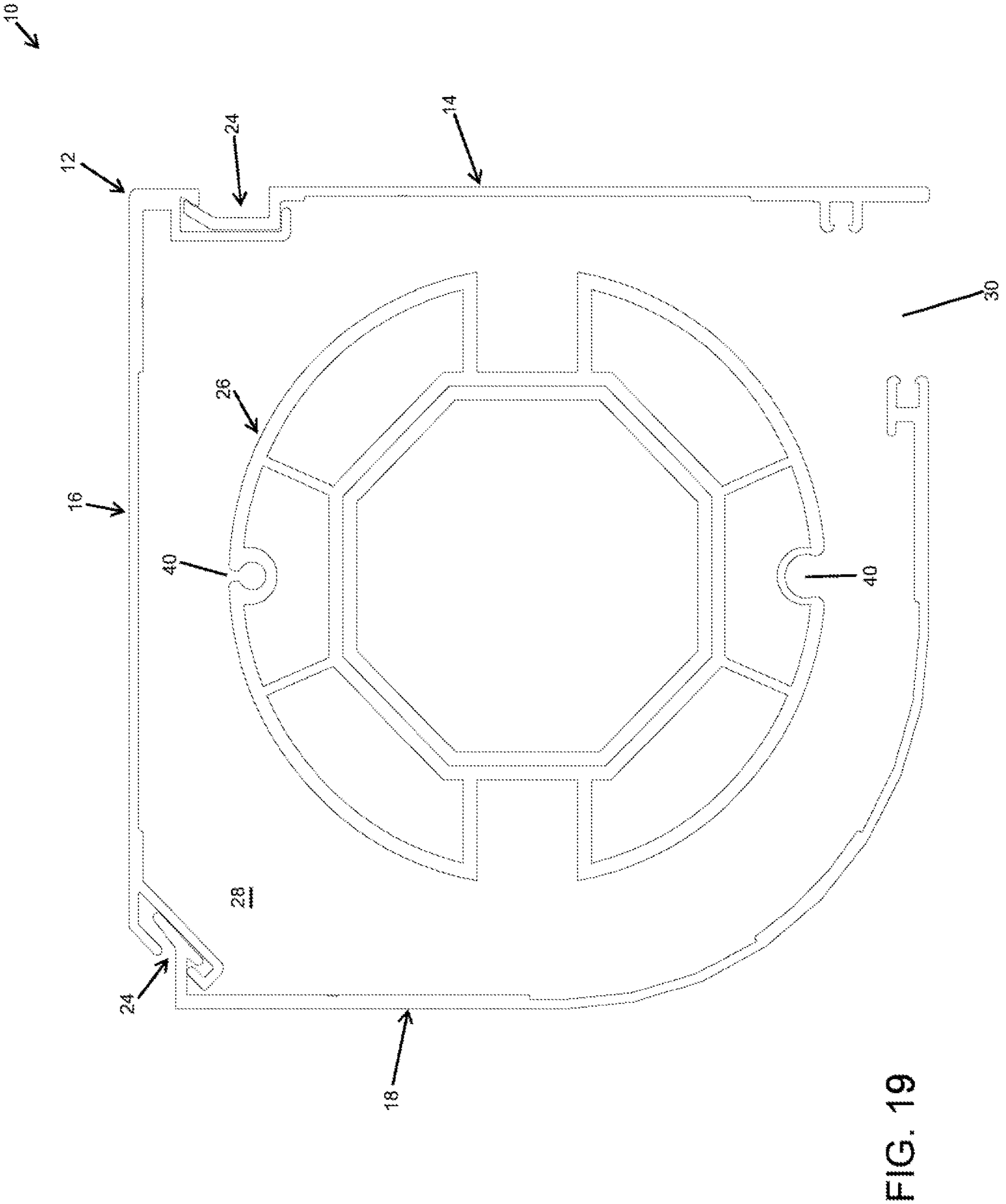
FIG. 19 is a side elevation view of a motorized screen system having a magnetic track assembly as is shown in FIGS. 10-18, the view showing the housing with a roller tube assembly positioned within the hollow interior of the housing; the view showing a 5 & ½ inch housing with roller tube.
Figure 20:
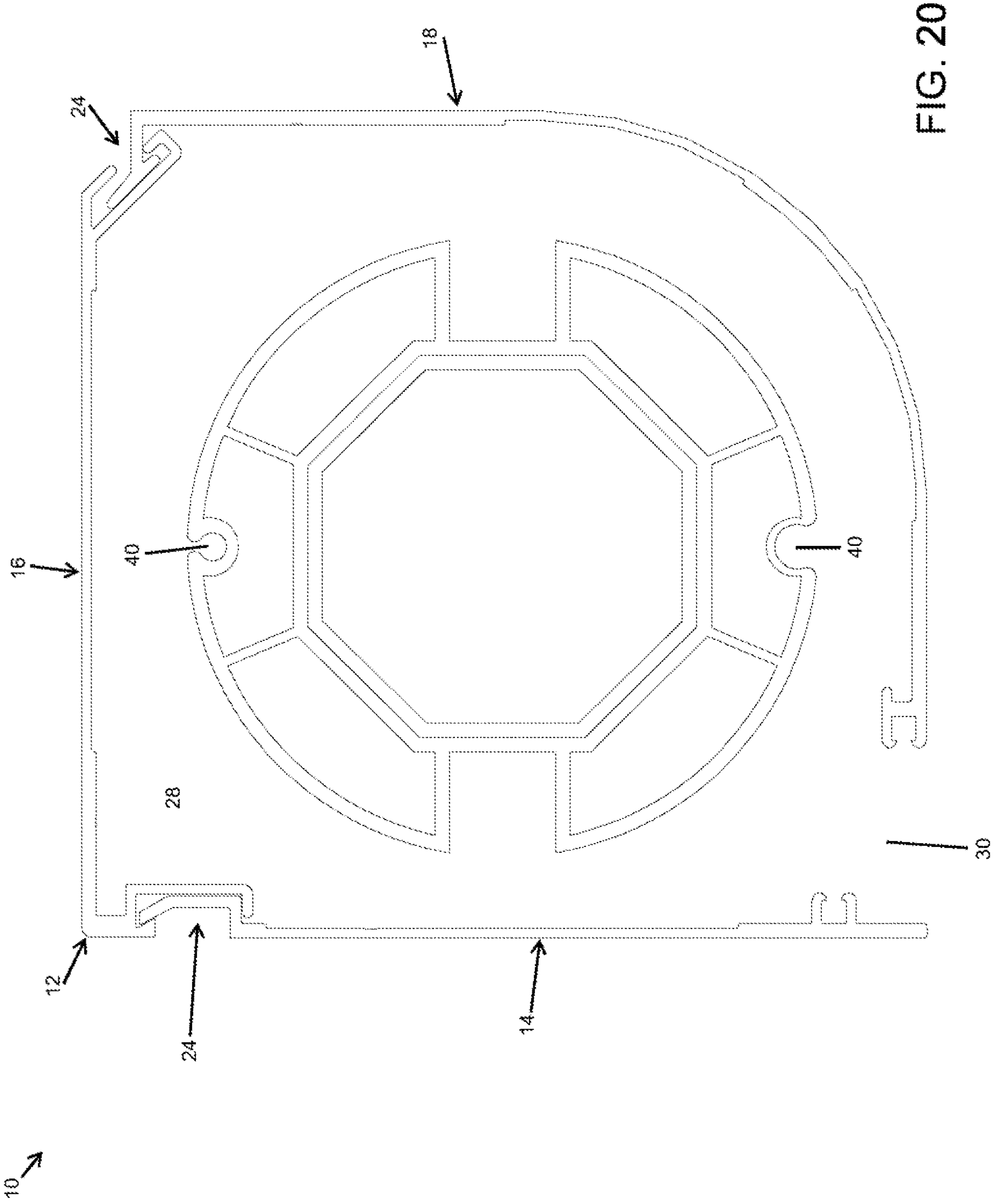
FIG. 20 is another side elevation view of a motorized screen system having a magnetic track assembly as is shown in FIGS. 10-19, the view showing the housing with a roller tube assembly positioned within the hollow interior of the housing; the view showing the opposite end as is shown in FIG. 19; the view showing a 5 & ½ inch housing with roller tube.
Figure 21:
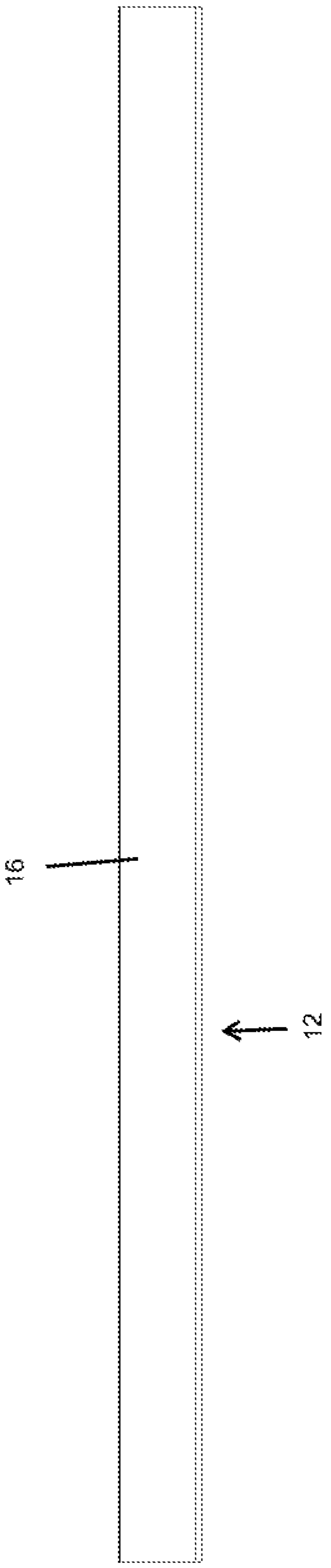
FIG. 21 is a top elevation view of the housing of a motorized screen system having a magnetic track assembly as is shown in FIGS. 10-20; the view showing a 5 & ½ inch housing.
Figure 22:
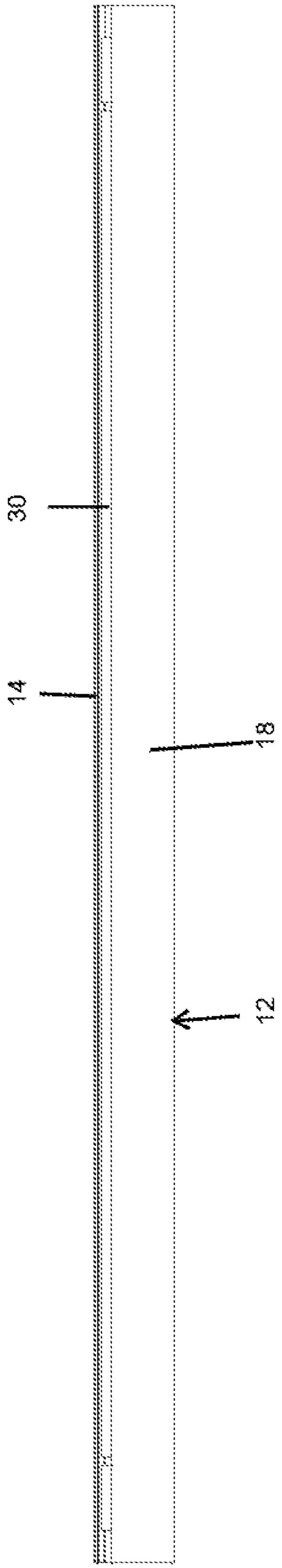
FIG. 22 is a bottom elevation view of the housing of a motorized screen system having a magnetic track assembly as is shown in FIGS. 10-21; the view showing a 5 & ½ inch housing.
Figure 23:
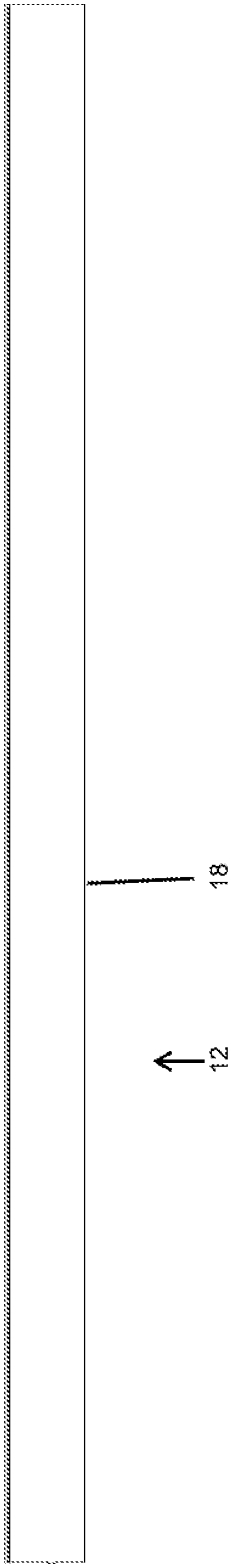
FIG. 23 is a front elevation view of the housing of a motorized screen system having a magnetic track assembly as is shown in FIGS. 10-22; the view showing a 5 & ½ inch housing.
Figure 24:
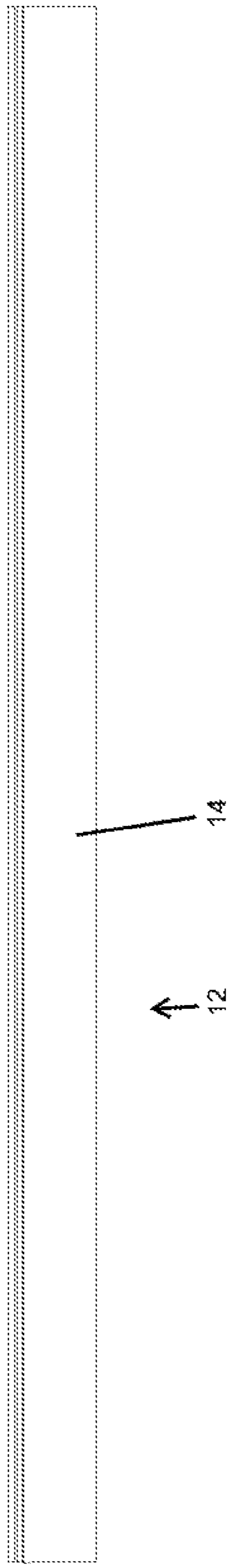
FIG. 24 is a rear elevation view of the housing of a motorized screen system having a magnetic track assembly as is shown in FIGS. 10-23; the view showing a 5 & ½ inch housing.
Figure 25:
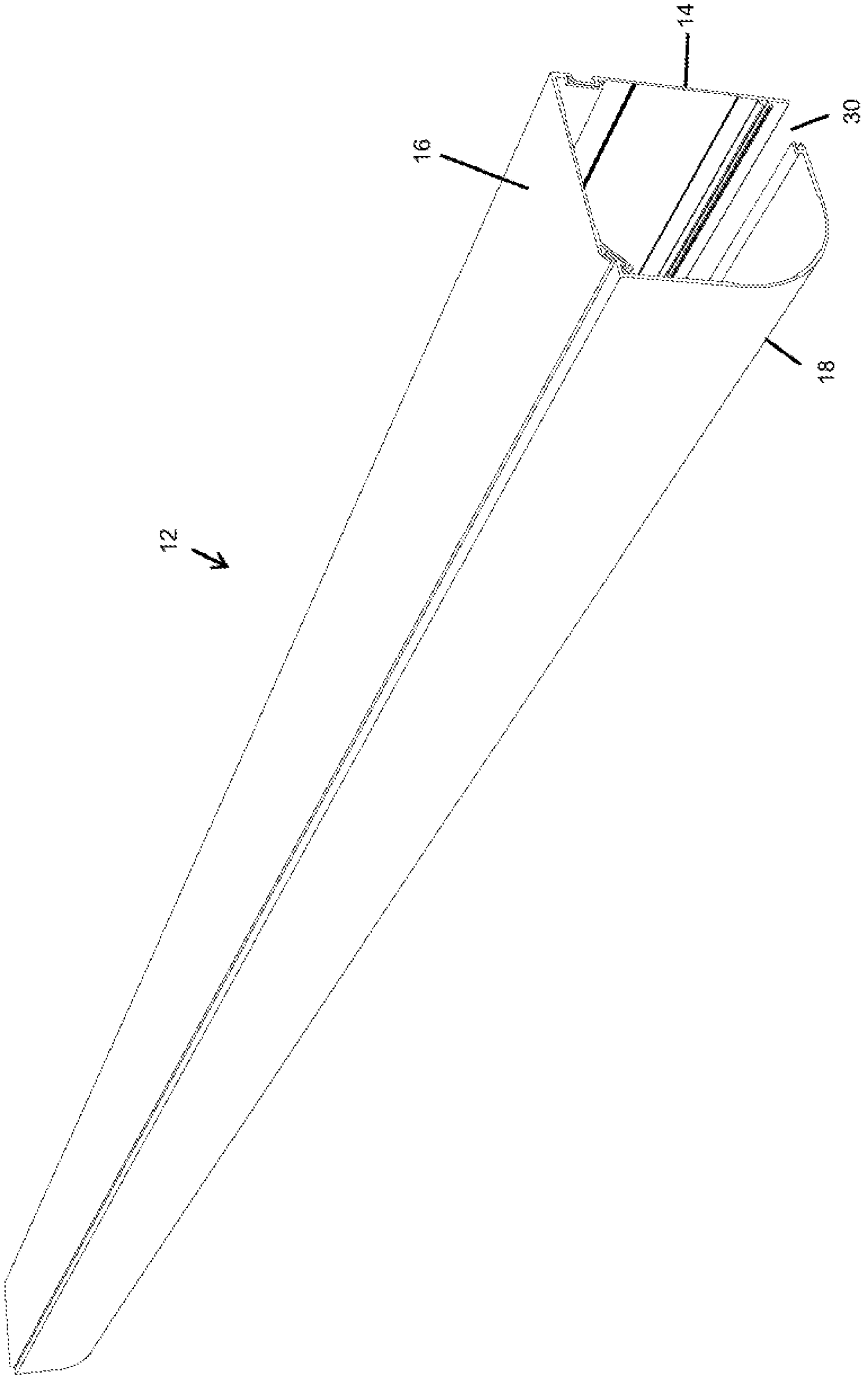
FIG. 25 is a perspective view of the housing of a motorized screen system having a magnetic track assembly as is shown in FIGS. 10-24; the view showing a 5 & ½ inch housing.
Figure 26:
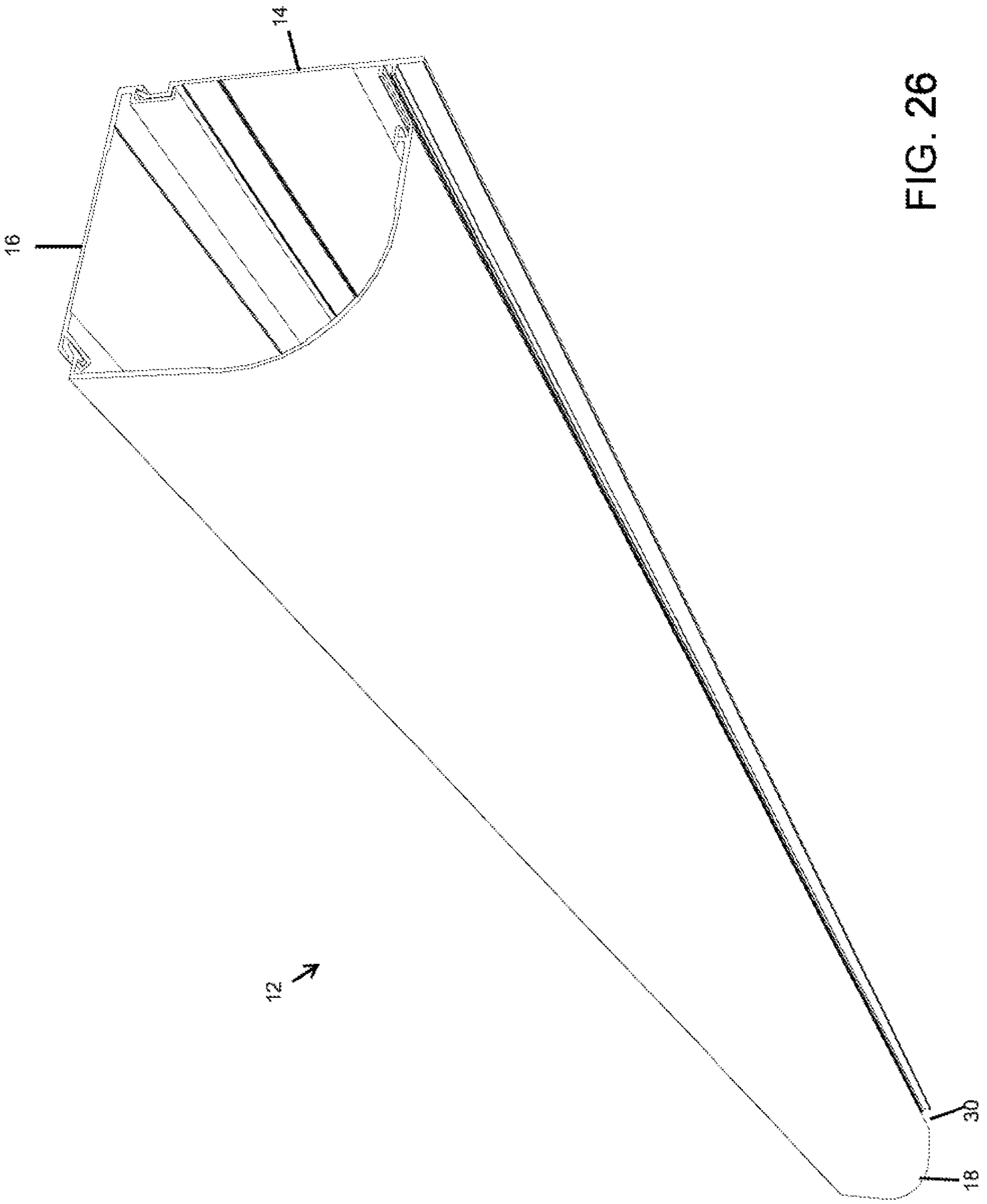
FIG. 26 is another perspective view of the housing of a motorized screen system having a magnetic track assembly as is shown in FIGS. 10-25; the view showing a 5 & ½ inch housing.
Figure 27:
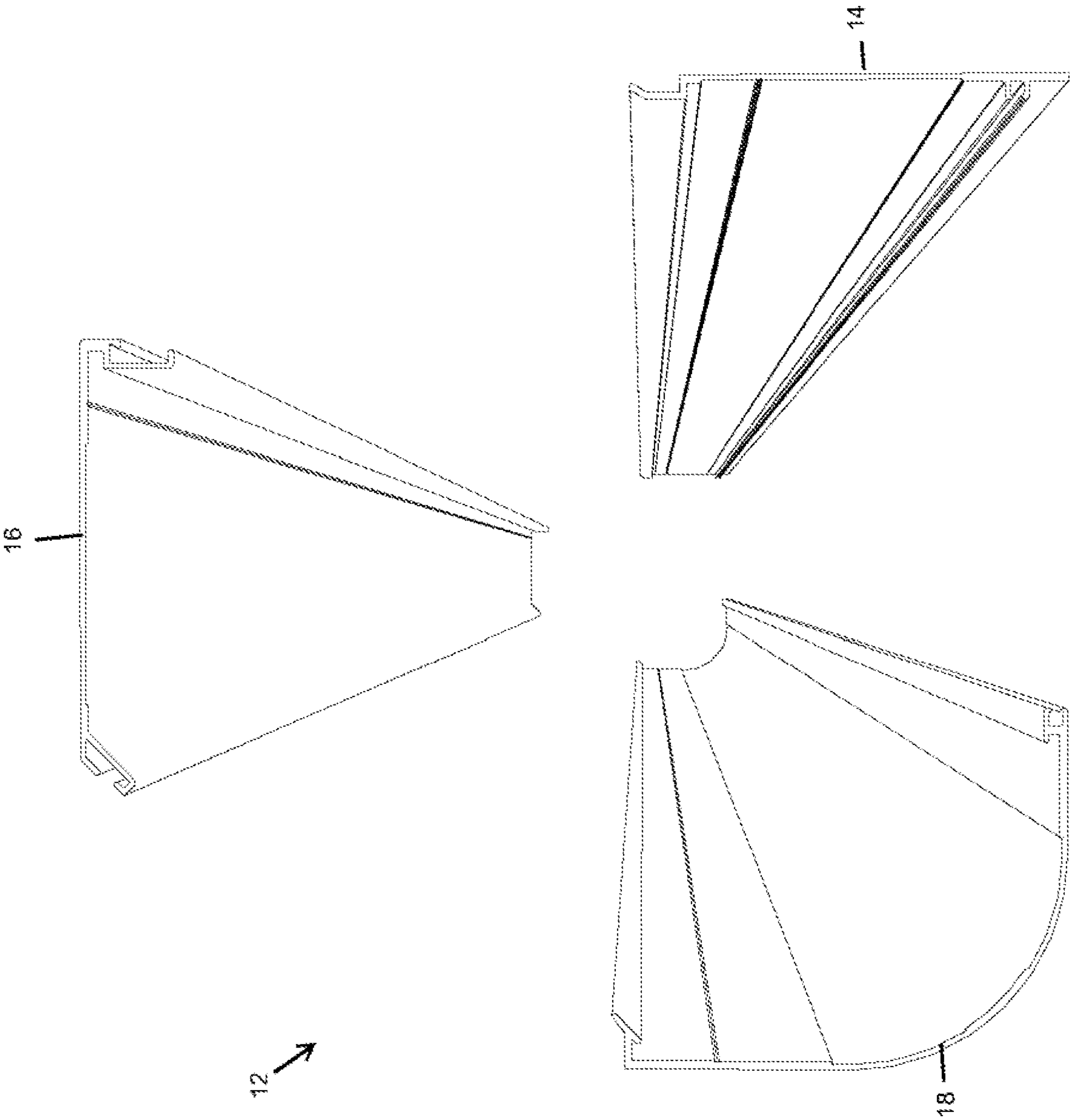
FIG. 27 is a perspective exploded view of the housing of a motorized screen system having a magnetic track assembly as is shown in FIGS. 10-26; the view showing a 5 & ½ inch housing.
Figure 28:
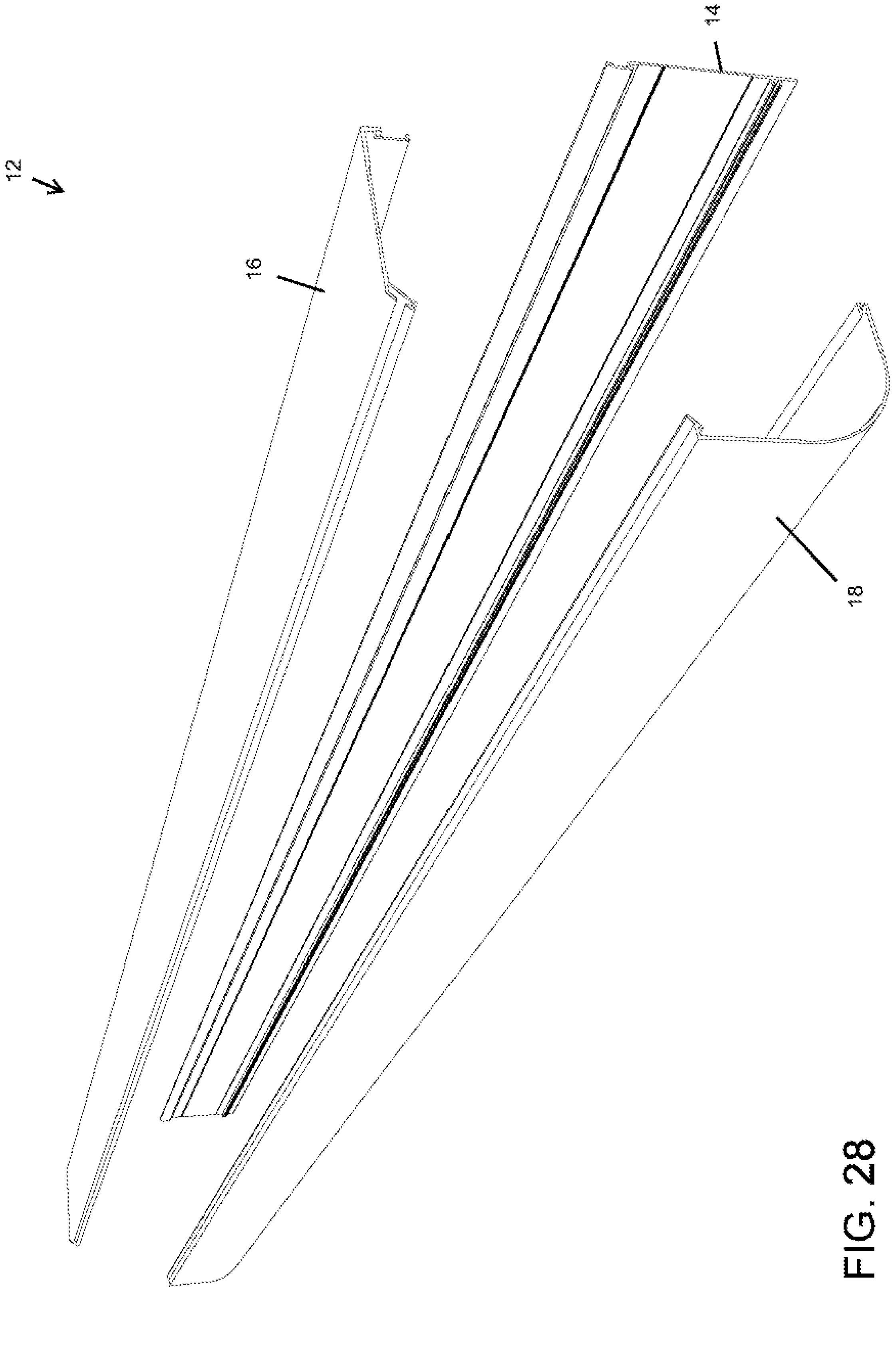
FIG. 28 is another perspective exploded view of the housing of a motorized screen system having a magnetic track assembly as is shown in FIGS. 10-27; the view showing a 5 & ½ inch housing.
Figure 29:
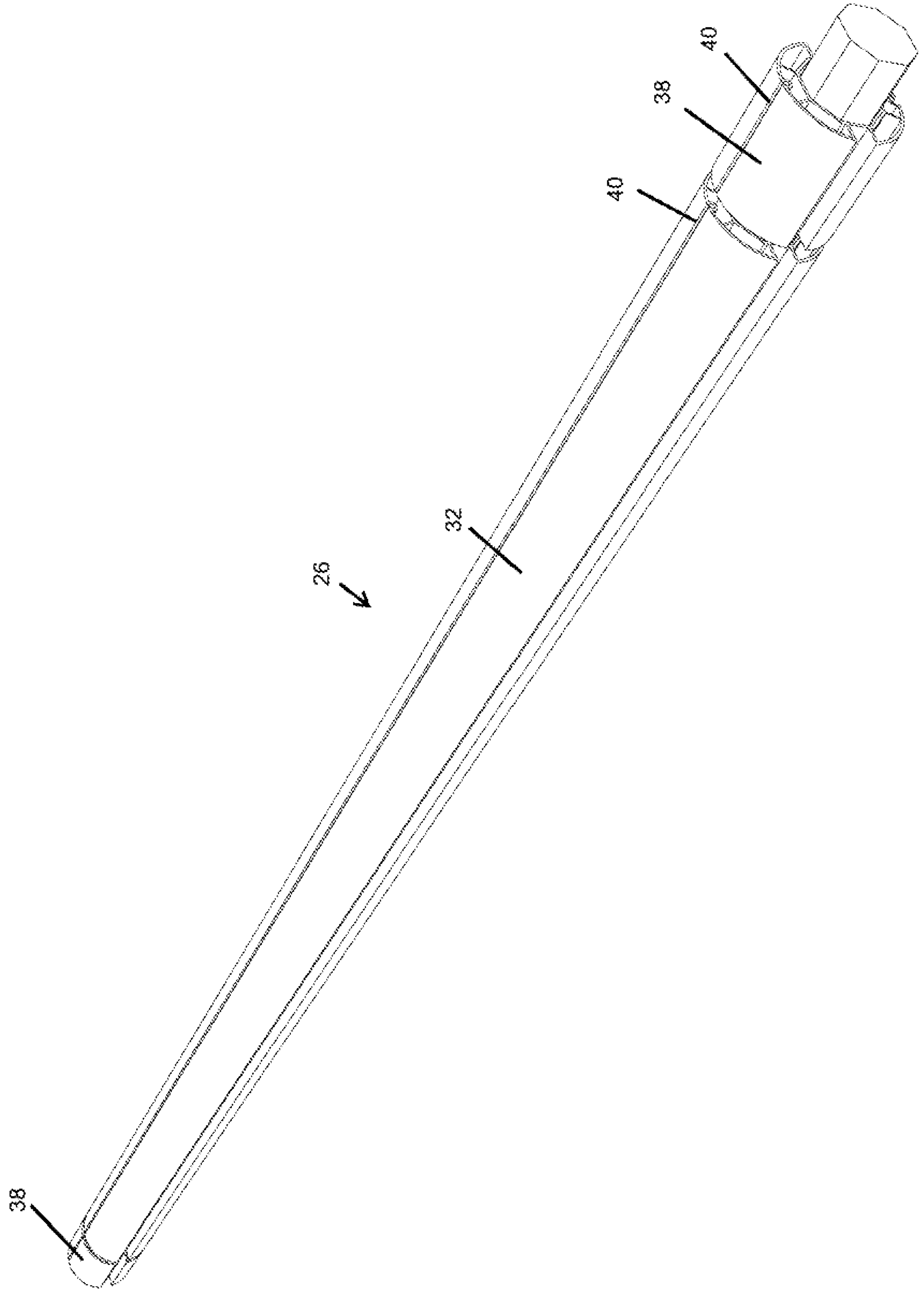
FIG. 29 is a perspective view of the roller tube assembly of a motorized screen system having a magnetic track assembly as is shown in FIGS. 10-28; the view showing a roller tube assembly for a 5 & ½ inch housing.
Figure 30:
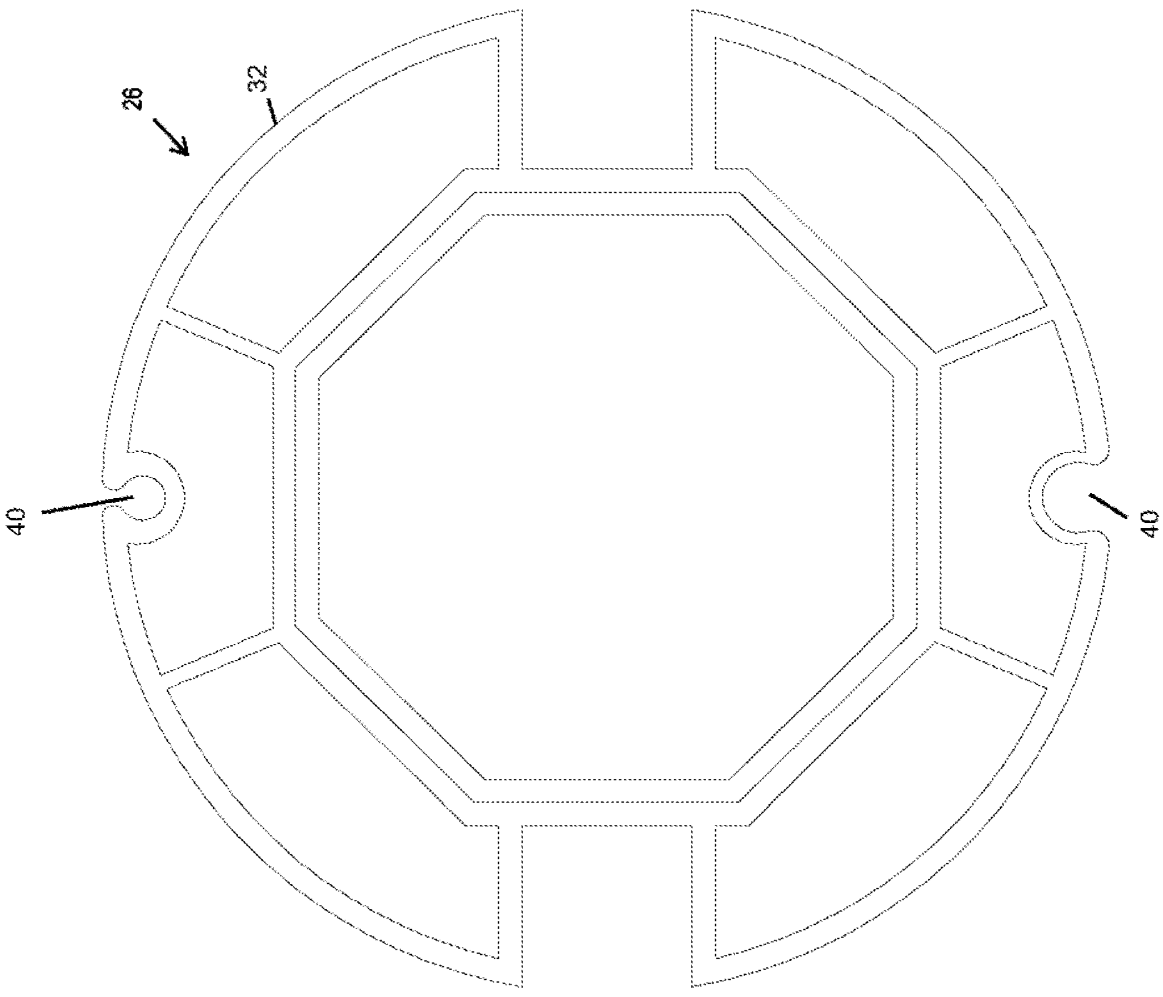
FIG. 30 is a side elevation view of the roller tube assembly of a motorized screen system having a magnetic track assembly as is shown in FIGS. 10-29; the view showing a roller tube assembly for a 5 & ½ inch housing.
Figure 31:
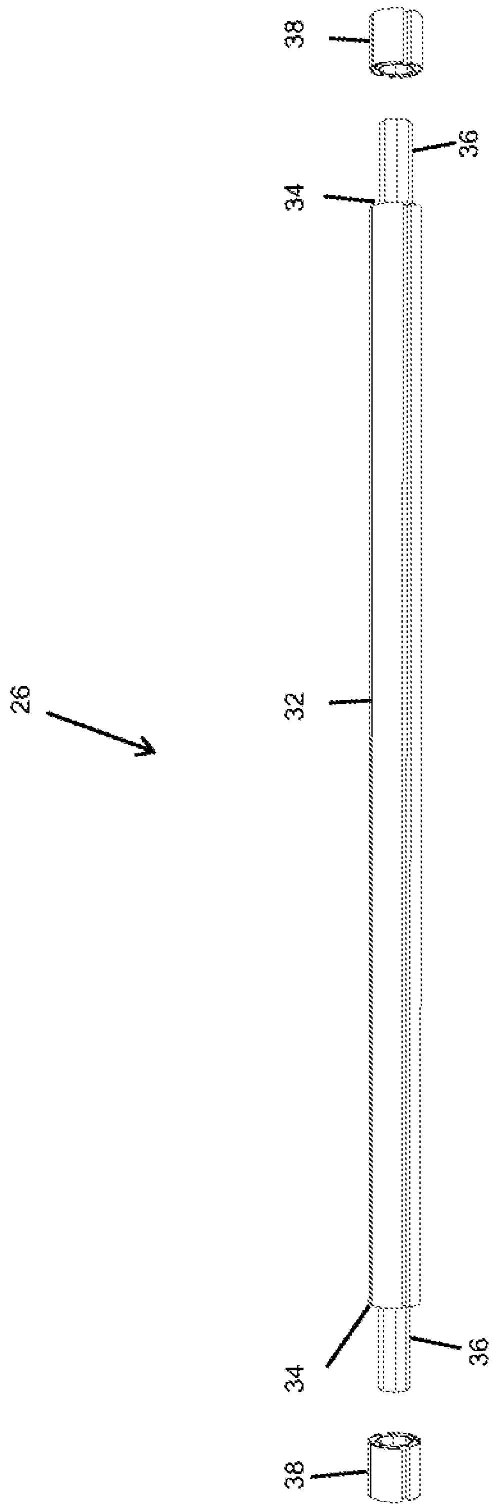
FIG. 31 is a perspective view of the roller tube assembly of a motorized screen system having a magnetic track assembly as is shown in FIGS. 10-30; the view showing the collars (also known as doughnuts) exploded from the connection members of the roller tube assembly; the view showing a roller tube assembly for a 5 & ½ inch housing.
Figure 32:
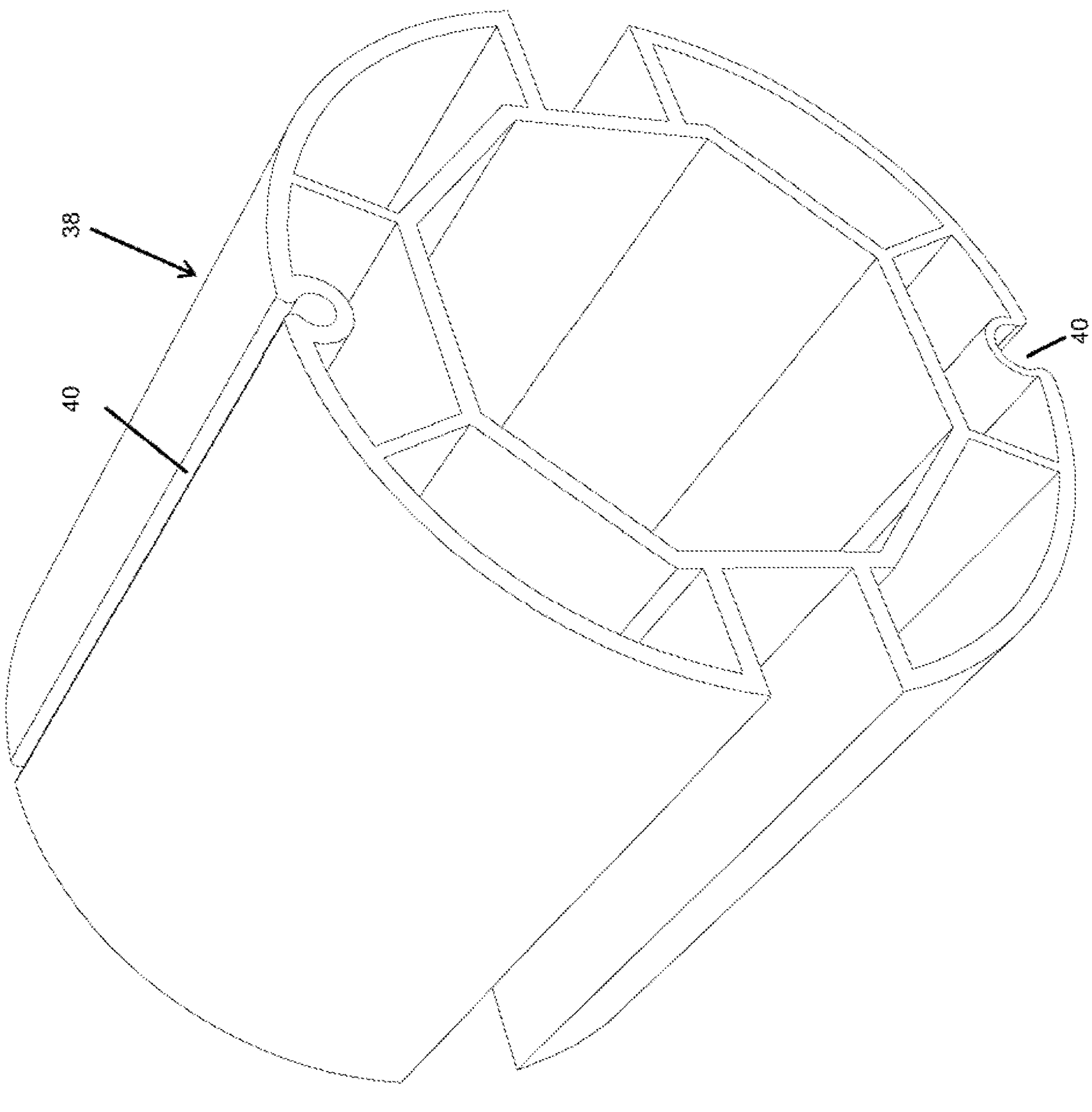
FIG. 32 is a perspective view of the collars (also known as doughnuts) of the roller tube assembly of a motorized screen system having a magnetic track assembly as is shown in FIGS. 10-31; the view showing collar for a 5 & ½ inch housing.
Figure 33:
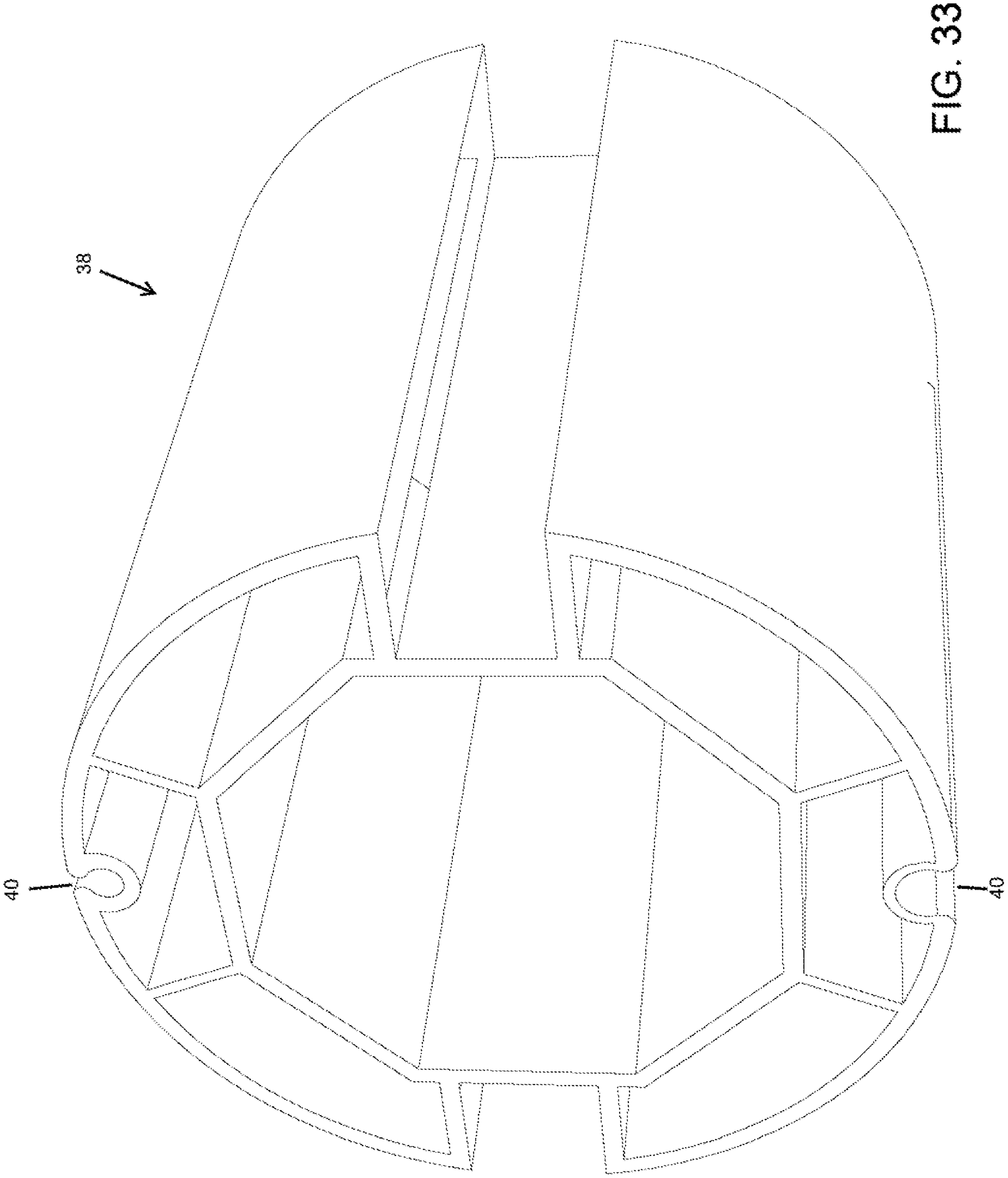
FIG. 33 is another perspective view of the collars (also known as doughnuts) of the roller tube assembly of a motorized screen system having a magnetic track assembly as is shown in FIGS. 10-32; the view showing a 5 & ½ inch housing with roller tube.
Figure 34:
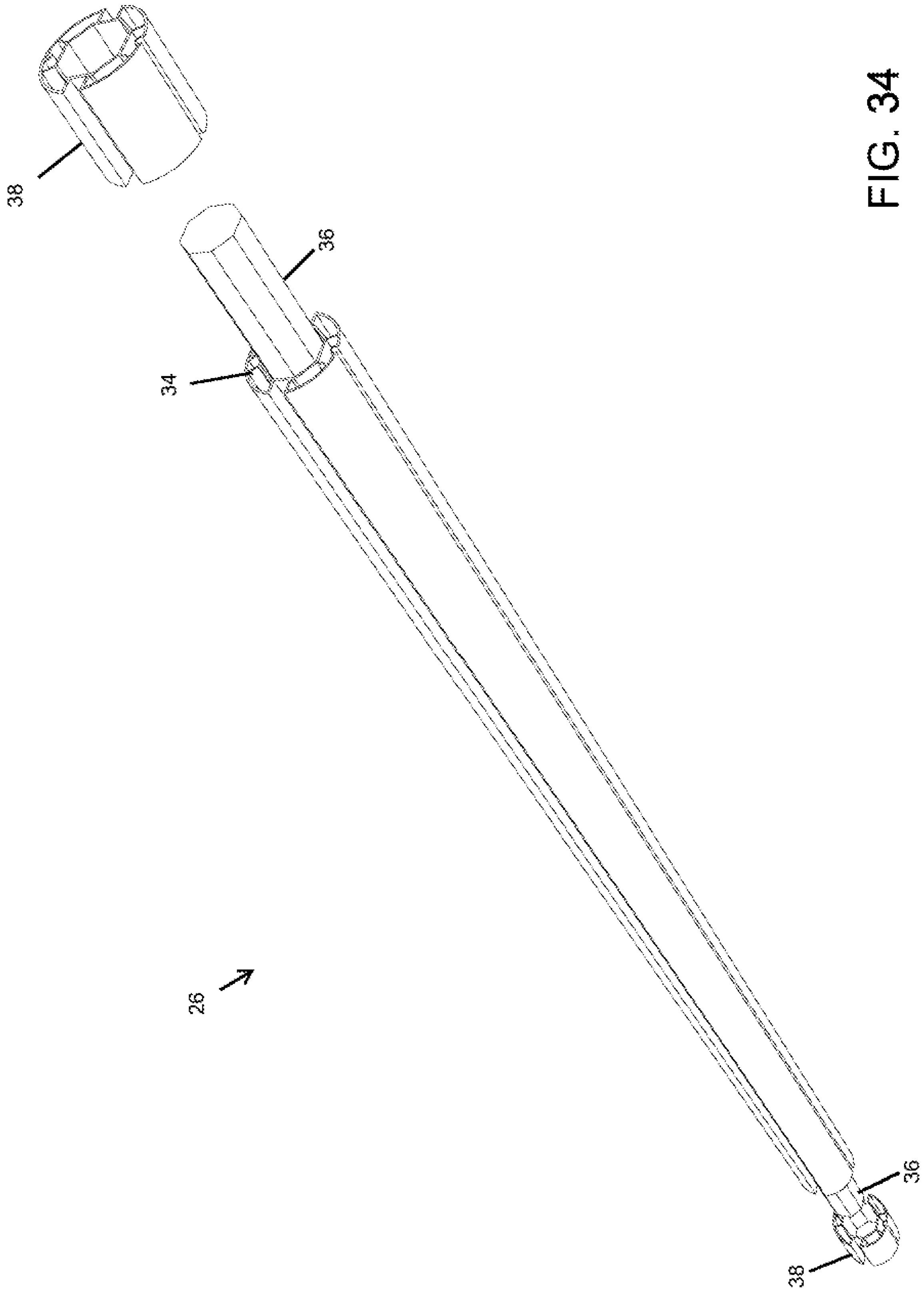
FIG. 34 is another perspective view of the roller tube assembly of a motorized screen system having a magnetic track assembly as is shown in FIGS. 10-33; the view showing the collars (also known as doughnuts) exploded from the connection members of the roller tube assembly; the view showing a 5 & ½ inch housing with roller tube.
Figure 35:
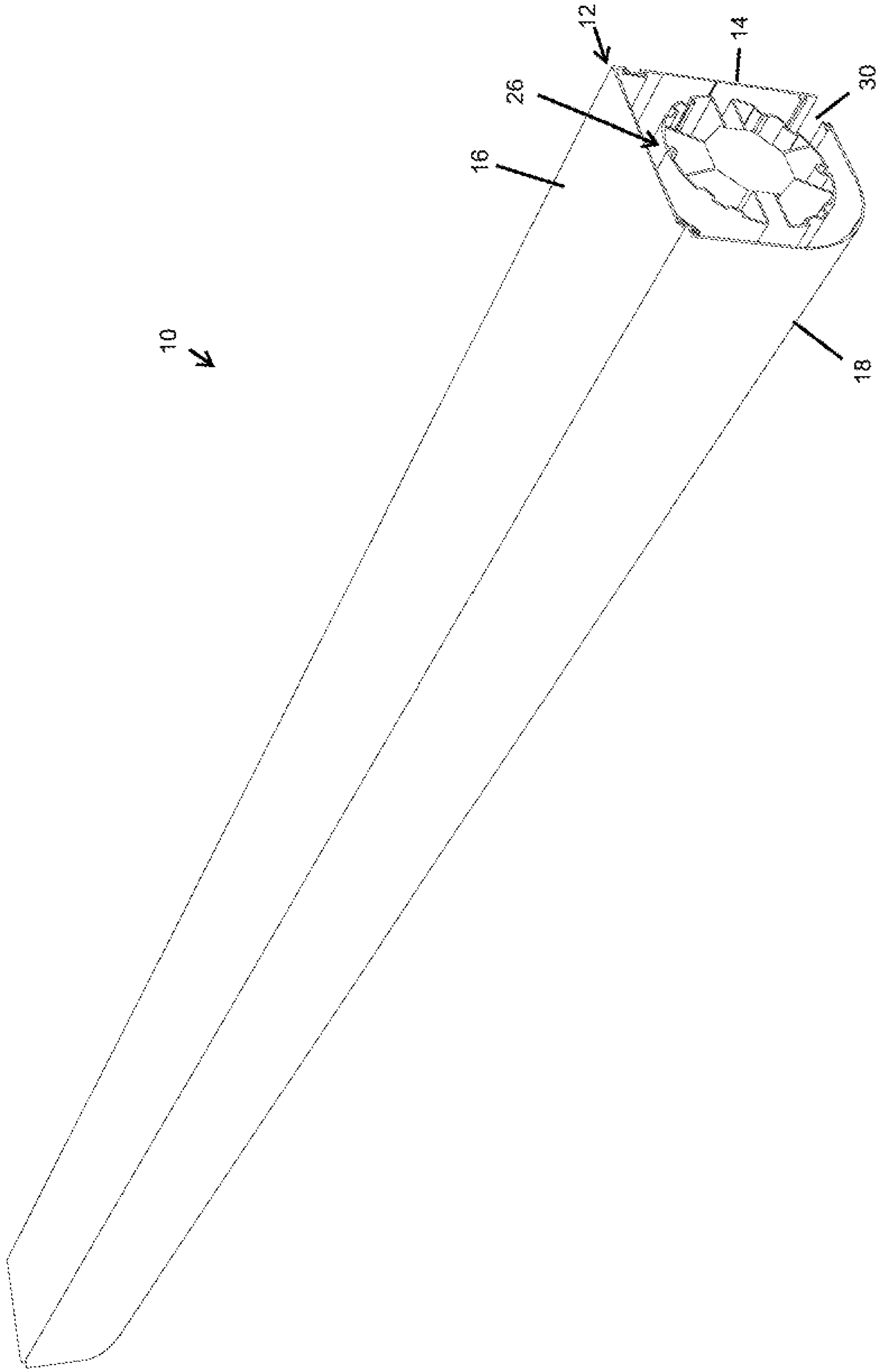
FIG. 35 is a perspective view of the roller tube assembly positioned within the hollow interior of the housing of a motorized screen system having a magnetic track assembly as is shown in FIGS. 10-34; the view showing a 7 inch housing with roller tube.
Figure 36:
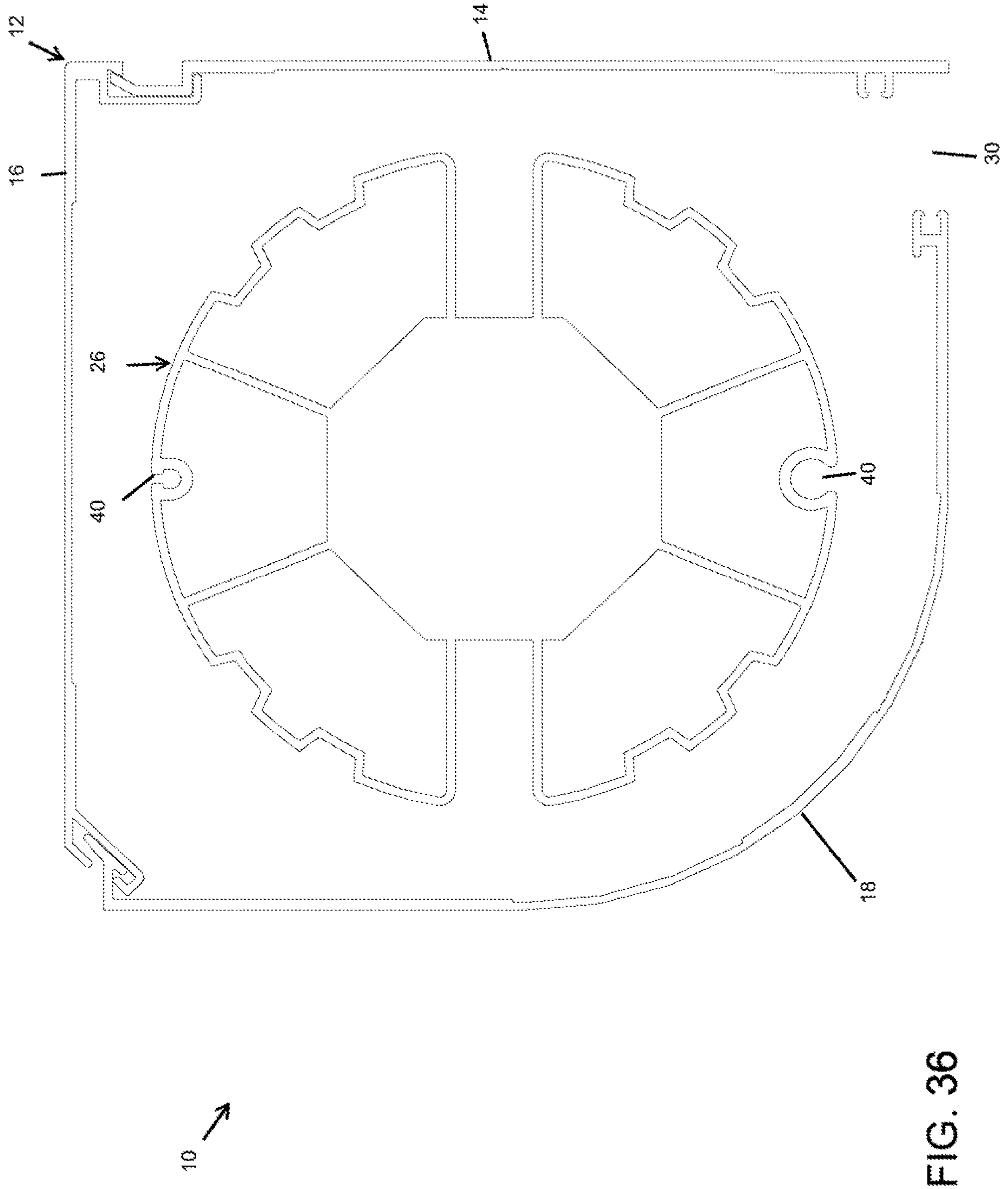
FIG. 36 is a side elevation view of the roller tube assembly positioned within the hollow interior of the housing of a motorized screen system having a magnetic track assembly as is shown in FIGS. 10-35; the view showing a 7 inch housing with roller tube.
Figure 37:
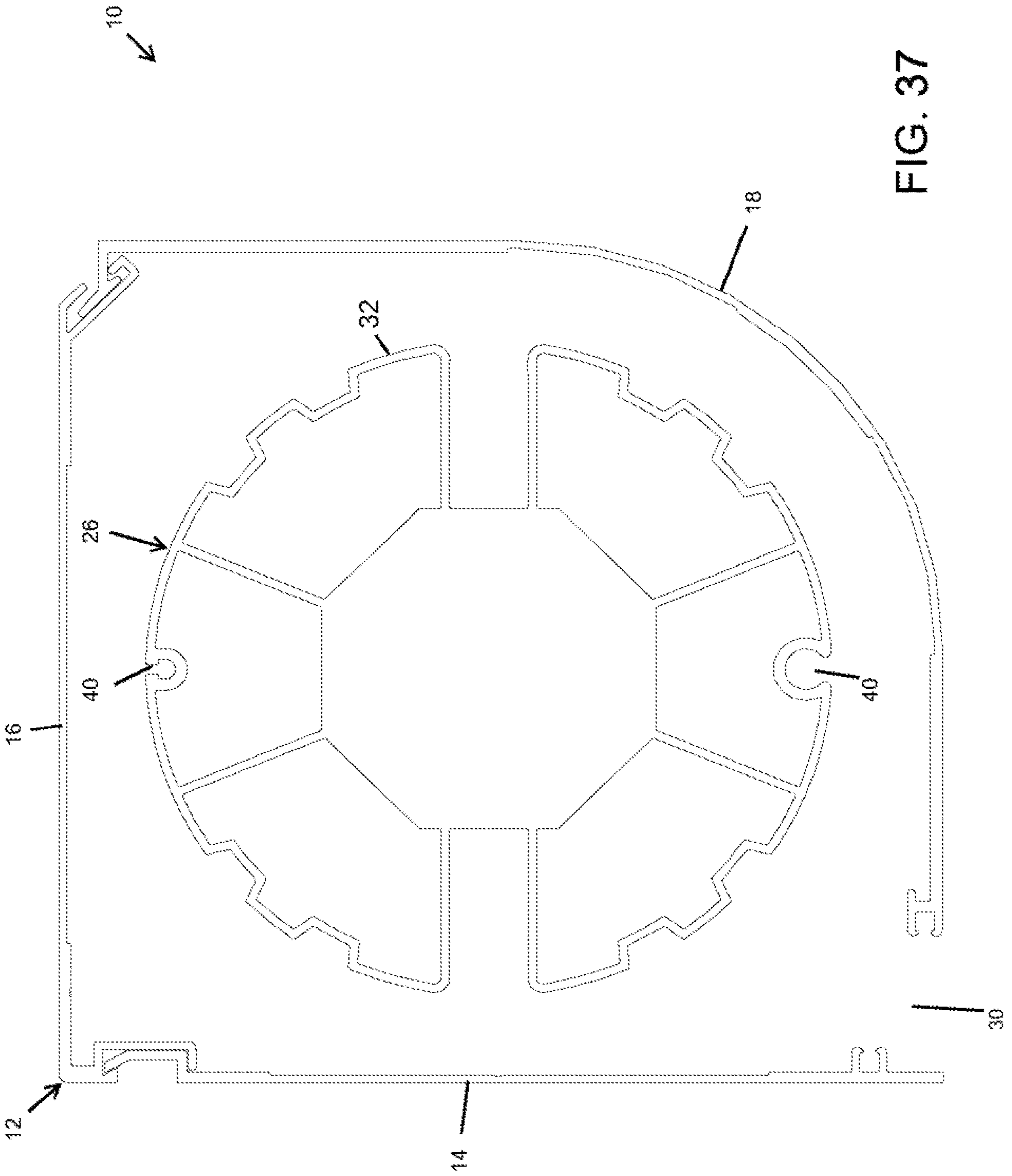
FIG. 37 is a side elevation view of the roller tube assembly positioned within the hollow interior of the housing of a motorized screen system having a magnetic track assembly as is shown in FIGS. 10-36; the view taken from an opposite side as is shown in FIG. 34, the view showing a 7 inch housing with roller tube.

With reference to FIG. 15 a similar arrangement is shown with the difference being that the screen 200 includes a window 206 positioned within the material that forms the screen 200. In one arrangement, screen 200 is formed of a mesh material while window 206 is formed of a transparent or translucent flexible plastic material. However, any other material is hereby contemplated for use with screen 200 and/or window 206.

Figure 50:
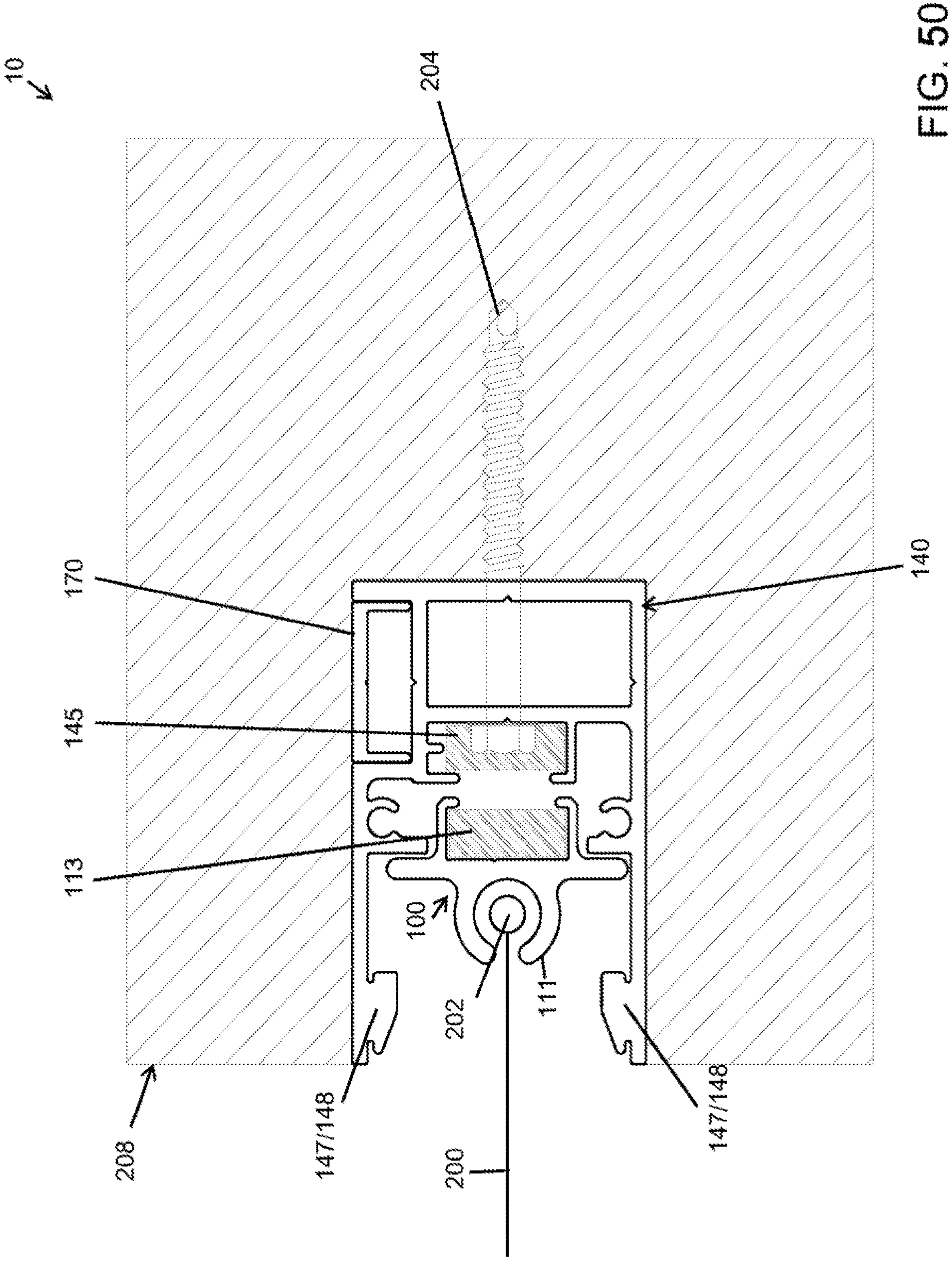
FIG. 50 is an end elevation assembled view of a magnetic track assembly as is shown in FIGS. 44-49; the view showing the assembled magnetic track assembly positioned within a groove in a frame member so as to provide a low profile appearance; the view showing a fastener extending through the elongate channel and into the frame member; the view showing the screen receiver positioned within the hollow compartment of elongate channel; the view showing the interlock of the screen material connected to the C-shaped channel of the screen receiver; the view showing the liners shown in FIGS. 46 and 47 removed.
Figure 51:
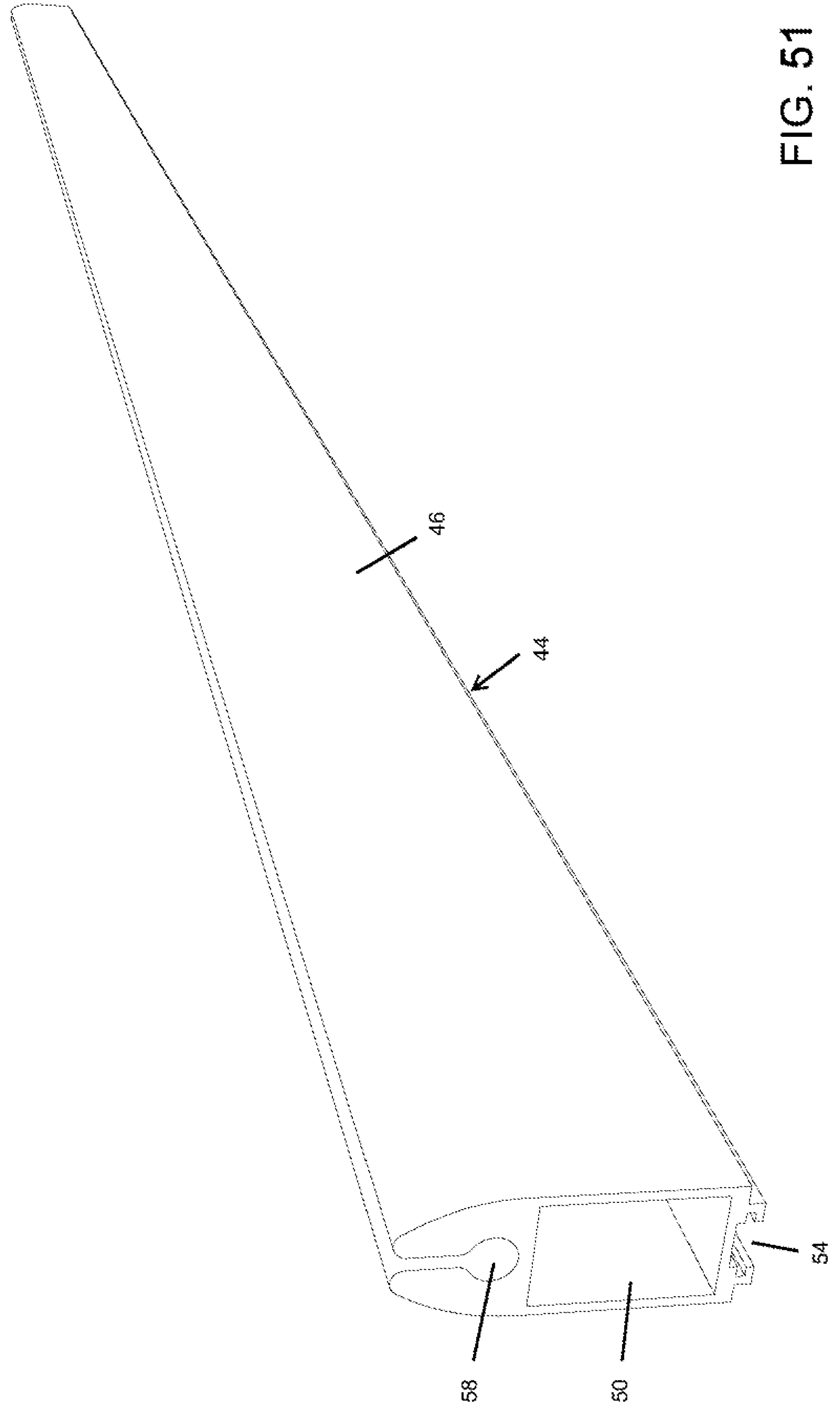
FIG. 51 is a perspective view of a bottom bar used in association with the motorized screen system shown in FIGS. 1-50.
Figure 52:
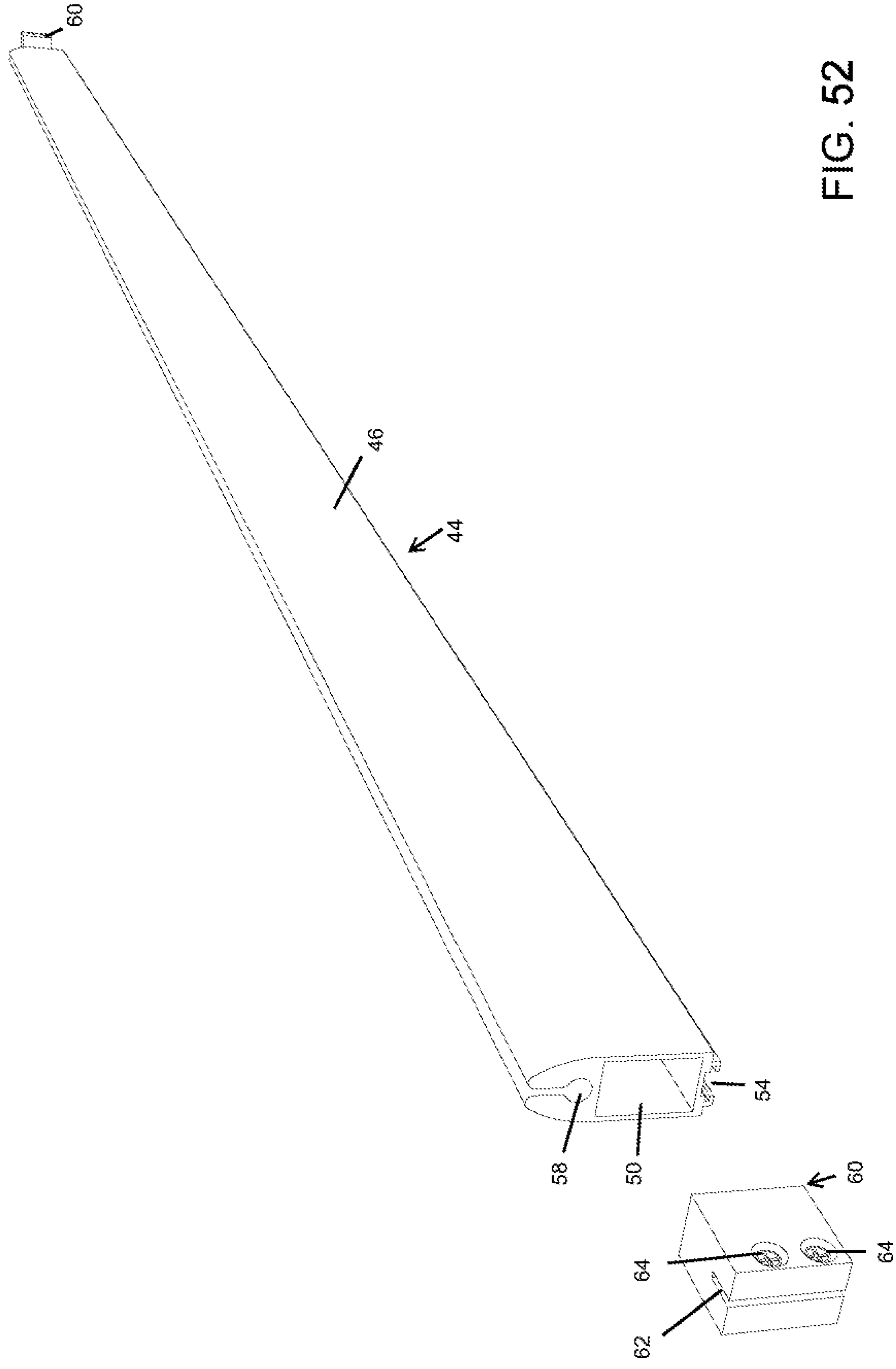
FIG. 52 is a perspective view of a bottom bar assembly shown in FIG. 51, the view showing the weight bar probes as well as the bottom bar.
Figure 53:
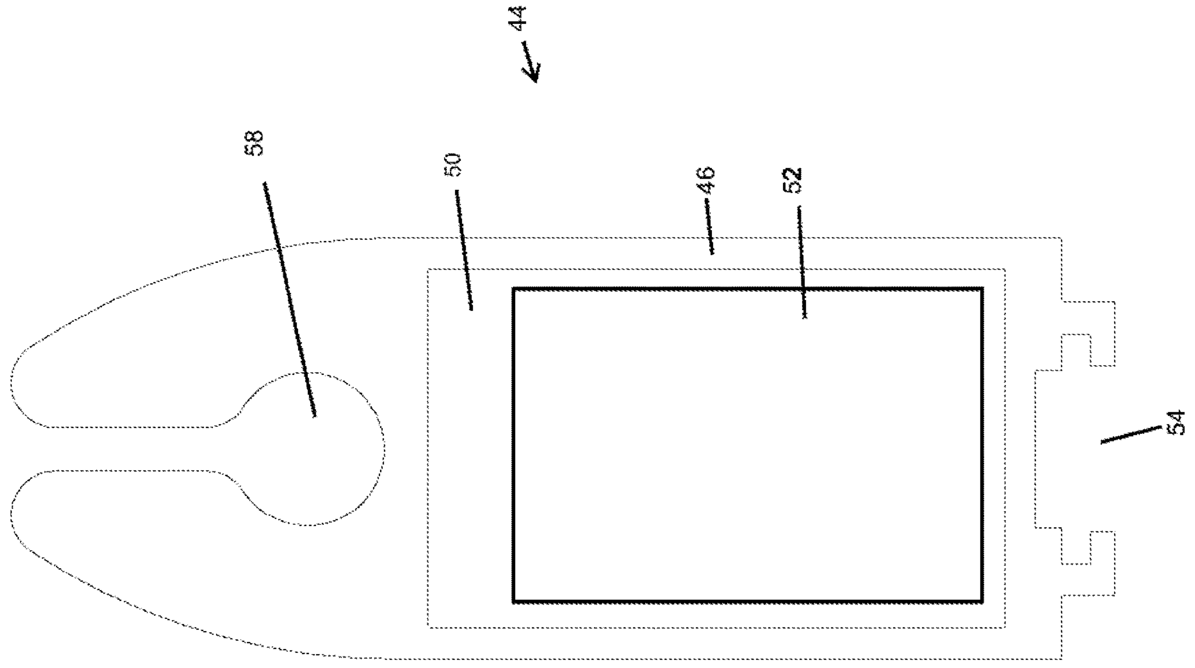
FIG. 53 is an elevation view of an end of the bottom bar shown in FIGS. 51-52.

With reference to FIG. 50, in the arrangement shown, as one example, an assembled magnetic track assembly 100 is shown positioned within a groove in a frame member 208 so as to provide a low profile appearance, or hidden appearance of magnetic track assembly 100. In the arrangement shown, as one example, a fastener 204 is shown extending through the elongate channel 140 and into the frame member 208 thereby affixing the two components together. In the arrangement shown, as one example, screen receiver 110 is positioned within the hollow compartment 146 of elongate channel 140. The view showing the interlock 202 of the screen material 200 connected to the C-shaped channel 111 of the screen receiver 110. The view showing liners 66 removed.

In Operation:

As force is applied to screen 200 the force of the magnetic attraction is overcome and the screen receiver 110 moves inward pulled by the engagement of interlock 202 with c-shaped channel 111. As the screen receiver 110 moves inward the inward facing surfaces of the outward ends 114, 115 engage the outward facing surfaces of inward most partitions, or front partitions 147, 148. When no liners 66 are present, a loud noise or louder than is desired, is generated. When one liner 66 is present between the engagement between screen receiver 110 and elongate channel 140 the noise generated is reduced by the elimination of metal-on-metal contact and/or by the reduced deceleration and compressible nature of liner 66. When two liners 66 are present between the engagement between screen receiver 110 and elongate channel 140 the noise generated is reduced even further by the elimination of metal-on-metal contact and/or by the reduced deceleration and compressible nature of two layers of liner 66.

Hurricane Bracket:

In one arrangement, system 10 is used in association with a hurricane bracket 220. Hurricane bracket 220 is formed of any suitable size, shape and design and is configured to strengthen system 10 so that it can withstand hurricane strength winds.

In many applications of system 10, hurricanes and other wind events are present. To combat damage from hurricanes, as well as to meet hurricane building codes, in one arrangement, a hurricane bracket 220 is used which strengthens magnetic track assembly 100, or more specifically elongate channel 140, so that it will not deform and allow screen receiver 110 to escape the hollow compartment 146 of elongate channel 140 even under the strongest of winds.

Figure 55:
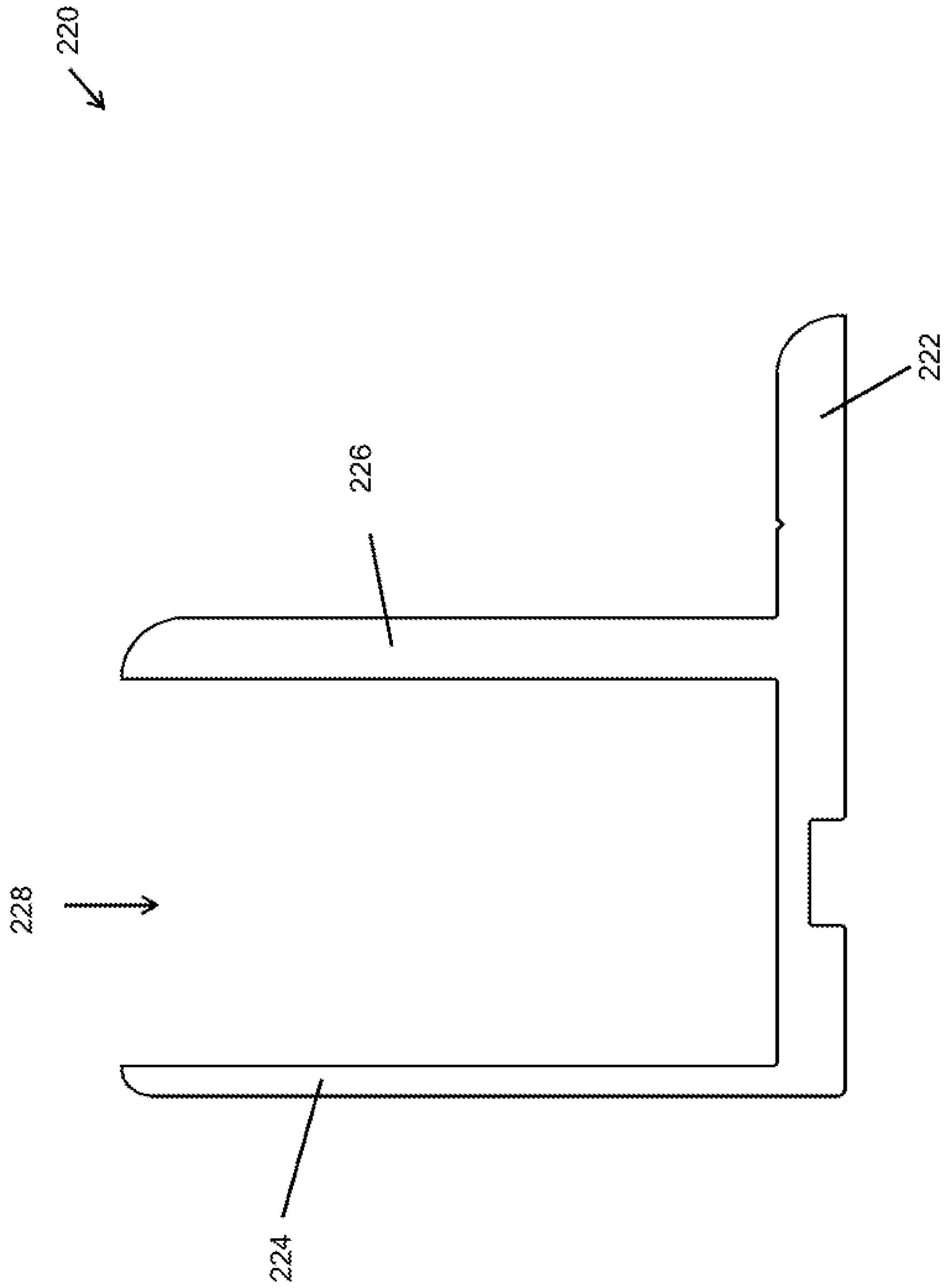
FIG. 55 is an end elevation view of a hurricane bracket for use with the motorized screen system shown in FIGS. 1-54; the view showing the hurricane bracket having an end wall, a forward wall and a rearward wall that form a hollow interior that is sized and shaped to receive a magnetic track assembly therein and is configured to provide strength and rigidity to the magnetic track assembly so as to strengthen it to be hurricane proof.

With reference to FIG. 55, as one example, a hurricane bracket 220 is presented having an end wall 222, a forward wall 224 and a rearward wall 226 that form a hollow interior 228 that is sized and shaped to receive a magnetic track assembly 100 therein with close and tight, and in some cases frictional engagement and/or locking engagement, and is configured to provide strength and rigidity to the magnetic track assembly 100 so as to strengthen it to be hurricane proof. In the arrangement shown, as one example, forward wall 224 and rearward wall 226 are spaced apart just far enough to receive the width of magnetic track assembly 100 therein. In the arrangement shown, as one example, forward wall 224 and rearward wall 226 have a length that is just long enough to extend to and/or past the length of the forward and rearward sides of magnetic track assembly 100 therein. In this way, when hurricane bracket 220 is used, magnetic track assemblies 100 are wholly or fully received within the hollow interior 228 of hurricane bracket 220. In one arrangement, hurricane bracket 220 extends the entire length of elongate channel 140 from its upper end to its lower end.

In the arrangement shown, as one example, end wall 222 extends a length rearward of rearward wall 226 so as to provide additional surface area to engage frame member 208 upon installation as well as to provide increased resistance to rotation upon strong winds as well as to provide additional areas to pass fasteners 204 through hurricane bracket 220 and into frame member 208 for additional strength. In an alternative arrangement, end wall 222 may extend past the forward side of forward wall 224 (that is the parts can be reversed with the outward extension of end wall 222 extending into or outward from the building the hurricane bracket 220 is attached to. In yet another alternative arrangement, end wall 222 may extend past the forward side of forward wall 224 as well as the rearward side of rearward wall 226 to provide even greater surface area and strength. Any other size, shape and/or configuration is hereby contemplated for use with hurricane bracket 220.

Figure 56:
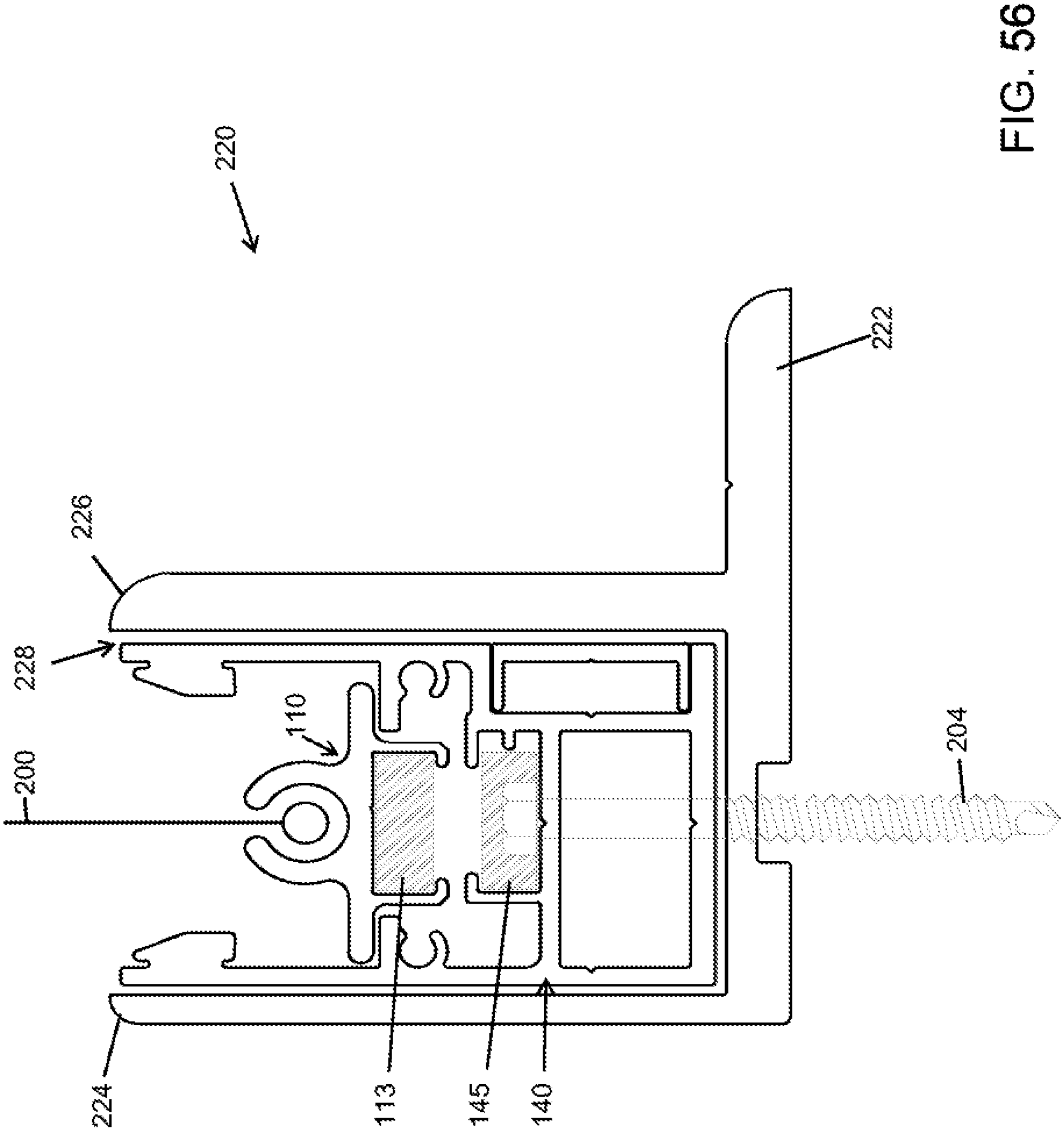
FIG. 56 is an end elevation view of the hurricane bracket shown in FIG. 55, the view showing an assembled magnetic track assembly having an elongate channel and a screen receiver positioned within the hollow interior of the hurricane bracket; the view showing screen material connected to the screen receiver.

With reference to FIG. 56, as one example, hurricane bracket 220 is shown with a magnetic track assembly 100 having an elongate channel 140 and a screen receiver 110 positioned within the hollow interior 228 of the hurricane bracket 220. The view showing screen material 200 connected to the screen receiver 110. The view showing a fastener 204 extending through the end wall 142 of elongate channel 140 and through the end wall 222 of hurricane bracket 220 thereby affixing both the magnetic track assembly 100 and hurricane bracket 220 to frame member 208.

In one arrangement, when hurricane bracket 220 is use, an extra-strength screen material 200 is used that is strong enough to withstand hurricane force winds. In one arrangement, a ballistic material such as Kevlar, an aramid, an ultra-high-molecular-weight polyethylene, or a similarly strong material is used as screen material 200 such that the strength of the screen material 200 matches the strength of the combined magnetic track assembly 100 and hurricane bracket 220.

Funnel:

In one arrangement, system 10 is used in association with funnel 240. Funnel 240 is formed of any suitable size, shape and design and is configured help facilitate the insertion of screen material 200 into the C-shaped channel 111 of screen receiver 110, or more specifically to help facilitate the insertion of the interlock 202 of screen material 200 into the C-shaped channel 111 of screen receiver 110.

Figure 57:
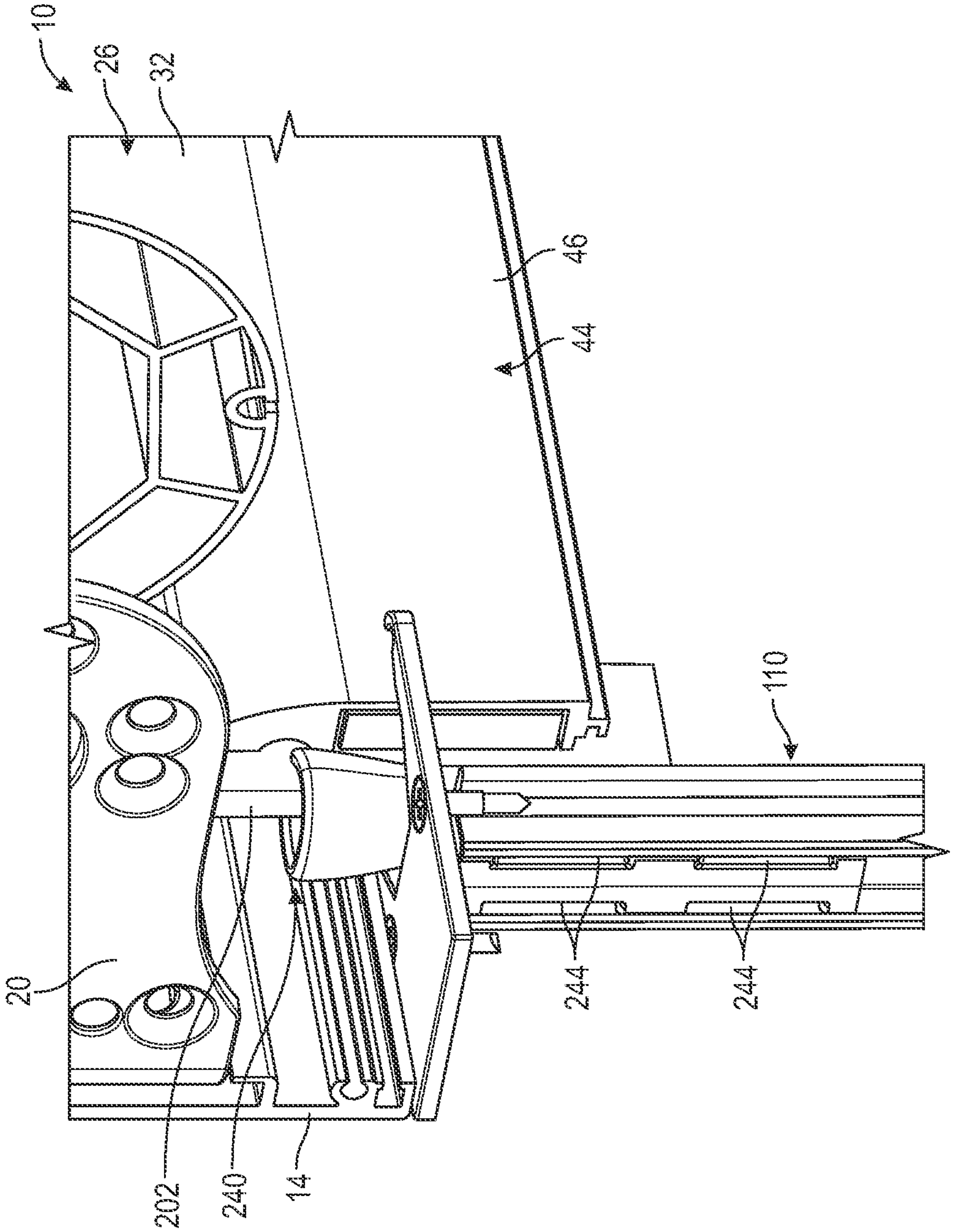
FIG. 57 is a perspective assembled view of the motorized screen system shown in FIGS. 1-56 having a funnel connected to the upper end of the screen receiver 110 so as to facilitate the insertion of the interlock of screen material into the C-shaped channel of the screen receiver; the view showing the funnel having an arm that fits within the slot in the exterior-facing side of the screen receiver that receives the magnets of the screen receiver.
Figure 58:
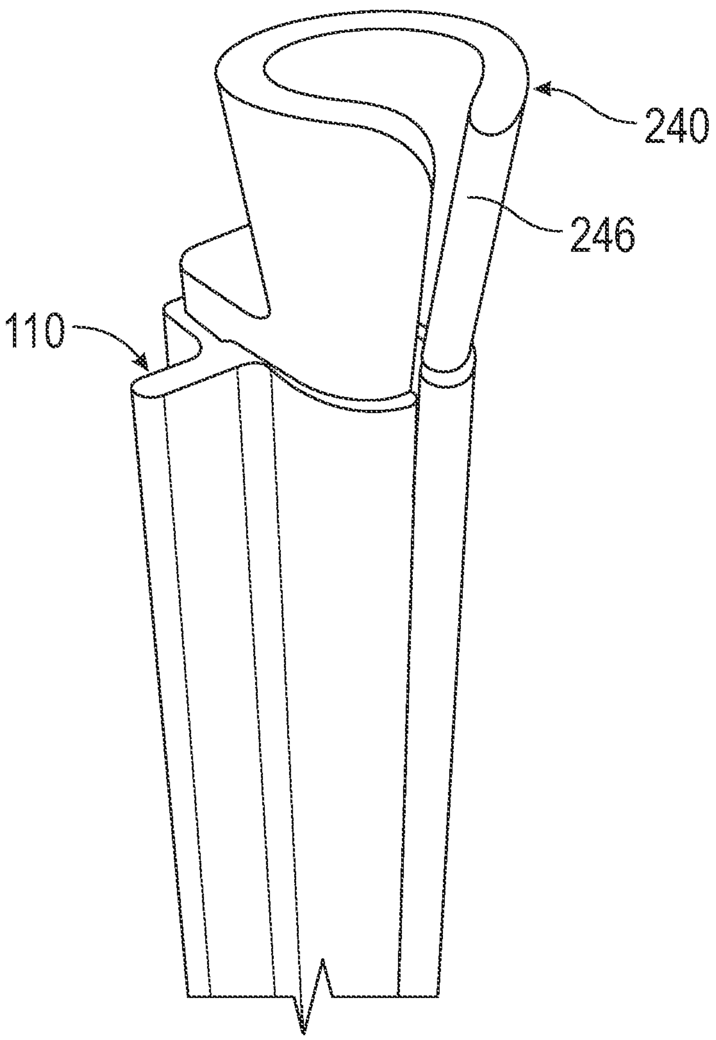
FIG. 58 is a perspective view of the funnel shown in FIG. 57, the view showing the screen receiver removed from the elongate channel thereby showing the open upper end of the funnel with a slot therein that connects to the slot in the C-shaped channel of the screen receiver so as to facilitate the insertion of the interlock of screen material into the C-shaped channel of the screen receiver.
Figure 59:
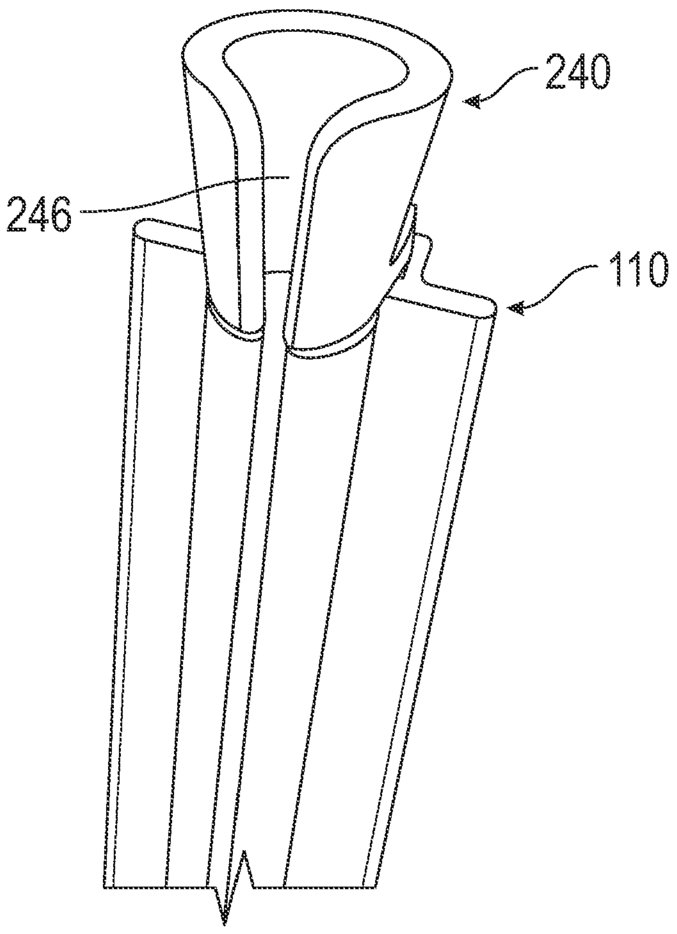
FIG. 59 is another perspective view of the funnel shown in FIG. 57-58, the view showing the screen receiver removed from the elongate channel thereby showing the open upper end of the funnel with a slot therein that connects to the slot in the C-shaped channel of the screen receiver so as to facilitate the insertion of the interlock of screen material into the C-shaped channel of the screen receiver.
Figure 60:
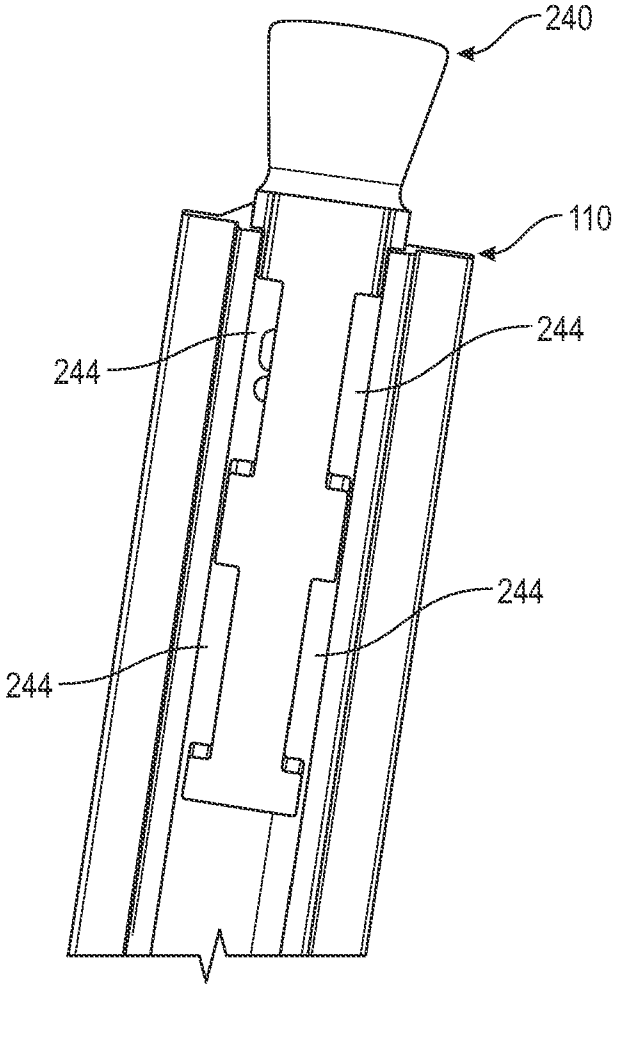
FIG. 60 is another perspective view of the funnel shown in FIG. 57-58, the view showing the screen receiver removed from the elongate channel; the view showing the funnel having an arm that fits within the slot in the exterior-facing side of the screen receiver that receives the magnets of the screen receiver.

In the arrangement shown, as one example, with reference to FIG. 57 a funnel 240 is shown connected to the upper end of the screen receiver 110 so as to facilitate the insertion of the interlock 202 of screen material 200 into the C-shaped channel 111 of the screen receiver 110. In the arrangement shown, as one example, the upper end of funnel 240 is generally cone shaped and is angled such that it widens as it extends upward. In the arrangement shown, as one example, funnel 240 includes an arm 242 that extends downward from the lower end of the cone of funnel 240 that fits within the slot in the exterior-facing side of the screen receiver 110 that receives the magnets of the screen receiver 110. The engagement between the arm 242 within the slot of screen receiver 110 affixes funnel 240 to screen receiver 110.

In the arrangement shown, as one example, the sides of arm 242 of funnel 240 includes a plurality of recesses 244 that allow the edges of the slot that arm 242 is inserted into to be crimped inward thereby locking funnel 240 in place and preventing funnel 240 from coming off of screen receiver 110. However, any other manner, method or means of connecting funnel 240 to screen receiver 110 is hereby contemplated for use such as fastening, screwing, bolting, welding, crimping, pinning, adhering, friction fitting or the like.

In the arrangement shown, as one example the cone at the upper end of funnel 240 includes a slot 246. In the arrangement shown, as one example, when arm 242 of funnel 240 is inserted within the slot of screen receiver 110, the slot 246 of funnel 240 aligns with the slot in C-shaped channel 111 of screen receiver 110 thereby providing access for interlock 202 of screen material 200 into the slot of screen receiver 110 as the screen material 200 passes through the slot 246 of funnel 240.

The installation of funnel 240 eases the insertion of screen material 200 and interlock 202 into screen receiver 110. In addition, by adding funnel 240 as a second separate piece, funnel 240 may be formed of a different material than screen receiver 110. In one arrangement, screen receiver 110 is formed of a metallic material, such as aluminum or an aluminum alloy which provides superior strength and rigidity and durability while also being relatively lightweight, while funnel 240 is formed of a non-metallic material such as plastic, composite, nylon, fiberglass, ceramic or another material that may provide a smooth surface with a relatively low coefficient of friction that is easy on the screen material 200 while being durable. This configuration reduces the cost of the system 10 while improving performance and longevity.

The foregoing description provides embodiments of the invention by way of example only. It is envisioned that other embodiments may perform similar functions and/or achieve similar results. Any and all such equivalent embodiments and examples are within the scope of the present invention and are intended to be covered by the appended claims.

The invention claimed is:

1. A motorized retractable screen system, comprising:
a roller tube;
the roller tube extending a length between a first end and a second end;
a motor;
the motor operatively connected to the roller tube;
a screen;
the screen extending a length between a first side and a second side;
the screen extending a height between an upper end and a lower end;
the upper end of the screen connected to the roller tube;
a bottom bar;
the bottom bar connected to the lower end of the screen;
wherein operation of the motor causes rotation of the roller tube;
wherein when the roller tube rotates in a first direction the screen is raised, and wherein when the roller tube rotates in a second direction, opposite the first direction, the screen is lowered;
a first track assembly;
the first track assembly positioned adjacent the first side of the screen;
the first track assembly having a first elongate channel;
the first track assembly having a first screen receiver;
the first screen receiver configured to operably connect with an interlock positioned on the first side of the screen;
the first elongate channel having a first sidewall, a second sidewall and an outer end wall;
the first elongate channel extending a length from an upper end to a lower end;
the first track assembly configured to receive and hold the first screen receiver within the first elongate channel;
wherein the first track assembly provides tension on the screen through magnetic attraction between the first screen receiver and the first track assembly;
a first bracket;
the first bracket having a bracket channel;
wherein the bracket channel of the first bracket is configured to receive the first track assembly therein with close and tight tolerances so as to provide additional structural support to the first track assembly.

2. The system of claim 1, wherein the first bracket extends the length of the first elongate channel.

3. The system of claim 1, wherein the first bracket includes a first sidewall, a second sidewall, an outer end wall.

4. The system of claim 1, wherein the first bracket includes a first sidewall, a second sidewall, an outer end wall, and a flange, wherein the flange extends outward from the first sidewall of the first bracket approximately parallel with the outer end wall of the first bracket.

5. The system of claim 1, wherein the first bracket includes a first sidewall, a second sidewall, an outer end wall, and a flange, wherein the flange extends outward from the first sidewall of the first bracket approximately parallel with the outer end wall of the first bracket; and wherein the flange of the first bracket extends the length of the first elongate channel.

6. The system of claim 1, wherein the first bracket includes a first sidewall, a second sidewall, an outer end wall;

wherein the first elongate channel and the first bracket are attached to a mounting surface by at least one fastener that extends through the outer end wall of the first elongate channel and through the outer end wall of the first bracket.

7. The system of claim 1, wherein the first bracket includes a first sidewall, a second sidewall, an outer end wall;

wherein the first sidewall of the first bracket is positioned parallel to the first sidewall of the first elongate channel;

wherein the second sidewall of the first bracket is positioned parallel to the second sidewall of the first elongate channel;

wherein the outer end wall of the first bracket is positioned parallel to the outer end wall of the first elongate channel.

8. The system of claim 1, wherein the first bracket includes a first sidewall, a second sidewall, an outer end wall; and wherein when the first track assembly is positioned within the bracket channel of the first bracket:

the first sidewall of the first bracket is in contact with the first sidewall of the first elongate channel;

the second sidewall of the first bracket is in contact with the second sidewall of the first elongate channel; and the outer end wall of the first bracket is in contact with the outer end wall of the first elongate channel.

9. The system of claim 1, wherein a width of the first screen receiver allows the first screen receiver to be inserted at an angle through an open side of the first elongate channel.

10. The system of claim 1, wherein the magnetic attraction between the first screen receiver and the first track assembly is provided by a first magnetic component connected to the first screen receiver and a second magnetic component connected to the first track assembly.

11. The system of claim 1, further comprising a first funnel positioned proximate to an upper end of the first screen receiver;

wherein the first funnel is configured to facilitate insertion of the interlock into a channel of the first screen receiver.

12. A motorized retractable screen system, comprising:

a roller tube;

the roller tube extending a length between a first end and a second end;

a motor;

the motor operatively connected to the roller tube;

a screen;

the screen extending a length between a first side and a second side;

the screen extending a height between an upper end and a lower end;

the upper end of the screen connected to the roller tube;

a bottom bar;

the bottom bar connected to the lower end of the screen;

wherein operation of the motor causes rotation of the roller tube;

wherein when the roller tube rotates in a first direction the screen is raised, and wherein when the roller tube rotates in a second direction, opposite the first direction, the screen is lowered;

a first track assembly;

the first track assembly positioned adjacent the first side of the screen;

the first track assembly having a first elongate channel;

the first track assembly having a first screen receiver;

the first screen receiver configured to operably connect with an interlock positioned on the first side of the screen;

the first track assembly configured to receive and hold the first screen receiver within the first elongate channel;

wherein there is a magnetic attraction between the first screen receiver and the first track assembly;

wherein the first screen receiver is movable within the first elongate channel;

a first bracket;

the first bracket having a bracket channel;

wherein the bracket channel of the first bracket is configured to receive the first track assembly therein with close and tight tolerances so as to provide additional structural support to the first track assembly.

13. The system of claim 12, wherein the first bracket extends a length of the first elongate channel.

14. The system of claim 12, wherein the first bracket includes a first sidewall, a second sidewall, an outer end wall.

15. The system of claim 12, wherein the first bracket includes a first sidewall, a second sidewall, an outer end wall, and a flange, wherein the flange extends outward from the first sidewall of the first bracket approximately parallel with the outer end wall of the first bracket.

16. The system of claim 12, wherein the first bracket includes a first sidewall, a second sidewall, an outer end wall, and a flange, wherein the flange extends outward from the first sidewall of the first bracket approximately parallel with the outer end wall of the first bracket; and wherein the flange of the first bracket extends the length of the first elongate channel.

17. The system of claim 12, wherein the first elongate channel includes a first sidewall, a second sidewall, and an outer end wall;

wherein the first bracket includes a first sidewall, a second sidewall, and an outer end wall;

wherein the first elongate channel and the first bracket are attached to a mounting surface by at least one fastener that extends through the outer end wall of the first elongate channel and through the outer end wall of the first bracket.

18. The system of claim 12, wherein the first elongate channel includes a first sidewall, a second sidewall, and an outer end wall;

wherein the first bracket includes a first sidewall, a second sidewall, and an outer end wall;

wherein the first sidewall of the first bracket is positioned parallel to the first sidewall of the first elongate channel;

wherein the second sidewall of the first bracket is positioned parallel to the second sidewall of the first elongate channel;

wherein the outer end wall of the first bracket is positioned parallel to the outer end wall of the first elongate channel.

19. The system of claim 12, wherein the first elongate channel includes a first sidewall, a second sidewall, and an outer end wall;

wherein the first bracket includes a first sidewall, a second sidewall, and an outer end wall;

wherein when the first track assembly is positioned within the bracket channel of the first bracket:

the first sidewall of the first bracket is in contact with the first sidewall of the first elongate channel;

the second sidewall of the first bracket is in contact with the second sidewall of the first elongate channel; and the outer end wall of the first bracket is in contact with the outer end wall of the first elongate channel.

20. The system of claim 12, wherein a width of the first screen receiver allows the first screen receiver to be inserted at an angle through an open side of the first elongate channel.

21. The system of claim 12, wherein the magnetic attraction between the first screen receiver and the first track assembly is provided by a first magnetic component connected to the first screen receiver and a second magnetic component connected to the first track assembly.

22. The system of claim 12, further comprising a first funnel positioned proximate to an upper end of the first screen receiver;

wherein the first funnel is configured to facilitate insertion of the interlock into a channel of the first screen receiver.

23. A motorized retractable screen system, comprising:

a roller tube;

the roller tube extending a length between a first end and a second end;

a motor;

the motor operatively connected to the roller tube;

a screen;

the screen extending a length between a first side and a second side;

the screen extending a height between an upper end and a lower end;

the upper end of the screen connected to the roller tube;

a bottom bar;

the bottom bar connected to the lower end of the screen;

wherein operation of the motor causes rotation of the roller tube;

wherein when the roller tube rotates in a first direction the screen is raised, and wherein when the roller tube rotates in a second direction, opposite the first direction, the screen is lowered;

a first track assembly;

the first track assembly positioned adjacent the first side of the screen;

the first track assembly having a first elongate channel;

the first track assembly having a first screen receiver;

the first screen receiver configured to operably connect with an interlock positioned on the first side of the screen;

the first elongate channel having a first sidewall, a second sidewall and an outer end wall;

the first elongate channel extending a length from an upper end to a lower end;

the first track assembly configured to receive the first screen receiver within the first elongate channel;

a plurality of magnets connected to the first elongate channel;

a plurality of magnets connected to the first screen receiver;

wherein the first track assembly provides tension on the screen through magnetic attraction between the first screen receiver and the first track assembly;

a first bracket;

the first bracket having a bracket channel;

wherein the bracket channel of the first bracket is configured to receive the first track assembly therein with close and tight tolerances so as to provide additional structural support to the first track assembly.

24. The system of claim 23, wherein the first bracket extends the length of the first elongate channel.

25. The system of claim 23, wherein the first bracket includes a first sidewall, a second sidewall, an outer end wall.

26. The system of claim 23, wherein the first bracket includes a first sidewall, a second sidewall, an outer end wall, and a flange, wherein the flange extends outward from the first sidewall of the first bracket approximately parallel with the outer end wall of the first bracket.

27. The system of claim 23, wherein the first bracket includes a first sidewall, a second sidewall, an outer end wall, and a flange, wherein the flange extends outward from the first sidewall of the first bracket approximately parallel with the outer end wall of the first bracket; and wherein the flange of the first bracket extends the length of the first elongate channel.

28. The system of claim 23, wherein the first bracket includes a first sidewall, a second sidewall, an outer end wall;

wherein the first elongate channel and the first bracket are attached to a mounting surface by at least one fastener that extends through the outer end wall of the first elongate channel and through the outer end wall of the first bracket.

29. The system of claim 23, wherein the first bracket includes a first sidewall, a second sidewall, an outer end wall;

wherein the first sidewall of the first bracket is positioned parallel to the first sidewall of the first elongate channel;

wherein the second sidewall of the first bracket is positioned parallel to the second sidewall of the first elongate channel;

wherein the outer end wall of the first bracket is positioned parallel to the outer end wall of the first elongate channel.

30. The system of claim 23, wherein the first bracket includes a first sidewall, a second sidewall, an outer end wall; and wherein when the first track assembly is positioned within the bracket channel of the first bracket:

the first sidewall of the first bracket is in contact with the first sidewall of the first elongate channel;

the second sidewall of the first bracket is in contact with the second sidewall of the first elongate channel; and the outer end wall of the first bracket is in contact with the outer end wall of the first elongate channel.

31. The system of claim 23, wherein a width of the first screen receiver allows the first screen receiver to be inserted at an angle through an open side of the first elongate channel.

32. The system of claim 23, further comprising a first funnel positioned proximate to an upper end of the first screen receiver;

wherein the first funnel is configured to facilitate insertion of the interlock into a channel of the first screen receiver.

* * * * *